United States Patent
Cheong et al.

(10) Patent No.: US 11,048,379 B2
(45) Date of Patent: Jun. 29, 2021

(54) METHOD FOR CONTROLLING DISPLAY, STORAGE MEDIUM, AND ELECTRONIC DEVICE

(71) Applicant: Samsung Electronics Co., Ltd., Gyeonggi-do (KR)

(72) Inventors: Yu-Sun Cheong, Gyeonggi-do (KR); Byung-Jin Kang, Seoul (KR); Yong-Jin Kwon, Gyeonggi-do (KR); Gae-Youn Kim, Gyeonggi-do (KR); Dae-Myung Kim, Gyeonggi-do (KR); Kwon-Ho Song, Gyeonggi-do (KR); Dong-Oh Lee, Gyeonggi-do (KR); Suk-Jae Lee, Seoul (KR); Kwang-Hyun Cho, Gyeonggi-do (KR); Byeng-Seok Choi, Gyeonggi-do (KR); Ju-Yeong Lee, Seoul (KR); Hyun-Ju Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 15/666,803

(22) Filed: Aug. 2, 2017

(65) Prior Publication Data
US 2018/0039387 A1   Feb. 8, 2018

(30) Foreign Application Priority Data

Aug. 3, 2016 (KR) .......................... 10-2016-0099173

(51) Int. Cl.
   *G06F 3/0482* (2013.01)
   *H04W 4/029* (2018.01)
   (Continued)

(52) U.S. Cl.
   CPC .......... *G06F 3/0482* (2013.01); *G06F 1/1652* (2013.01); *G06F 1/1677* (2013.01);
   (Continued)

(58) Field of Classification Search
   CPC .... G06F 3/0482; G06F 1/1652; G06F 1/1677; G06F 3/04842; H04W 4/029
   (Continued)

(56) References Cited

U.S. PATENT DOCUMENTS 5,745,711 A * 4/1998 Kitahara ............. G06F 3/04842
                                                    715/753
8,855,727 B2   10/2014 Vartanian
(Continued)

FOREIGN PATENT DOCUMENTS

JP           2015-32078 A      2/2015
KR    10-2013-0080536 A        7/2013
(Continued)

OTHER PUBLICATIONS

Abdulezer, Loren, and Evolving Technologies Corporation. "How to Transfer Files with Skype." Dummies, Mar. 26, 2010, www.dummies.com:80/education/internet-basics/how-to-transfer-files-with-skype/. (Year: 2010).*
(Continued)

*Primary Examiner* — Stephen S Hong
*Assistant Examiner* — Broderick C Anderson
(74) *Attorney, Agent, or Firm* — Cha & Reiter, LLC

(57) ABSTRACT

An electronic device including a flexible display and a method thereof are disclosed herein. The electronic device may include the flexible display and a processor. The processor implements the method, including controlling the flexible display to divide a display area into a first area and a second area, controlling the flexible display to display a first graphic element related to a first application in the first area, and a second graphic element related to controlling the first application in the second area, and controlling the first application responsive to detecting an input to the second graphic element.

9 Claims, 62 Drawing Sheets

(51) Int. Cl.
*G06F 3/0484* (2013.01)
*G06F 1/16* (2006.01)
*G06F 3/0488* (2013.01)
*H04M 1/02* (2006.01)
*H04W 4/02* (2018.01)

(52) U.S. Cl.
CPC ........ *G06F 3/0488* (2013.01); *G06F 3/04842* (2013.01); *G06F 3/04883* (2013.01); *H04M 1/0216* (2013.01); *H04M 1/0268* (2013.01); *H04W 4/029* (2018.02); *H04W 4/02* (2013.01)

(58) Field of Classification Search
USPC .......................................................... 715/771
See application file for complete search history.

(56) References Cited

U.S. PATENT DOCUMENTS

| | | | |
|---|---|---|---|
| 2013/0176248 A1* | 7/2013 | Shin ...................... | G06F 1/1652 345/173 |
| 2013/0321264 A1* | 12/2013 | Park ......................... | G06F 3/01 345/156 |
| 2014/0028596 A1 | 1/2014 | Seo et al. | |
| 2014/0049464 A1 | 2/2014 | Kwak et al. | |
| 2014/0055429 A1* | 2/2014 | Kwon ..................... | G09G 3/001 345/204 |
| 2014/0213318 A1 | 7/2014 | Leem et al. | |
| 2014/0282222 A1* | 9/2014 | Eim .................... | G06F 3/04842 715/783 |
| 2014/0328041 A1 | 11/2014 | Rothkopf et al. | |
| 2015/0015511 A1 | 1/2015 | Kwak et al. | |
| 2015/0116920 A1 | 4/2015 | Franklin et al. | |
| 2015/0153778 A1 | 6/2015 | Jung et al. | |
| 2015/0222849 A1* | 8/2015 | Kang ..................... | H04N 19/46 348/14.12 |
| 2015/0355728 A1 | 12/2015 | Cho et al. | |
| 2016/0198100 A1* | 7/2016 | Oho ................... | H04N 5/23293 |
| 2016/0202905 A1* | 7/2016 | Joo ..................... | G06F 3/04886 715/784 |
| 2016/0291762 A1* | 10/2016 | Kim ..................... | G06F 3/0488 |

FOREIGN PATENT DOCUMENTS

| | | |
|---|---|---|
| KR | 10-2014-0016082 A | 2/2014 |
| KR | 10-2014-0024145 A | 2/2014 |
| KR | 10-2014-0098593 A | 8/2014 |
| KR | 10-2015-0007925 A | 1/2015 |
| KR | 10-1524594 B1 | 5/2015 |
| KR | 10-2015-0064621 A | 6/2015 |
| KR | 10-2015-0072503 A | 6/2015 |
| KR | 10-2015-0094492 A | 8/2015 |
| KR | 10-2015-0135060 A | 12/2015 |
| KR | 10-2016-0088764 A | 7/2016 |
| WO | 2016/052814 A1 | 4/2016 |
| WO | WO-2016052814 A1 * | 4/2016 ............... G06F 3/14 |

OTHER PUBLICATIONS

International Search Report dated Nov. 8, 2017.
European Search Report dated Nov. 16, 2017.

* cited by examiner

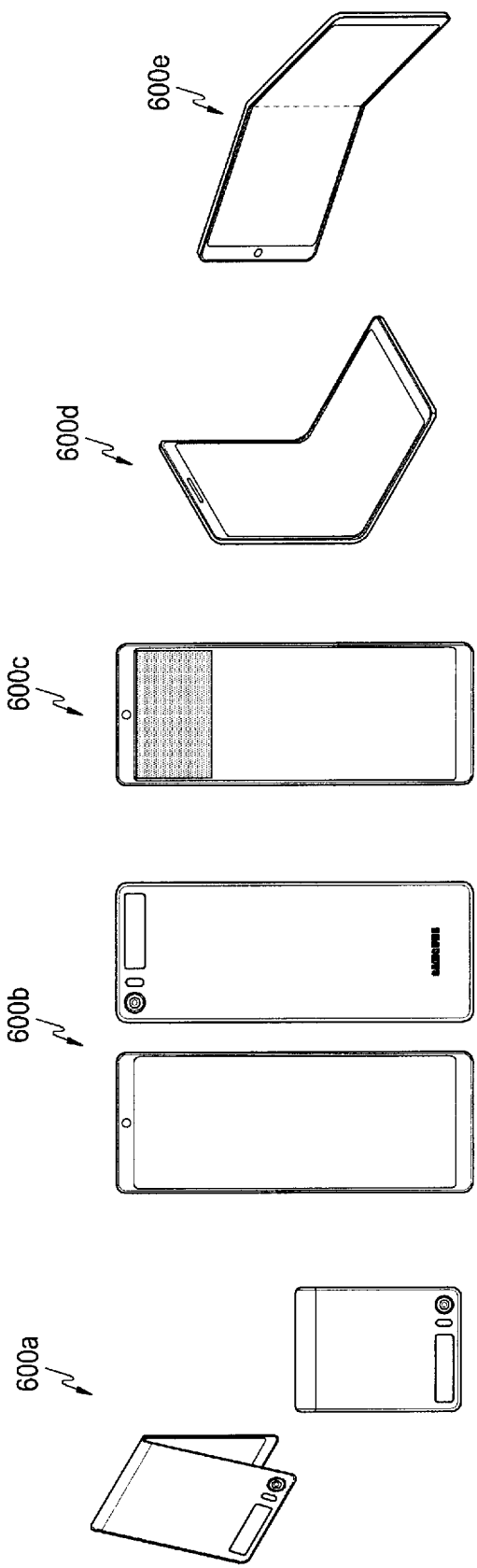

US 11,048,379 B2

METHOD FOR CONTROLLING DISPLAY, STORAGE MEDIUM, AND ELECTRONIC DEVICE

CLAIM OF PRIORITY

This application claims priority under 35 U.S.C. § 119(a) to Korean Application Serial No. 10-2016-0099173, which was filed in the Korean Intellectual Property Office on Aug. 3, 2016, the entire content of which is hereby incorporated by reference.

TECHNICAL FIELD

The present disclosure relates to a flexible electronic device and a display control method thereof.

BACKGROUND

With continuing progress in electronic technology, flexible electronic devices of various types have been developed. Particularly, electronic devices, such as a television (TV), a Personal Computer (PC), a laptop computer, a tablet PC, a mobile phone, an MPEG-1 audio layer-3 (MP3) player, and the like, have a sufficient high market penetration as to be nearly ubiquitous in most homes.

In order to meet the needs of users who desire newer and more various functions, efforts have been made to develop electronic devices in newer forms.

A flexible electronic device may refer to an electronic device in which the form or shape of the device can be altered, similar to the manner in which paper is alterable. The flexible electronic device may be deformed or otherwise altered by force applied by a user, taking on a format of being folded.

SUMMARY

A folding-type flexible electronic device may have a length longer than that of a conventional electronic device, and may therefore provide a screen having an increased length.

Therefore, the folding-type flexible electronic device may implement a method that can advantageously, variously and efficiently utilize a screen having an elongated shape relative to average electronic devices today.

In accordance with an aspect of the present disclosure, an electronic device is disclosed including a flexible display, and a processor. The processor controls the flexible display to divide a display area into a first area and a second area, controls the flexible display to display a first graphic element related to a first application in the first area, and a second graphic element related to controlling the first application in the second area, and controls the first application responsive to detecting an input to the second graphic element.

In accordance with another aspect of the present disclosure, a method in an electronic device is disclosed, including controlling, by a processor, a flexible display to divide a display area into a first area and a second area, controlling the flexible display to display a first graphic element related to a first application in the first area, and a second graphic element related to controlling the first application in the second area, and controlling the first application responsive to detecting an input to the second graphic element.

In accordance with another aspect of the presence disclosure, a storage medium storing instructions is disclosed. The instructions are executable by at least one processor to cause the at least one processor to control a flexible display to divide a display area into a first area and a second area, control the flexible display to display a first graphic element related to a first application in the first area, and a second graphic element related to controlling the first application in the second area of the flexible display, and control the first application responsive to detecting an input to the second graphic element.

According to various embodiments of the present disclosure, in the folding-type flexible electronic device, multiple display areas may be configured on the screen of the flexible display, and each of the multiple display areas may implement display of a different scheme, allowing the elongated screen to be used in diversely, variously and efficiently.

BRIEF DESCRIPTION OF THE DRAWINGS

The above and other aspects and features of the present disclosure will be more apparent from the following detailed description taken in conjunction with the accompanying drawings, in which:

FIG. 6B is a view illustrating various states of an electronic device according to various embodiments of the present disclosure;

DETAILED DESCRIPTION

Figure 1A:
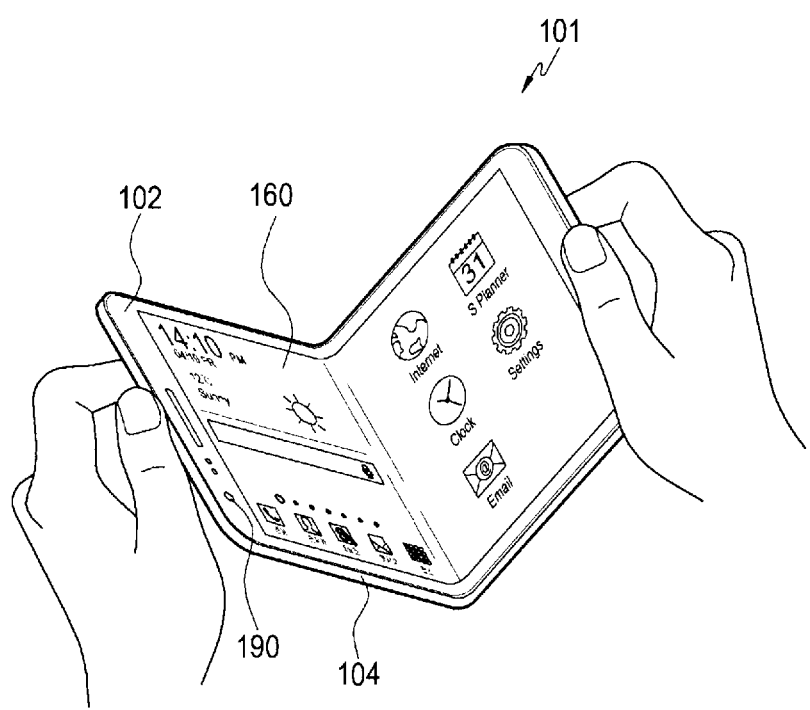
FIG. 1A, FIG. 1B and FIG. 1C are views illustrating an electronic device according to various embodiments of the present disclosure.

Hereinafter, various embodiments of the present disclosure will be described with reference to the accompanying drawings. It should be understood that the embodiments and the terms used herein are not intended to limit the present disclosure to the particular forms disclosed and the present disclosure is to cover various modifications, equivalents, and/or alternatives of the corresponding embodiments. In describing the drawings, similar reference numerals may be used to designate similar elements. As used herein, the singular forms may include the plural forms as well, unless the context clearly indicates otherwise. In the present disclosure, the expression "A or B", "A/B", or "at least one of A and/or B" may include all possible combinations of the items listed. The expression "a first", "a second", "the first", or "the second" may modify corresponding elements regardless of the order or the importance, and is used only to distinguish one element from another element, but does not limit the corresponding elements. When an element (e.g., first element) is referred to as being (operatively or communicatively) "connected," or "coupled," to another element (e.g., second element), it may be directly connected or coupled directly to the other element or any other element (e.g., third element) may be interposed between them.

In the present disclosure, the expression "configured to" may be exchanged with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a general-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a medical device, a camera, and a wearable device. According to various embodiments of the present disclosure, the wearable device may include at least one of an accessory type (e.g., a watch, a ring, a bracelet, an anklet, a necklace, glasses, a contact lens, or a Head-Mounted Device (HMD)), a fabric- or clothing-integrated type (e.g., an electronic clothing), a body-mounted type (e.g., a skin pad or tattoo), and a bio-implantable type (e.g., an implantable circuit). According to some embodiments of the present disclosure, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, and/or the like), a Magnetic Resonance Angiography (MRA), a Magnetic Resonance Imaging (MRI), a Computed Tomography (CT) machine, and an ultrasonic machine), a navigation device, a Global Navigation Satellite System (GNSS), an Event Data Recorder (EDR), a Flight Data Recorder (FDR), a vehicle infotainment device, electronic devices for a ship (e.g., a navigation device for a ship, a gyro-compass, and/or the like), avionics, security devices, an automotive head unit, a robot for home or industry, a drone, an Automatic Teller's Machine (ATM) in banks, Point Of Sales (POS) in a shop, and an Internet of Things device (e.g., a light bulb, various sensors, a sprinkler device, a fire alarm, a thermostat, a streetlamp, a toaster, sporting goods, a hot water tank, a heater, a boiler, and/or the like). According to some embodiments of the present disclosure, the electronic device may include at least one of a part of a piece of furniture, a building/structure, or a motor vehicle, an electronic board, an electronic signature receiving device, a projector, and various kinds of measuring instruments (e.g., a water meter, an electric meter, a gas meter, a radio wave meter, and/or the like). In various embodiments of the present disclosure, the electronic device may be flexible, or may be a combination of two or more of the aforementioned various devices. The electronic device according to an embodiment of the present disclosure is not limited to the aforementioned devices. In the present disclosure, the term "user" may indicate a person using an electronic device or a device (e.g. an artificial intelligence electronic device) using an electronic device.

Figure 1B:
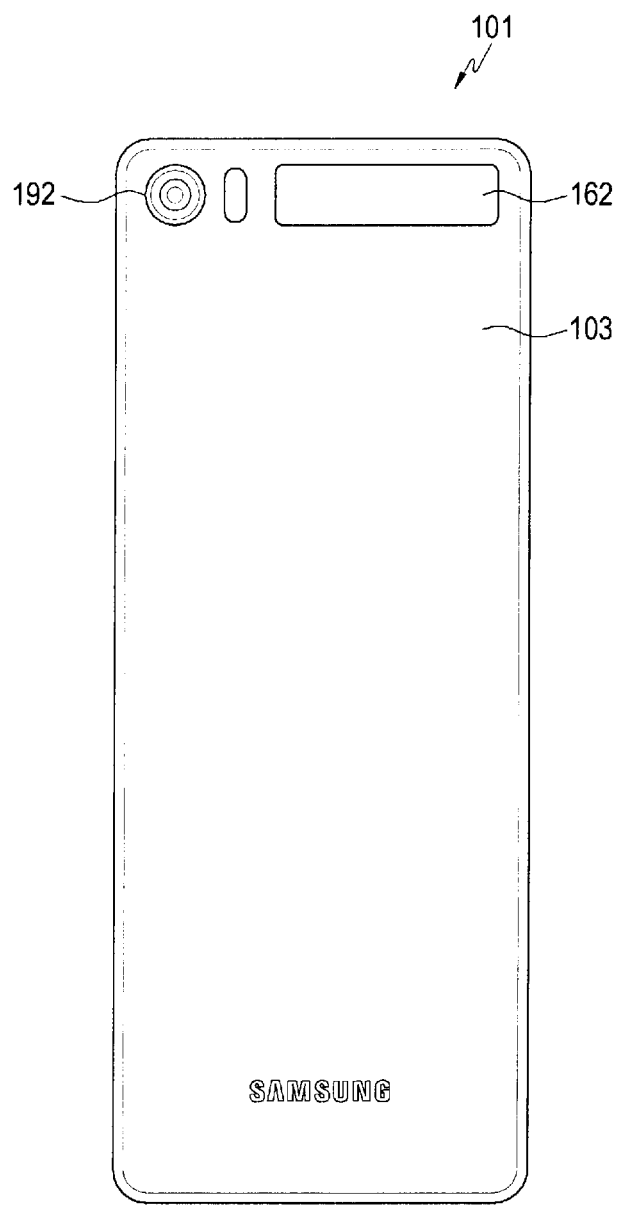
Figure 1C:
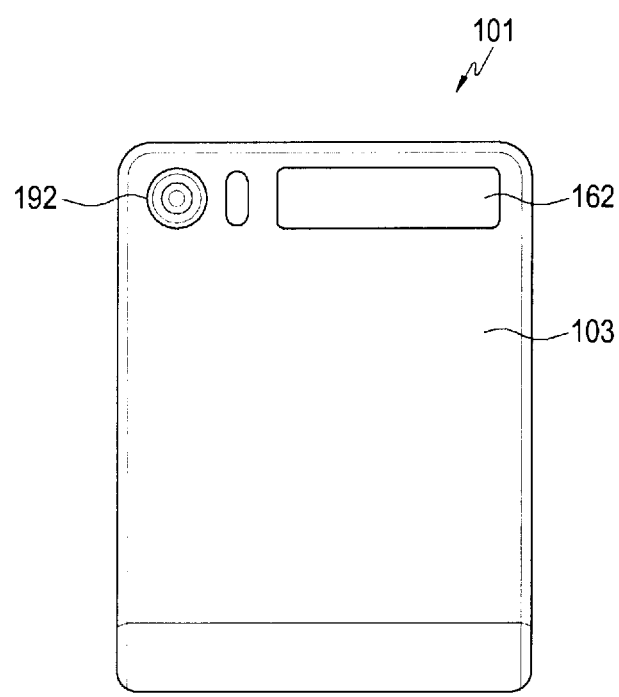

FIGS. 1A to 1C are views illustrating an electronic device according to various embodiments of the present disclosure.

FIG. 1A is a view illustrating a partially unfolded front of the electronic device, FIG. 1B is a view illustrating an unfolded rear of the electronic device, and FIG. 1C is a view illustrating a folded rear of the electronic device.

A display 160 may be disposed on a front surface 102 of the electronic device 101. The display 160 may be formed so as to occupy most of the front surface 102 of the electronic device 101. For example, a main home screen may be displayed on the display 160. The main home screen may be a first screen or a Graphical User Interface (GUI) displayed on the display 160 and facilitates user interaction when the electronic device 101 is powered on. At least one of shortcut icons for executing frequently-used applications, a main menu switching key, time, and weather may be displayed on the main home screen. When a user selects the main menu switching key, a menu screen may be displayed on the display 160.

Also, a status bar may be displayed that includes at least one state of the electronic device 101 such as the state of battery charging, the strength of a received signal, a current time point, and/or the like. The status bar may be displayed at an upper end part of the display 160.

A home button, a menu button, and/or a back button may be formed at the edge (e.g., a "bezel" or a "case part around the display 160") of the front surface 102 of the electronic device 101, which is disposed beside/below the display 160.

The home button may be activated to display the main home screen on the display 160. Also, the home button may be activated to cause the display 160 to display recently-used applications or a task manager. The menu button may be used to provide a connection menu capable of being displayed on the display 160. The connection menu may include at least one of a widget addition menu, a background screen change menu, a search menu, an editing menu, and an environment setting menu. The back button may be activated to display a screen executed just before a screen being currently executed, or may be used to terminate the most recently-used application.

A first camera 190 and/or at least one sensor may be disposed on the front surface of the electronic device 101. The at least one sensor may include one or more of a distance sensor, an illuminance sensor, a proximity sensor, and/or the like. The at least one sensor may be disposed at the edge of the front surface 102 of the electronic device 101, which is disposed beside/above the display 160.

A sub-display 162, a second camera 192, a flash, a speaker, and/or at least one sensor such as a distance sensor and/or the like may be disposed on a rear surface 103 of the electronic device 101.

When in a folded configuration (e.g., a state of being folded), the electronic device 101 may be configured to display graphic elements, user interface(s), and/or information of a preset condition or type (e.g., message reception/transmission information, status information of the electronic device, and/or the like.) on the sub-display 162. The sub-display 162 may be configured to detect pressure (e.g., indicating a tap and/or knock input of a user). For example, when the user 'knocks' (e.g., double knocking or tapping) the sub-display 162, the electronic device 101 may be configured to display graphic elements, user interface(s) and/or other designated information on the sub-display 162. The sub-display 162 may be configured to detect fingerprint information.

Further, in some example embodiments, one or more features may be disposed on a lateral surface 104, including a power/lock button, a volume button having a volume increase button and a volume reduction button, a terrestrial Multimedia Broadcasting (DMB) antenna for receiving a broadcast signal, at least one microphone, and/or the like.

Figure 2A:
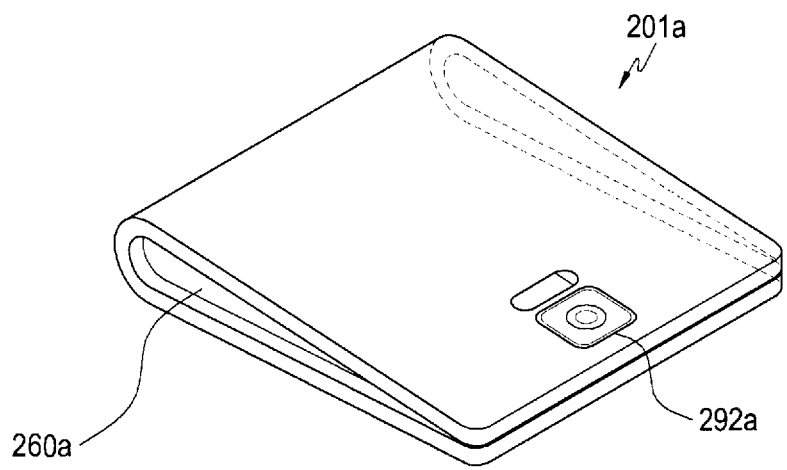
FIG. 2A and FIG. 2B are views each illustrating an electronic device according to various embodiments of the present disclosure.
Figure 2B:
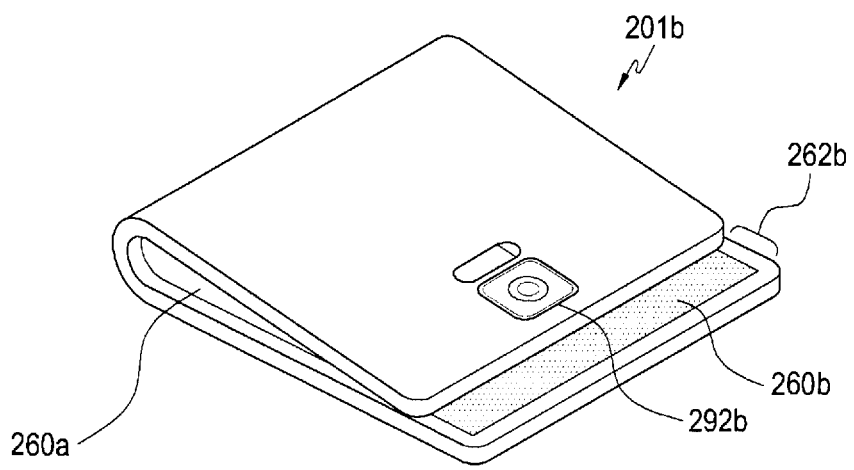

FIGS. 2A and 2B are views each illustrating an electronic device according to various embodiments of the present disclosure.

Referring to FIG. 2A, the electronic device 201a may include a second camera 292a, and may be configured such that a display 260a is not exposed to an exterior of the device (e.g., 'outside') with respect to a lengthwise end part of the electronic device 201 when the electronic device 201a is folded. As seen in FIG. 2A, a folded state of the device may be characterized by the lengthwise end parts of the electronic device 201 contacting each other, or otherwise coming as physically close as possible to one another.

Referring to FIG. 2B, the electronic device 201b may include a second camera 292b, and may be alternatively configured such that a part 262b of a display 260b is exposed to an exterior of the device in order to function as a sub-display, even when the electronic device 201b is folded.

Figure 3A:
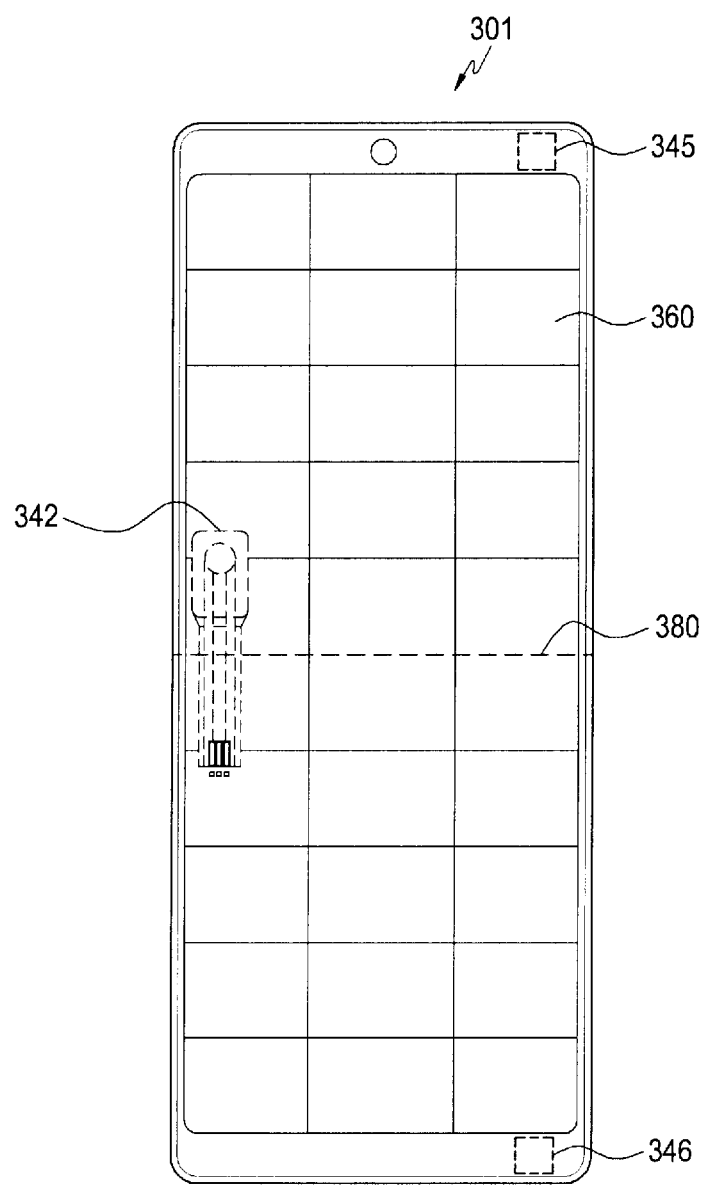
FIG. 3A and FIG. 3B are views illustrating an electronic device according to various embodiments of the present disclosure.
Figure 3B:
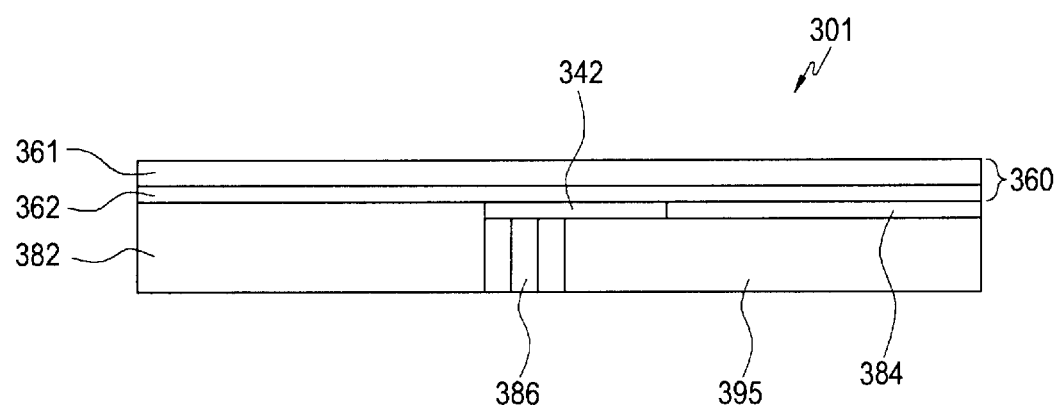

FIGS. 3A and 3B are views illustrating an electronic device according to various embodiments of the present disclosure.

FIG. 3A is a view illustrating an unfolded front of the electronic device, and FIG. 3B is a view illustrating a cross section along a lengthwise direction of the electronic device.

The electronic device 301 may include a strain sensor 342 (e.g., a strain gauge), a first sensor 345, a second sensor 346, a display 360, a hinge 386, an upper Printed-Circuit Board (PCB) 382, a lower PCB 384, and a battery 395.

The strain sensor 342 may be disposed at a folded position 380 of the electronic device 301, and may output a "strain value" used to indirectly measure a folding angle of the electronic device 301.

An angle sensor may be disposed at the folded position 380 of the electronic device 301, and may directly measure the folding angle of the electronic device 301 or the hinge 386.

The first sensor 345 may be disposed at the edge of a front surface of the electronic device 301, which is located beside/above the display 360, and the second sensor 346 may be disposed at the edge of a front surface of the electronic device 301, which is located beside/below the display 360. The first and second sensors 345 and 346 may provide information for calculating the folding angle of the electronic device 301. For example, each of the first and second sensors 345 and 346 may include at least one of a distance sensor and a gyroscope sensor.

The display 360 may include a flexible panel 361 for displaying an image and a third sensor 362 for detecting at least one of pressure, fingerprint, and/or the like.

The upper PCB 382 and the lower PCB 384 may be separated from each other with the hinge 386 interposed in between, and may be electrically connected to one other through a flexible connector.

The hinge 386 (e.g., a free stop hinge) may maintain a folded state of the electronic device 301 at various angles.

Figure 4A:
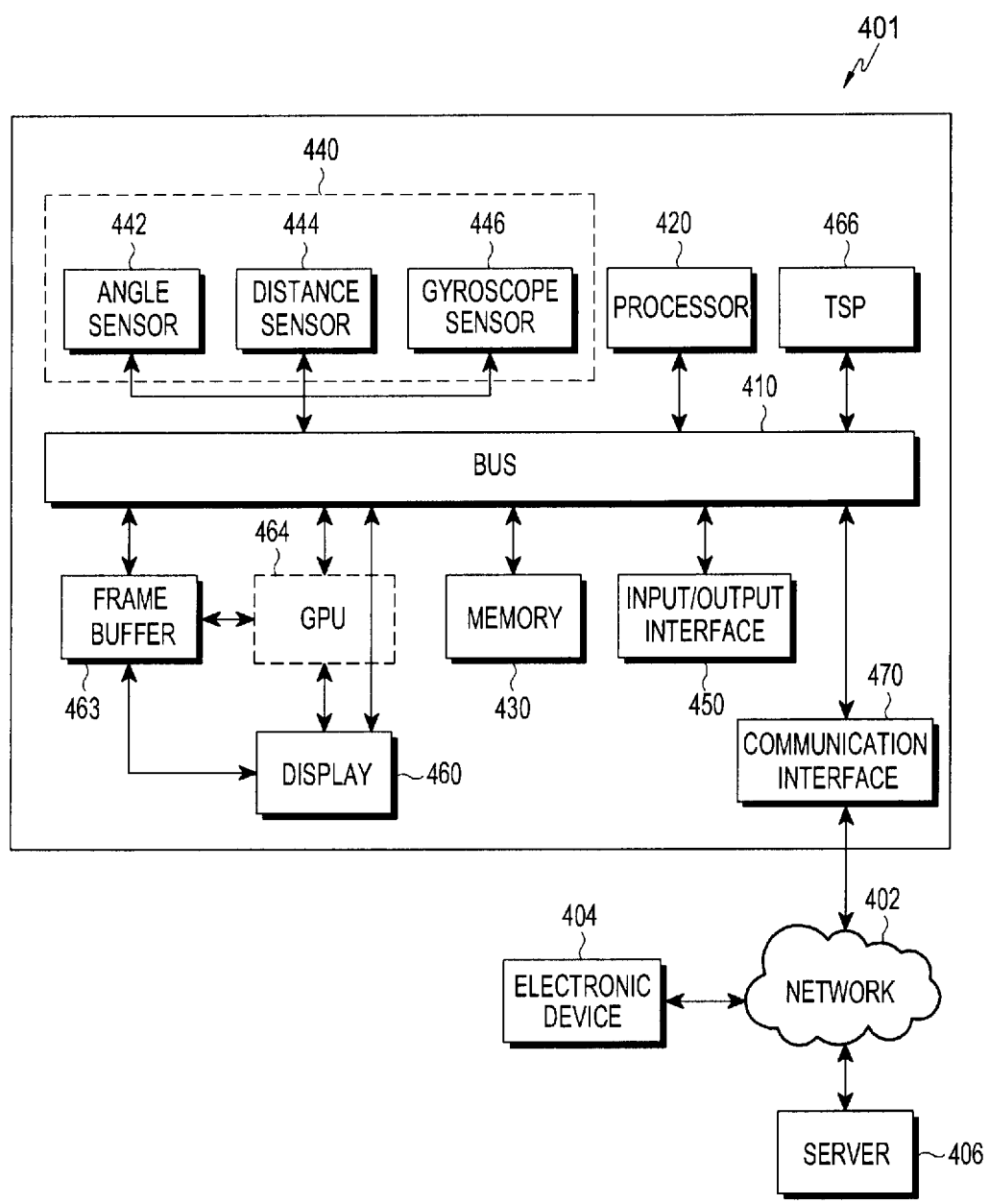
FIG. 4A is a view illustrating electronic devices in a network environment according to various embodiments of the present disclosure.

Referring to FIG. 4A, a description will be made of an electronic device 401 in a network environment according to various embodiments of the present disclosure. The electronic device 401 (e.g., the electronic device 101) may include a bus 410, a processor 420, a memory 430, a sensor module 440, an input/output interface 450, a display 460 (e.g., the display 160), and a communication interface 470. In some embodiments of the present disclosure, at least one of the above elements of the electronic device 401 may be omitted from the electronic device 401, or the electronic device 401 may additionally include other elements. For example, the electronic device 401 may further include at least one of a frame buffer 463, a Graphics Processing Unit (GPU) 464, and a Touch Screen Panel (TSP) 466 (or also referred to as a "touch panel").

The bus 410 may include a circuit that interconnects the elements 410 to 470 and delivers a communication (e.g., a control message or data) between the elements 410 to 470. The processor 420 may include one or more of a CPU, an AP, and a Communication Processor (CP). The processor 420 may perform, for example, calculations or data processing related to control over and/or communication by at least one of the other elements of the electronic device 401.

The memory 430 may include a volatile memory and/or a non-volatile memory. The memory 430 may store, for example, commands or data related to at least one of the other elements of the electronic device 401. According to an embodiment of the present disclosure, the memory 430 may store software and/or a program. The program may include, for example, a kernel, middleware, an Application Programming Interface (API), and/or an application program (or an application). At least some of the kernel, the middleware, and the API may be referred to as an "Operating System (OS)." For example, the kernel may control or manage system resources (e.g., the bus 410, the processor 420, the memory 430, and/or the like) used to execute operations or functions implemented by the other programs (e.g., the middleware, the API, and the application program). Also, the kernel may provide an interface capable of controlling or managing the system resources by accessing the individual elements of the electronic device 401 by using the middleware, the API, or the application program.

For example, the middleware may serve as an intermediary that enables the API or the application program to communicate with the kernel and to exchange data therewith. Also, the middleware may process one or more task requests received from the application program according to a priority. For example, the middleware may assign a priority, which enables the use of system resources (e.g., the bus 410, the processor 420, the memory 430, and/or the like) of the electronic device 401, to at least one of the application programs, and may process the one or more task requests according to the assigned priority. The API is an interface through which the application controls a function provided by the kernel or the middleware, and may include, for example, at least one interface or function (e.g., command) for file control, window control, image processing, character control, or the like.

For example, the sensor module 440 may measure a physical quantity, or may detect an operation state of the electronic device 401, and may convert the measured physical quantity or the detected operation state into an electrical signal. The sensor module 440 may include at least one of, for example, an angle sensor 442, a distance sensor 444, and a gyroscope sensor 446. The sensor module 440 may include at least one of a GNSS sensor, a Global Positioning System (GPS) sensor, a gesture sensor, an atmospheric pressure sensor, a magnetic sensor, an acceleration sensor, a grip sensor, a proximity sensor, a color sensor (e.g., a Red-Green-Blue (RGB) sensor), a biometric sensor, a temperature/humidity sensor, an illuminance sensor, and an Ultraviolet (UV) sensor. Additionally or alternatively, the sensor module 440 may include, for example, an e-nose sensor, an electromyography (EMG) sensor, an electroencephalogram (EEG) sensor, an electrocardiogram (ECG) sensor, an Infrared (IR) sensor, an iris sensor, and/or a fingerprint sensor.

The sensor module 440 may further include a control circuit for controlling one or more sensors included therein. In some embodiments of the present disclosure, the electronic device 401 may further include a processor configured to control the sensor module 440 as a part of or separately from the processor 420, and may control the sensor module 440 while the processor 420 is in a sleep state.

For example, the input/output interface 450 may deliver a command or data, which is input from a user or another external device, to the element(s) other than the input/output interface 450 within the electronic device 401, or may output, to the user or another external device, commands or data received from the element(s) other than the input/output interface 450 within the electronic device 401. The input/output interface 450 may include at least one of, for example, a speaker, a receiver, an earphone, and a microphone.

The display 460 may include at least one of a Liquid Crystal Display (LCD), a Light-Emitting Diode (LED) display, an Organic Light-Emitting Diode (OLED) display, a MicroElectroMechanical Systems (MEMS) display, an electronic paper display, and a projector. For example, the display 460 may display various pieces of content (e.g., text, images, videos, icons, symbols, and/or the like.) to the user.

The frame buffer 463 may store pixel values or pixel color values to be output to the display 460, and may be implemented by a memory, the GPU 464, a memory within the display 460 or a display controller, or a virtual apparatus such as a frame buffer apparatus employing Linux.

The GPU 464 may generate a screen including various objects, such as an item, an image, text, and/or the like. The GPU 464 may calculate at least one attribute value among a coordinate value, a form, a size, a color, and/or the like by using which each object is to be displayed according to the layout of a screen, and may generate a screen, which has various layouts and includes the objects, on the basis of the calculated attribute value. Hereinafter, a screen or an application screen may refer to the whole or part of an image shown on a surface (or a display area) of the display 460. For example, the application screen may be referred to as a "graphical interface", a "GUI", an "application window", an "application area", and/or the like.

The TSP 466 (or also referred to as a "touch panel") may receive a touch input, a gesture input, a proximity input, or a hovering input provided by an electronic pen or a body part of the user. For example, the TSP 466 may be included in the display 460. The TSP 466 may detect a touch/hovering input by using at least one of, for example, a capacitive scheme, a resistive scheme, an infrared scheme, and a surface acoustic wave scheme. Also, the TSP 466 may further include a control circuit. The TSP 466 may further include a tactile layer and may provide a tactile reaction to the user.

The communication interface 470 may establish, for example, communication between the electronic device 401 and an external device (e.g., an external electronic device 404 or a server 406). For example, the communication interface 470 may be connected to a network 402 through wireless or wired communication and may communicate with the external device (e.g., the second external electronic device 404 or the server 406).

The types of the wireless communication may include, for example, cellular communication which uses at least one of Long-Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), and Global System for Mobile Communications (GSM). According to an embodiment of the present disclosure, the types of the wireless communication may include at least one of, for example, WiFi, Bluetooth, Bluetooth Low Energy (BLE), Zigbee, Near Field Communication (NFC), magnetic secure transmission, Radio Frequency (RF), and Body Area Network (BAN). According to an embodiment of the present disclosure, the types of the wireless communication may include a GNSS. The GNSS may be, for example, a Global Positioning System (GPS), a Global Navigation Satellite System (Glonass), a Beidou Navigation Satellite System (hereinafter "Beidou"), or a European Global Satellite-based Navigation System (Galileo). Hereinafter, in the present disclosure, the term "GPS" may be used interchangeably with the term "GNSS." The types of the wired communication may include at least one of, for example, a Universal Serial Bus (USB), a High Definition Multimedia Interface (HDMI), Recommended Standard 232 (RS-232), Power Line communication (PLC), and a Plain Old Telephone Service (POTS). Examples of the network 402 may include at least one of telecommunication networks, such as a computer network (e.g., a Local Area Network (LAN), or a Wide Area Network (WAN)), the Internet, and a telephone network.

The external electronic device 404 may be of a type identical to or different from that of the electronic device 401. According to various embodiments of the present disclosure, all or some of operations performed by the electronic device 401 may be performed by another electronic device or multiple electronic devices (e.g., the external electronic device 404 or the server 406). According to an embodiment of the present disclosure, when the electronic device 401 needs to perform some functions or services automatically or by a request, the electronic device 401 may send, to another device (e.g., the external electronic device 404 or the server 406), a request for performing at least some functions related to the functions or services, instead of performing the functions or services by itself, or additionally. Another electronic device (e.g., the external electronic device 404, or the server 406) may execute the requested functions or the additional functions, and may deliver a result of the execution to the electronic device 401. The electronic device 401 may process the received result without any change or additionally and may provide the requested functions or services. To this end, use may be made of, for example, cloud computing technology, distributed computing technology, or client-server computing technology.

Figure 4B:
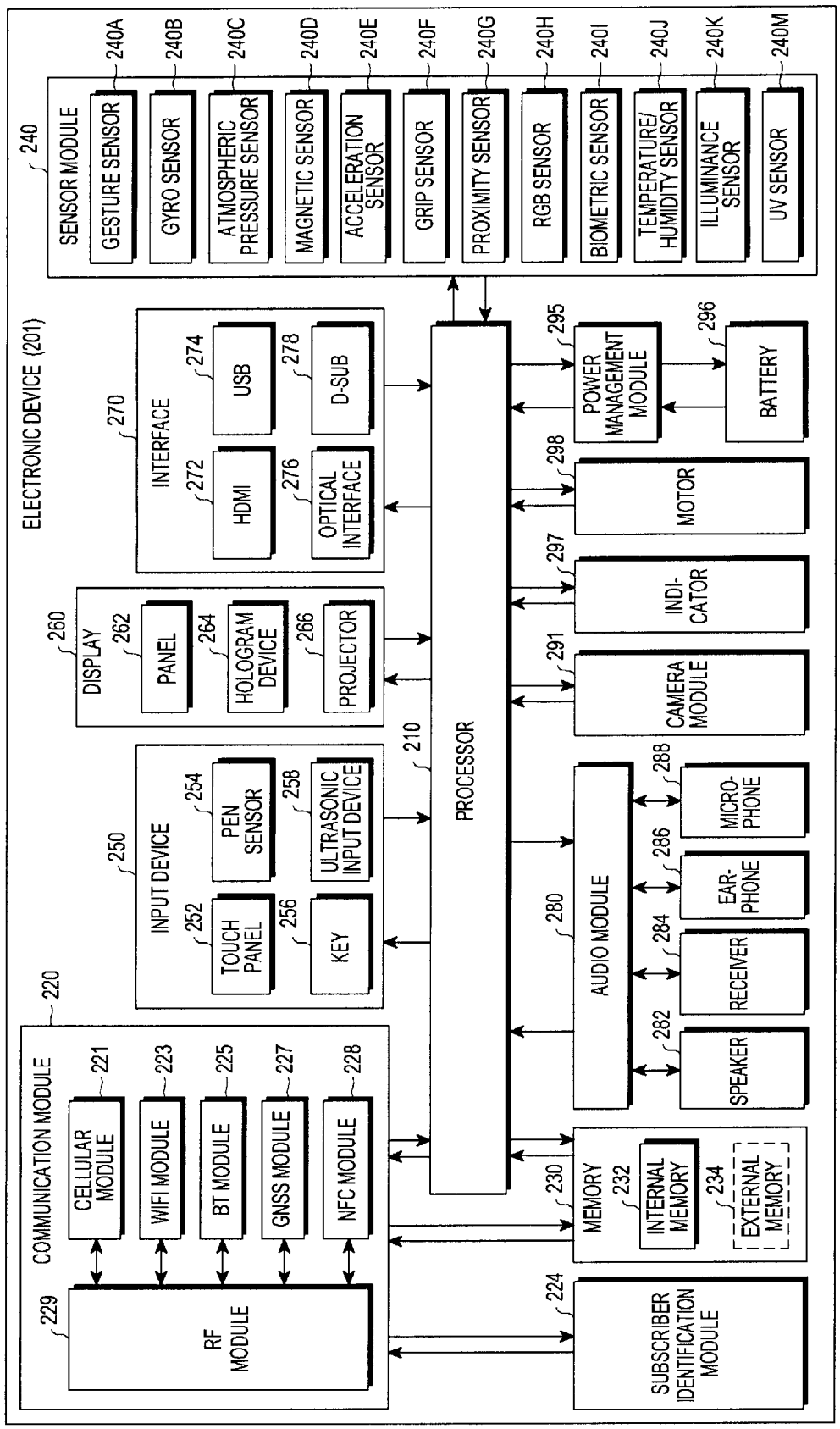
FIG. 4B is a block diagram illustrating a configuration of an electronic device according to various embodiments of the present disclosure.

FIG. 4B is a block diagram illustrating a configuration of an electronic device 201 according to various embodiments of the present disclosure. The electronic device 201 may include, for example, the whole or part of the electronic device 401 illustrated in FIG. 4A. The electronic device 201 may include at least one processor (e.g., an AP) 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298. The processor 210 may control multiple hardware or software elements connected to the processor 210 and may perform the processing of and arithmetic operations on various data, by running, for example, an OS or an application program. The processor 210 may be implemented by, for example, a System on Chip (SoC). According to an embodiment of the present disclosure, the processor 210 may further include a Graphics Processing Unit (GPU) and/or an image signal processor. The processor 210 may include at least some (e.g., a cellular module 221) of the elements illustrated in FIG. 4B. The processor 210 may load, into a volatile memory, instructions or data received from at least one (e.g., a non-volatile memory) of the other elements and may process the loaded instructions or data, and may store the resulting data in a non-volatile memory.

The communication module 220 (e.g., the communication interface 470) may include, for example, the cellular module 221, a Wi-Fi module 223, a Bluetooth (BT) module 225, a GNSS module 227, an NFC module 228, and an RF module 229. For example, the cellular module 221 may provide a voice call, a video call, a text message service, an Internet service, and/or the like through a communication network. According to an embodiment of the present disclosure, the cellular module 221 may identify or authenticate the electronic device 201 in the communication network by using the subscriber identification module (e.g., a Subscriber Identity Module (SIM) card) 224. According to an embodiment of the present disclosure, the cellular module 221 may perform at least some of the functions that the processor 210 may provide. According to an embodiment of the present disclosure, the cellular module 221 may include a CP. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit and receive, for example, communication signals (e.g., RF signals). The RF module 1029 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module. The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 430) may include, for example, an internal memory 232 or an external memory 234. The internal memory 232 may include at least one of, for example, a volatile memory (e.g., a Dynamic Random Access Memory (DRAM), a Static RAM (SRAM), a Synchronous DRAM (SDRAM), and/or the like); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid State Drive (SSD)). The external memory 234 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red-Green-Blue (RGB) sensor), a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and a surface acoustic wave scheme. Also, the touch panel 252 may further include a control circuit. The touch panel 252 may further include a tactile layer and may provide a tactile reaction to the user. The (digital) pen sensor 254 may include, for example, a recognition sheet that is a part of the touch panel or is separated from the touch panel. The key 256 may be, for example, a physical button, an optical key, and a keypad. The ultrasonic input unit 258 may sense an ultrasonic wave generated by an input through a microphone (e.g., a microphone 288), and may confirm data corresponding to the sensed ultrasonic wave.

The display 260 (e.g., the display 460) may include a panel 262, a hologram unit 264, a projector 266, and/or a control circuit for controlling the same. The panel 262 may be implemented to be, for example, flexible, transparent, or wearable. The panel 262 together with the touch panel 252 may be implemented as one or more modules. According to an embodiment of the present disclosure, the panel 262 may include a pressure sensor (or a force sensor) capable of measuring the strength of pressure of a user's touch. The pressure sensor and the touch panel 252 may be integrated into one unit, or the pressure sensor may be implemented by one or more sensors separated from the touch panel 252. The hologram unit 264 may display a three-dimensional image in the air by using the interference of light. The projector 266 may display an image by projecting light onto a screen. The screen may be located, for example, inside or outside the electronic device 201. The interface 270 may include, for example, a High-Definition Multimedia Interface (HDMI) 272, a Universal Serial Bus (USB) 274, an optical interface 276, and a D-subminiature (D-sub) 278. The interface 270 may be included in, for example, the communication interface 470 illustrated in FIG. 4A. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 450 illustrated in FIG. 4A. The audio module 280 may process sound information which is input or output through, for example, a speaker 282, a receiver 284, an earphone 286, the microphone 288, or the like. The camera module 291 is, for example, a device capable of capturing a still image and a moving image. According to an embodiment of the present disclosure, the camera module 291 may include one or more image sensors (e.g., a front sensor or a back sensor), a lens, an Image Signal Processor (ISP), and a flash (e.g., an LED, a xenon lamp, or the like). The power management module 295 may manage, for example, power of the electronic device 201. According to an embodiment of the present disclosure, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and/or the like. The PMIC may further include additional circuits (e.g., a coil loop, a resonance circuit, a rectifier, and/or the like) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include, for example, a mobile television (TV) support unit (e.g., a GPU) that may process media data according to a standard, such as Digital Multimedia Broadcasting (DMB), Digital Video Broadcasting (DVB), or mediaFLO™. Each of the above-described elements of hardware according to the present disclosure may include one or more components, and the names of the corresponding elements may vary based on the type of electronic device. In various embodiments of the present disclosure, the electronic device (e.g., the electronic device 201) may omit some elements or may further include additional elements, or some of the elements of the electronic device may be combined into one entity, which may perform functions identical to those of the relevant elements before the combination.

FIGS. 5A to 5G are views illustrating a program module according to various embodiments of the present disclosure.

Figure 5A:
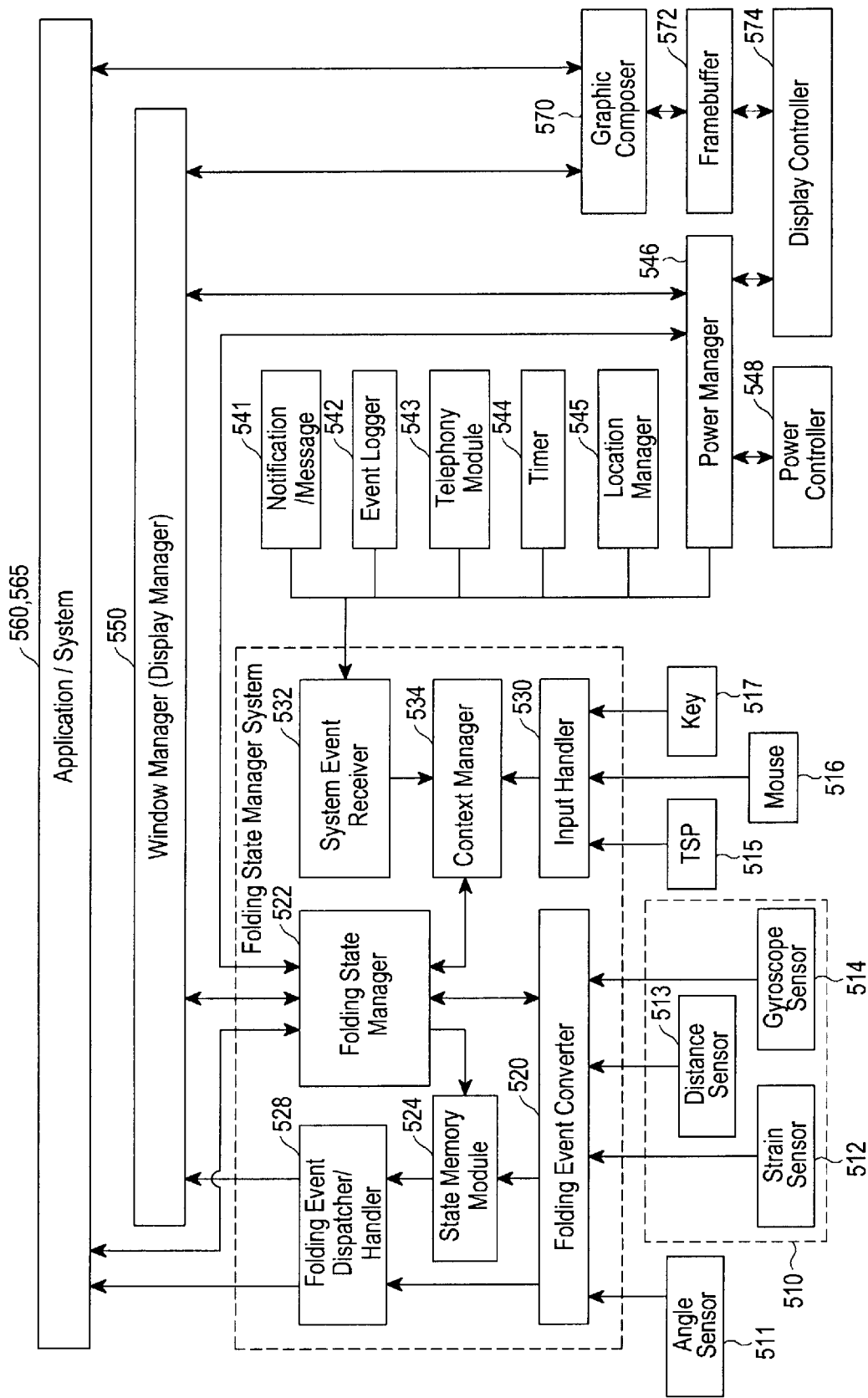
FIG. 5A, FIG. 5B, FIG. 5C, FIG. 5D, FIG. 5E, FIG. 5F and FIG. 5G are views illustrating a program module according to various embodiments of the present disclosure.

FIG. 5A is a block diagram illustrating a configuration of a program module according to various embodiments of the present disclosure. According to an embodiment of the present disclosure, the program module may include an OS for controlling resources related to the electronic device (e.g., the electronic device 101, 201, or 401) and/or various applications executed in the OS. The OS may be, for example, Android™, iOS™, Windows™, Symbian™, Tizen™, Bala™, and/or the like. At least some of the program module may be preloaded on the electronic device, or may be downloaded from an external electronic device (e.g., the electronic device 404, the server 406, and/or the like).

A folding event converter 520 (or referred to as an "event converter") may analyze raw data received from a sensor 510 (e.g., a strain sensor 512, a distance sensor 513, a gyroscope sensor 514, and/or the like), and may calculate a folding state. Hereinafter, the term "folding" may refer to "bending," and the term "folding event" may refer to a "folding gesture."

A folding event dispatcher/handler 528 (or referred to as an "event handler") may deliver a folding state/event to a system 565 or an application 560.

A folding state manager 522 may deliver a folding state/event to a relevant module.

A state memory module 524 may store a folding state/event.

A notification/message manager 541 may provide a user with an event, such as an arrival message, an appointment, a proximity notification, and/or the like.

An event logger 542 may record events, and may display the events in chronological order.

A telephony module 543 may manage a voice/video call function of the electronic device.

A timer 544 may provide a timer function.

A location manager 545 may manage, for example, location information of the electronic device.

A power manager 546 may operate in conjunction with, for example, a power controller 548 and may manage the capacity of a battery or power, and may provide power information utilized for an operation of the electronic device.

A system event receiver 532 may receive an event from the notification/message manager 541, the event logger 542, the telephony module 543, the timer 544, or the power manager 546, and may deliver the received event to a context manager 534.

An input handler 530 may receive an input from a TSP 515, a mouse 516, or a key 517, and may deliver the received input to the context manager 534.

The context manager 534 may manage a system service on the basis of an input, a system event, a folding state, and/or the like.

A display controller 574 may control on/off of a screen.

A frame buffer 572 may store pixel values or pixel color values to be output to the display.

A graphic composer 570 may generate a screen including various objects, such as an item, an image, text, and/or the like.

A window manager 550 may manage GUI resources used for a screen.

The application 560 may include applications which provide, for example, a home, a dialer, an SMS/MMS, an Instant Message (IM), a browser, a camera, an alarm, a contact, a voice dial, an email, a calendar, a media player, an album, a watch, health care (e.g., which measures an exercise quantity, a blood sugar level, or the like), and environmental information (e.g., information on atmospheric pressure, humidity, or temperature).

At least part of the program module may be implemented (e.g., executed) in software, firmware, hardware (e.g., a processor), or at least two combinations thereof, and may include a module, a program, a routine, a set of instructions, or a process for performing one or more functions.

Figure 5B:
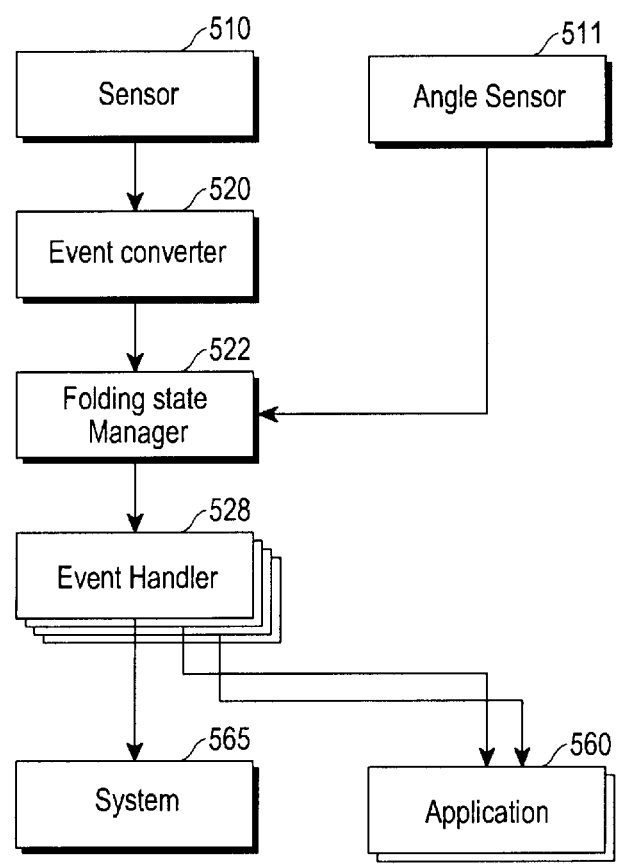

Referring to FIGS. 3A and 5B, the folding event converter 520 may analyze raw data from the sensor 510 and may calculate a folding state. For example, the folding event converter 520 may calculate a folding angle of the electronic device 301 by comparing an angle formed between the axis of the first sensor 345 and the ground, which has been measured by the first sensor 345 including a gyroscope sensor, with an angle formed between the axis of the second sensor 346 and the ground which has been measured by the second sensor 346 including a gyroscope sensor.

For example, when a distance measured by the first sensor 345 including a distance sensor is identical to a distance measured by the second sensor 346 including a distance sensor, the folding event converter 520 may know that the electronic device 301 is folded and the first sensor 345 and the second sensor 346 are in a state of facing each other, and may calculate a folding angle of the electronic device 301 since a distance between the first sensor 345 and the second sensor 346 is corresponding to (or proportional to) the folding angle.

A folding state may be directly measured by an angle sensor 511, or may be determined through calculation performed by the folding event converter 520. The folding state may be expressed by an angle itself, may be expressed by one state corresponding to a predetermined angle range, or may be expressed by the trend of increase/reduction in angle.

The folding state manager 522 may deliver a folding state/event to the event handler 528, and the folding state/event may be processed by the registered event handler 528. The event handler 528 may be registered by various modules, such as the system 565, the application 560, a background service, and/or the like, and the registered event handler 528 may process a folding state/event according to a priority. For example, a priority may be determined in order of the system 565, a visible (or activated) application, an application which is being executed but is not directly visible to the user, and a background service which does not have a visible UI. For example, when a folding state/event is not processed by an event handler having a high priority, the folding state/event may be processed by an event handler having the next priority.

The sequential processing of a folding state/event may have an effect described below.

When the electronic device is folded, the system 565 may display an alpha screen or a gadget. For example, the alpha screen may be implemented by a window that is capable of freely moving and displays at least one piece of content/information among multimedia content, user-customized information, and real-time information. When a particular situation such as a landscape mode is given, the system 565 may not process a folding event, and when the event handler 528 having the next priority is registered in a video application, the video application may stop or start the reproduction of a video according to a folding/unfolding event.

Figure 5C:
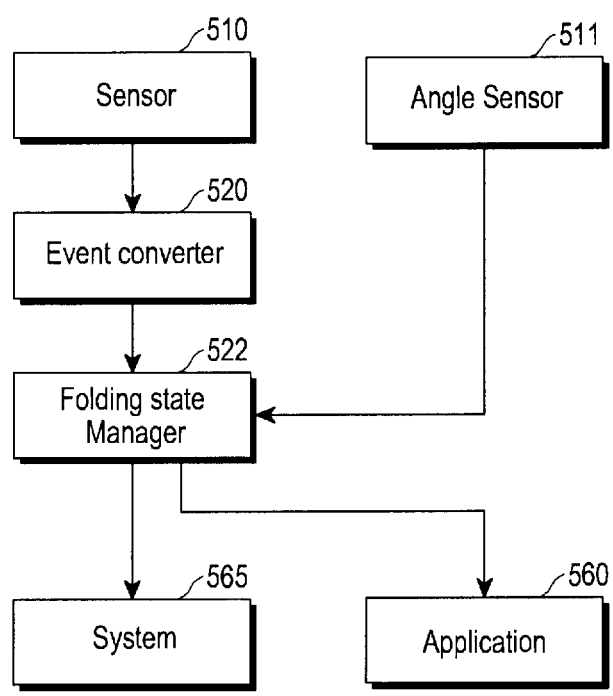

Referring to FIG. 5C, the folding state manager 522 may directly deliver a folding state/event to the system 565 or the application 560 without passing through the event handler. For example, the folding state manager 522 may determine whether a folding state/event is to be delivered and/or a subject to which the folding state/event is to be delivered, based on context information of the electronic device which has been acquired from the context manager 534.

Figure 5D:
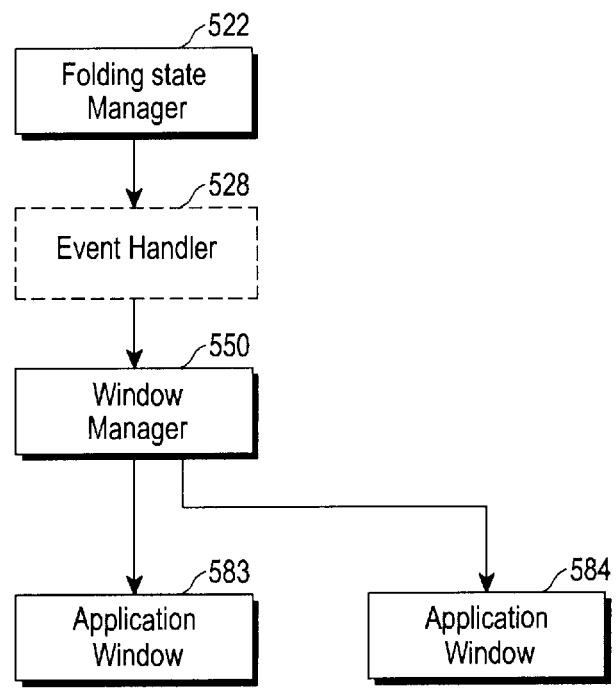
Figure 5E:
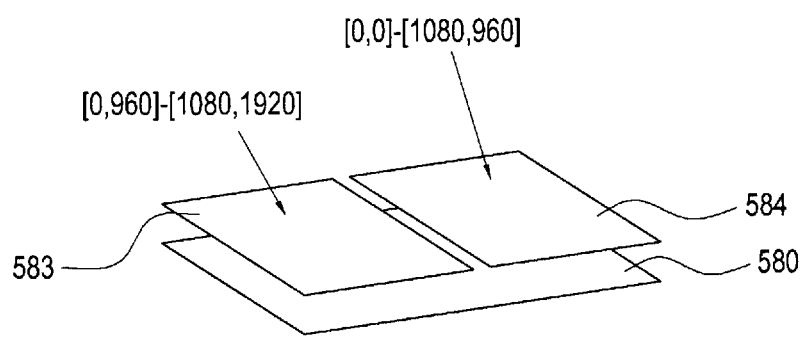

Referring to FIGS. 5D and 5E, a screen of a display 580 may be divided into multiple areas, notably without utilizing a scheme for virtually dividing the display 580 among screen division schemes. In such embodiments, coordinates on the display 580 corresponding to an identical point (e.g., at a same relative position on both display partitions) in application windows 583 and 584 are different, according to locations of the application windows 583 and 584. Therefore, the window manager 550 may adjust the application windows 583 and 584 so as to correspond to the divided areas.

Figure 5F:
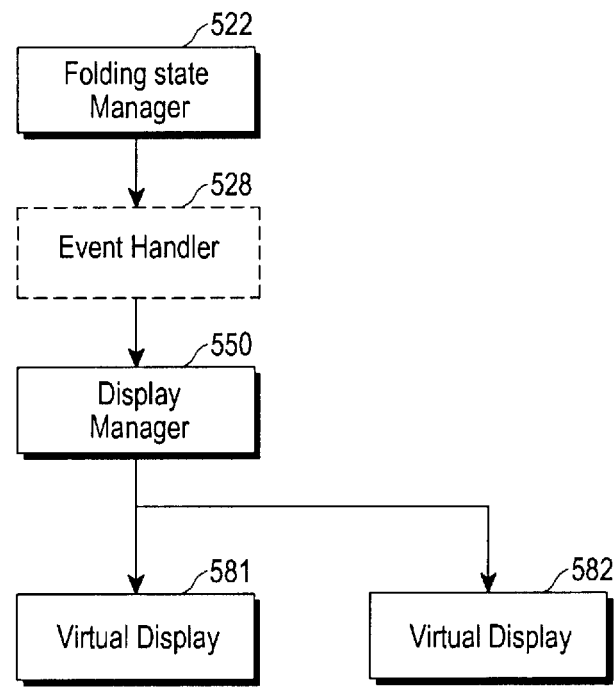
Figure 5G:
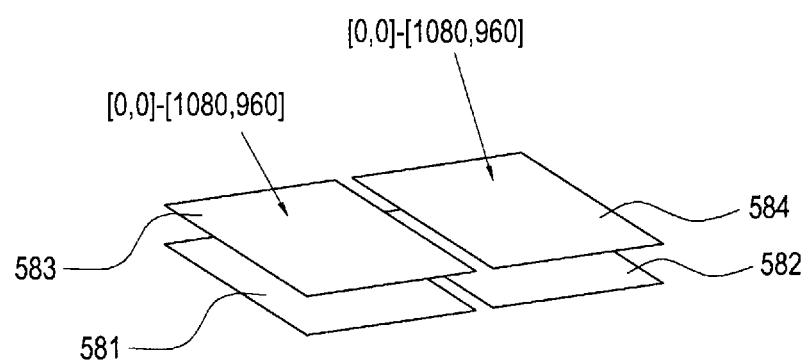

Referring to FIGS. 5F and 5G, when the scheme dividing the display 580 into virtual displays 581 and 582 is executed, because the multiple virtual displays 581 and 582 correspond one-to-one to multiple application windows 583 and 584, and coordinates on the respective displays of an identical point in the application windows 583 and 584 are identical even when locations of the application windows 583 and 584 are different, the window manager 550 may adjust the virtual displays 581 and 582 so as to correspond to the divided areas.

Figure 6A:
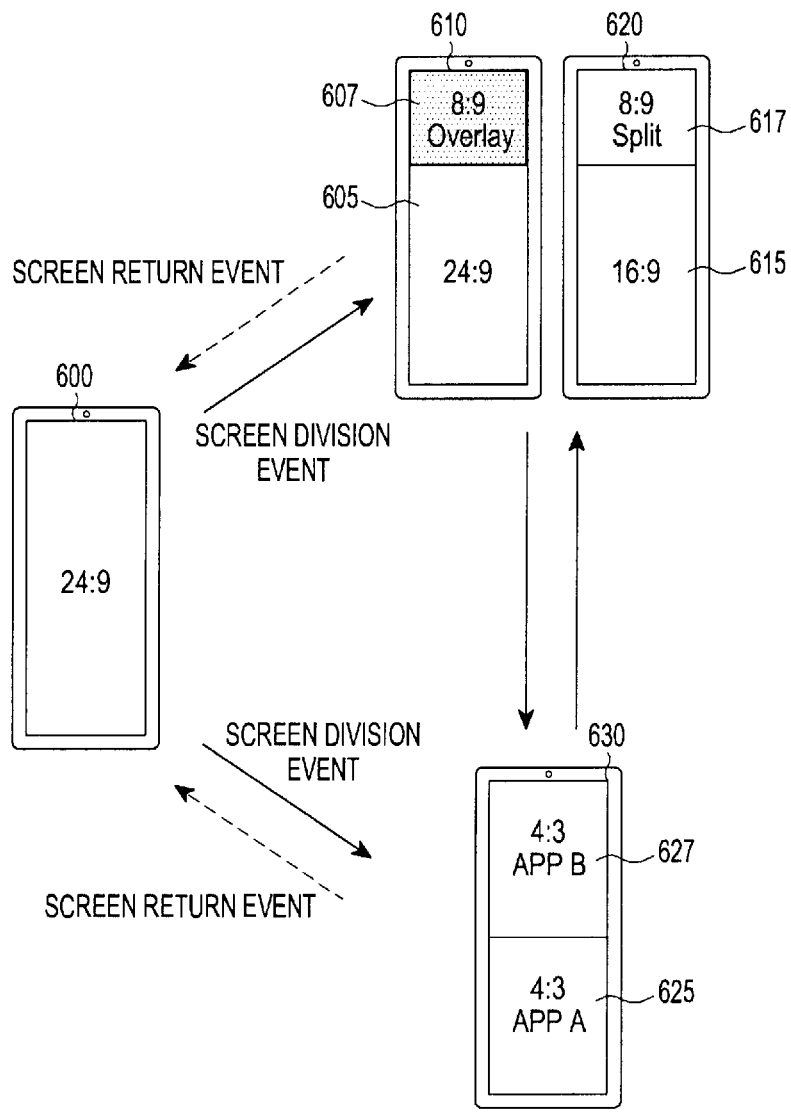
FIG. 6A is a view illustrating a ratio according to screen division in an electronic device according to various embodiments of the present disclosure.

FIG. 6A is an illustrative view explaining utilization of a ratio for screen division in an electronic device, according to various embodiments of the present disclosure.

Referring to FIG. 6A, in an embodiment of the present disclosure, when the electronic device is unfolded (e.g., in an unfolded state) (e.g., the electronic device 101, 201, or 401), a default screen (or a full screen) 600 of a display (e.g., the display 460) may have a screen ratio of 24:9. It is understood that the ratio disclosed herein is exemplary, and a ratio of the default screen 600 may be changed with or without alterations in the physical dimensions of the screen. Also, it may be understood that a first window 605 occupying the entire area of the display utilizes the ratio of 24:9.

The default screen 600 is illustrated as presently an unfolded screen of the display, and may be switched to display of screens 610, 620, and 630 having various division ratios in response to an event for screen division.

According to an embodiment of the present disclosure, in a state of displaying the default screen 600, the default screen 600 may be switched to a first screen 610 on which a second window 607 having a ratio of 8:9 is displayed in an overlay form in the first window 605 having a ratio of 24:9 in response to the type of event related to screen division. At this time, in the case of a split mode which is not the overlay form, the size of the first window 615 may be reduced to a ratio of 16:9 and the second screen 620 on which the second window 617 having a ratio of 8:9 shares a common boundary line with the first window 615 may be displayed. For example, in the state of displaying the default screen 600, the second window (e.g., an alpha screen) 607 displayed in an overlay form may be invoked in response to folding interaction, and the second window (e.g., an alpha screen) 607 may be hidden in response to unfolding interaction. Also, in a state where the second window (e.g., an alpha screen) 607 is displayed in an overlay form, the fixed second window (e.g., an alpha screen) 617 may be displayed in response to a lining input, which traverses a screen, as in the case of the second screen 620. In contrast, the second window (e.g., an alpha screen) 617 may be cancelled in response to a return input, for example, a lining input which traverses a screen in an opposite direction, and the current state may be changed to the state of displaying the default screen 600.

According to an embodiment of the present disclosure, in the state of displaying the default screen 600, the third screen on which at least two windows 625 and 627 all having a ratio of 4:3 are disposed with a folded part of the display as a reference, may be displayed in response to the type of event related to screen division.

According to an embodiment of the present disclosure, switching from the above-described default screen 600 to the first screen 610 or the second screen 620, and switching from the above-described default screen 600 to the third screen 630 may be achieved with an event for screen division as a reference. Examples of the event for screen division may include a change of a folding state, an input (or a touch/hovering/swipe input) which traverses at least part in one direction on the display 460, an input which moves from a first end along a widthwise direction of the display 460 or a position close to the first end to a second end located on the opposite side of the first end or a position close to the second end, a touch input in the case where a position at which the touch input has occurred continues to be touched during a predetermined time period, a change in touch strength, a folding/bending/motion input for folding or bending the electronic device, a voice input, the selection of a software button (or a toggle button) displayed on the display 460, and/or the like.

According to an embodiment of the present disclosure, when the above-described event is detected, at least two screen ratios which configure the display 460 may be set in response to the detection of the event. For example, whenever a toggle button displayed on the display 460 is selected, at least two screen ratios which configure the display 460 may be changed.

According to an embodiment of the present disclosure, when the above-described event is detected, switching between the first screen 610 or the second screen 620 and the third screen 630 may be achieved in response to the detection of the event.

Also, returning from one of the first screen 610 to the third screen 630 to the default screen 600 may be achieved in response to an event for screen return. Here, examples of the event for screen return may include an input (or a touch/hovering/swipe input) which traverses at least part in a direction opposite to one direction on the display 460, an input which moves from a second end located on the opposite side of a first end along a widthwise direction of the display 460 to the first end or a position close to the first end, an unfolding/motion input for unfolding the electronic device, a voice input, the selection of a software button (or a toggle button) displayed on the display 460, and/or the like.

FIG. 6B is a view illustrating various states of an electronic device according to various embodiments of the present disclosure.

The flexible electronic device (e.g., the electronic device 101, 201, or 401) may facilitate implementation of various folding or unfolding states, as illustrated in FIG. 6B. The flexible electronic device may implement a diverse arrangement of folded and unfolded states, as illustrated therein. The folded state 600a illustrates the electronic device being completely folded, such that both end parts of the electronic device contact each other or come as close as possible to each other. An unfolded state 600b illustrates the electronic device being completely unfolded. A state 600c illustrates a particular state including displaying a window for an overlay scheme, when the electronic device is bent at a preset angle or more with one axis as a reference. Further, a compact standing state is illustrated at 600d, in which the electronic device stands partially upright, for example, when partially inwardly folded towards the display, roughly into one-half portions. Finally, an arc standing state is shown in 600e in which the electronic device may be stood, when folded so as to facilitate presentation of a landscape orientation of the display. In the state illustrated under 600c, in which the window of the overlay scheme is displayed, and in the compact standing state illustrated in 600d, in which the electronic device is stood upright while partially inwardly folded, a folding ratio may be implemented correlating to the fact that the electronic device is folded in half, with the middle-axis of the electronic device utilized as a reference point. However, it is understood that folding ratios may be implemented differently, in which other parts of the display may serve as the axis when the display is folded.

As described above, the flexible electronic device may be folded or bent with one axis as a reference. Here, one axis may be preset or 'optional' (e.g., user designated). The preset axis may indicate or correlate to a device in which a particular area (e.g., a partial area including the axis) of the display of the flexible electronic device is implemented with the capacity to be folded or otherwise bent. In contrast, the 'optional' axis may indicate that the entire area (or length) of the display of the flexible electronic device has the capacity to be folded or bent. In FIG. 6B, the electronic device is illustrated as being folded along an axis passing through the center of the electronic device as a reference. That said, it should be understood that the location of this folding axis is not limited to the example embodiments shown in FIG. 6B.

FIGS. 7A to 7E are views illustrating an operating method of an electronic device according to various embodiments of the present disclosure.

Figures 7A, 7B:
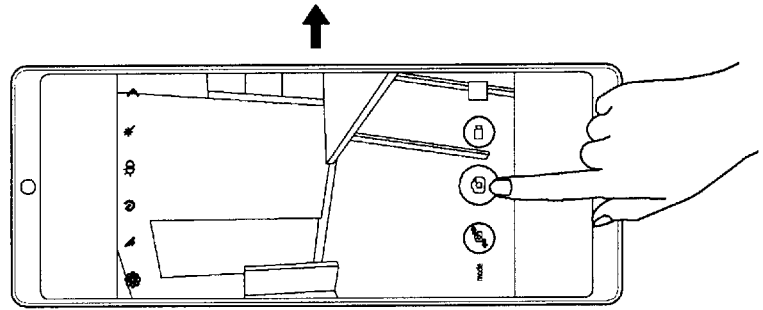
FIG. 7A, FIG. 7B, FIG. 7C, FIG. 7D and FIG. 7E are views illustrating an operating method of an electronic device according to various embodiments of the present disclosure.
Figure 7C:
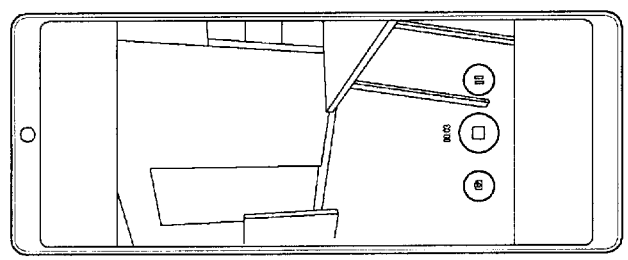

Referring to FIG. 7C, the electronic device (e.g., the electronic device 101, 201, or 401) may detect a preset user input while folded (e.g., in a folded state). For example, the user input may include detecting knocking (or tapping) on the sub-display 162 once or preset number of knocks or taps, clicking on the power/lock button once or a present number of clicks, and/or a voice command.

In a state where the electronic device is unfolded immediately prior to being folded, the electronic device may detect a user input selecting a camera application, or initiating capturing of video. Thus, referring to FIG. 7A, the electronic device may detect a user input which selects a camera application or capturing of a video. Referring to FIG. 7B, the electronic device may initiate capturing of a video in response to the user input.

When the electronic device is folded while executing the camera application or the capturing the video, the electronic device may wait (e.g., listen) for a preset user input while simultaneously turning off a screen and/or stopping the capturing of a video.

As illustrated in FIG. 7C, when the preset user input is detected while the device is folded, the electronic device may initiate capturing of a video while folded. For example, in response to the user input, the electronic device may execute the camera application to capture the video, or may resume the capturing of video which was previously paused or otherwise stopped.

Figure 7D:
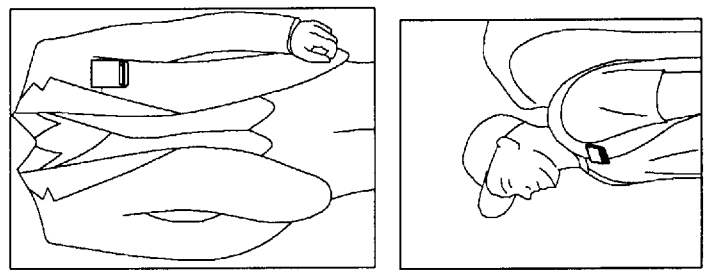

A user may therefore capture a video when the device is folded, utilizing the electronic device in a 'clipped' form as in FIG. 7D. As illustrated therein, this allows the device to be clipped to the user (e.g., by a pocket or a strap, and/or the like), allowing the device to function as an 'action camera,' as illustrated in FIG. 7D.

Figure 7E:
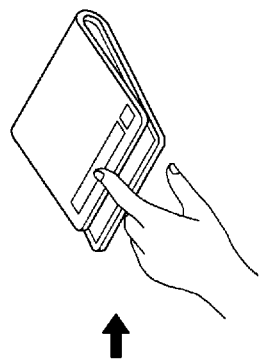

Referring to FIG. 7E, when the electronic device detects the preset user input or a user input of another type, the electronic device may stop the capturing of the video.

FIG. 8 is a view illustrating a method for providing a screen ratio by an electronic device according to various embodiments of the present disclosure.

Figure 8A:
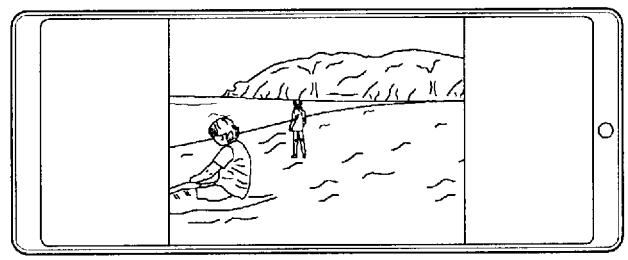
FIG. 8A, FIG. 8B, FIG. 8C and FIG. 8D are views illustrating a method for providing a screen ratio by an electronic device according to various embodiments of the present disclosure.
Figure 8B:
Figure 8C:
Figure 8D:
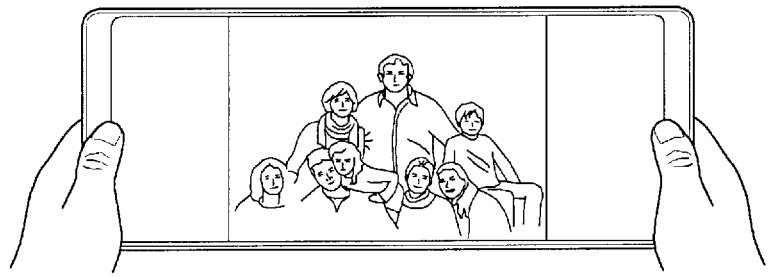

Referring to FIG. 8A, the electronic device (e.g., the electronic device 101, 201, or 401) may display an original image at a default screen ratio of 4:3 on the display (e.g., the display 460). Referring to FIG. 8B, the electronic device may display an image, which is implemented by cropping the original image at a screen ratio of 21:9 on the display. Referring to FIG. 8C, the electronic device may display an image, which is implemented by cropping the original image, at a screen ratio of 24:9 on the display. Referring to FIG. 8D, the electronic device may display an image at the default screen ratio, and may facilitate a user's holding of the electronic device by providing a space left on the left and right sides of the image, in which no image is displayed.

Figure 9A:
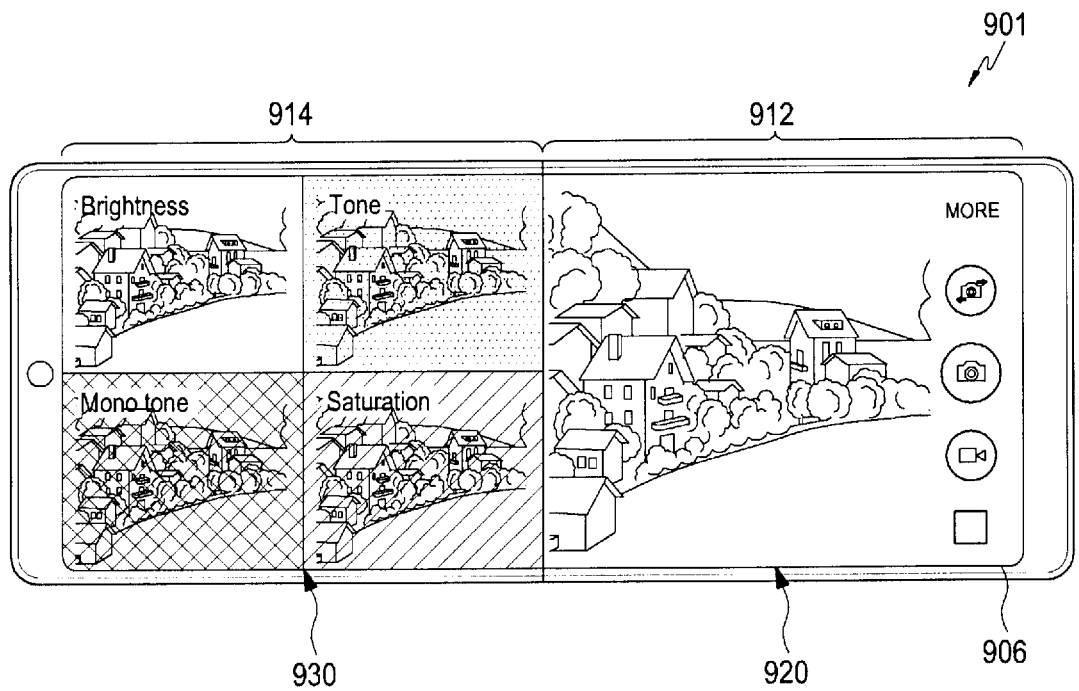
FIG. 9A, FIG. 9B and FIG. 9C are views illustrating a method for controlling a display by an electronic device according to various embodiments of the present disclosure.
Figure 9B:
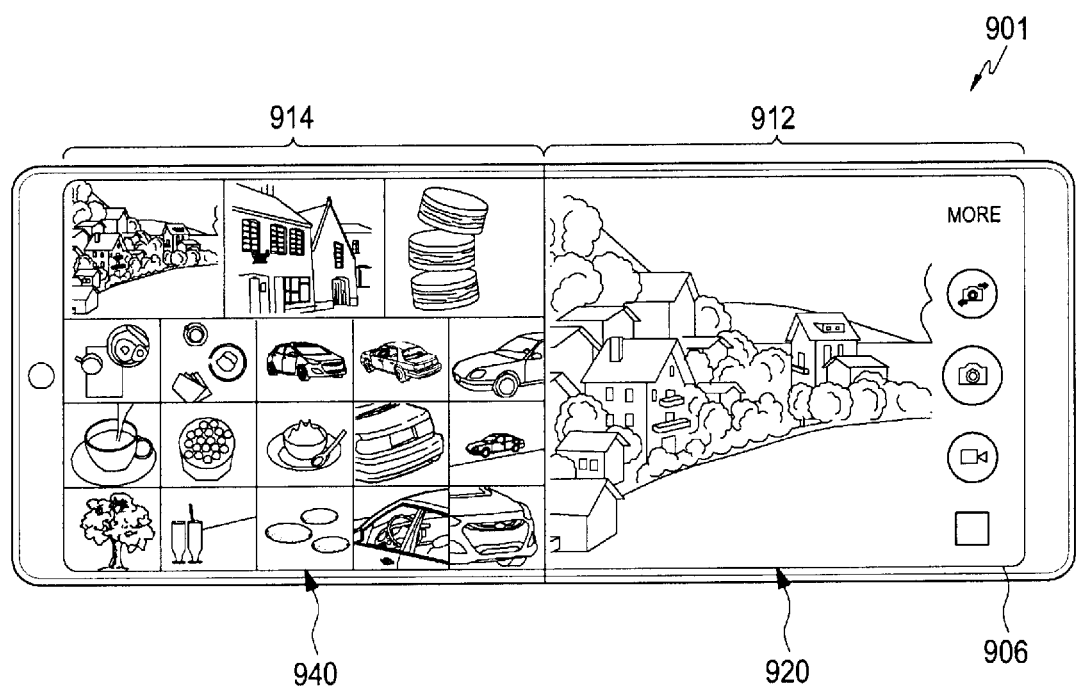
Figure 9C:
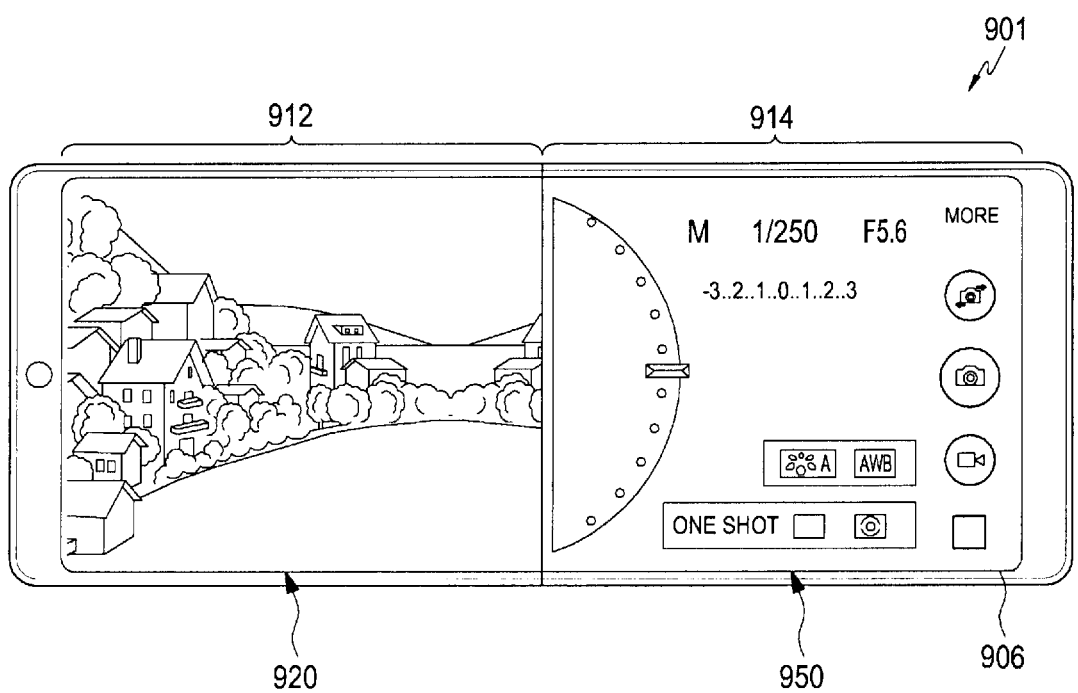

FIGS. 9A to 9C are views illustrating a method for controlling a display by an electronic device according to various embodiments of the present disclosure.

Referring to FIG. 9A, a screen division may facilitate image editing. As illustrated therein, a processor (e.g., the processor 210 or 420) of the electronic device 901 (e.g., the electronic device 101, 201, or 401) may automatically configure a first area 912 and a second area 914 in at least a partial area (or a full screen) of the display 906 of the electronic device 901, in response to an input (e.g., a swipe input which at least partially traverses a screen) requesting execution of screen division. The processor may display a first graphic element 920 (e.g., a screen/graphical interface of a camera application), which includes a preview image, in the first area 912, and may display a second graphic element 930, which includes at least one preview image to which a special effect (e.g., a brightness effect, a monotone effect, a tone effect, a saturation effect, and/or the like) is applied, in the second area 914.

Referring to FIG. 9B, the processor may automatically display the first graphic element 920 in the first area 912 in response to an input (e.g., a swipe input which at least partially traverses a screen) requesting screen division, and may display a second graphic element 940, which includes captured images (or icons) stored in memory of device in the second area 914.

Referring to FIG. 9C, the screen division may facilitate image or video capturing options. For example, the processor may automatically display the first graphic element 920 (e.g., a preview for image capture) in the first area 912 in response to an input (e.g., a swipe input which at least partially traverses a screen) requesting screen division, and may display a second graphic element 950, which includes multiple selectable objects for setting various configurable attributes of the camera application, in the second area 914, and receive inputs to these attributes altering how an image or video is to be captured.

FIGS. 10A to 10E are views each explaining a method for controlling a display by an electronic device according to various embodiments of the present disclosure.

Figure 10A:
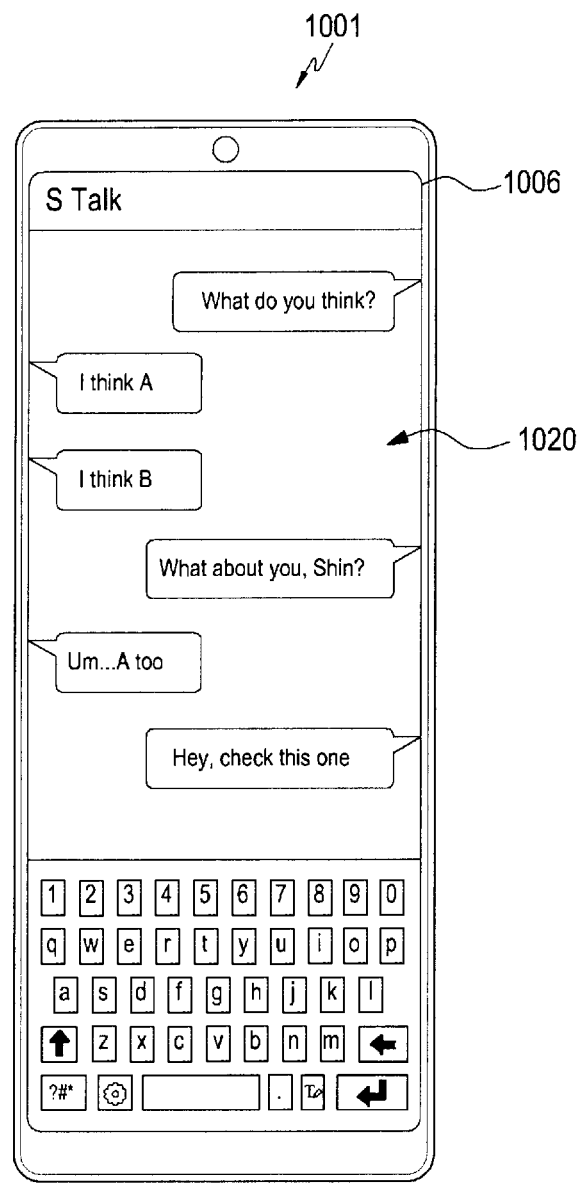
FIG. 10A, FIG. 10B, FIG. 10C, FIG. 10D and FIG. 10E are views each explaining a method for controlling a display by an electronic device according to various embodiments of the present disclosure.

Referring to FIG. 10A, a processor (e.g., the processor 210 or 420) of the electronic device 1001 (e.g., the electronic device 101, 201, or 401) may display a first graphic element 1020 (e.g., a screen/graphical interface of a message/Social Network Service (SNS) application), which is related to a first application (e.g., the message/SNS application), in at least a partial area (or a full screen) of a display 1006 of the electronic device 1001.

Figure 10B:
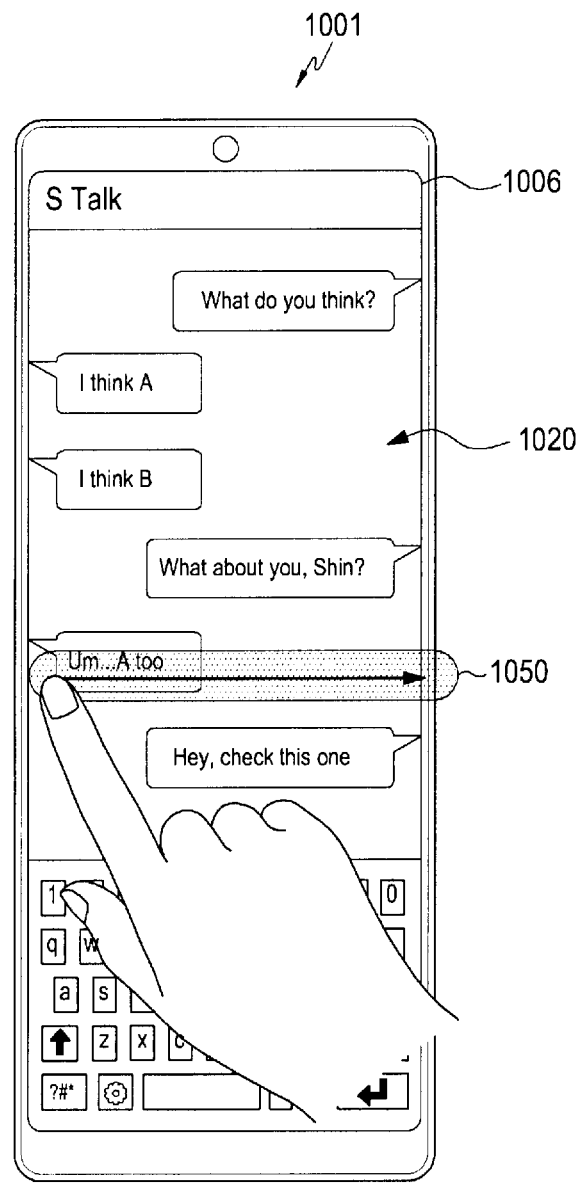
Figure 10C:
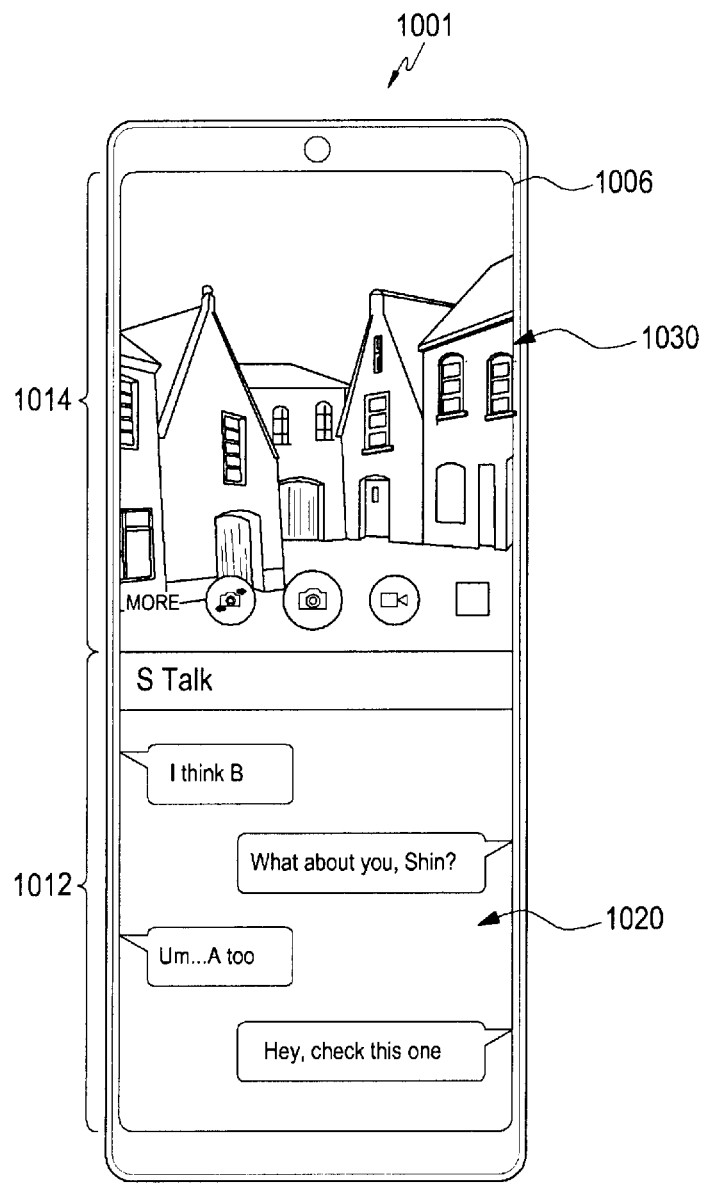

Referring to FIGS. 10B and 10C, the processor may configure a first area 1012 and a second area 1014 in at least a partial area in response to a touch input 1050 traversing the display 1006 at least partially in a first direction (e.g., a "swipe" or "swiping" motion). In response, the processor may reduce and display the first graphic element 1020 in the first area 1012. By the reduction of the first graphic element 1020, the processor may display a second graphic element 1030 (e.g., a screen/graphical interface of a camera application), which may be related to a second application (e.g., the camera application), in the second area 1014.

Figure 10D:
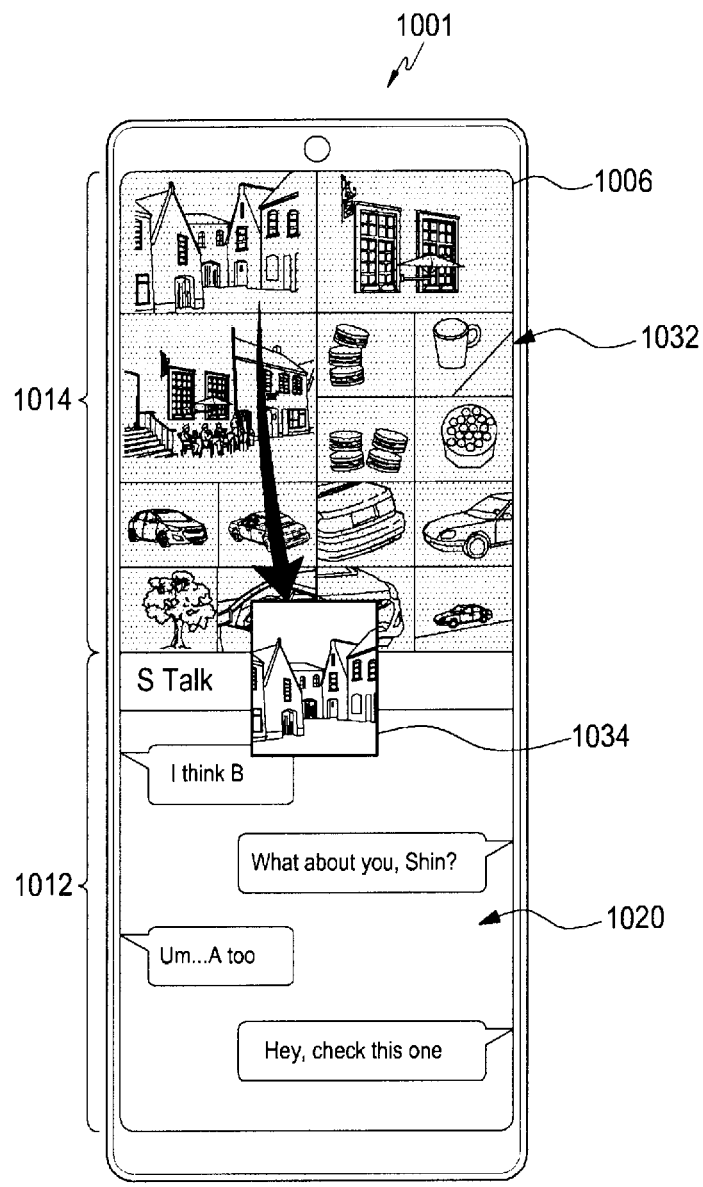

Referring to FIG. 10D, the processor may display a graphic element 1032, which includes the captured images (or icons) stored in a memory in the second area 1014 responsive to an input (e.g., the selection of an image-capturing button of a camera application) which selects image-capturing. In response to a second input selecting at least one object 1034 (e.g., an icon, an image, and/or the like) of the graphic element 1032 (or dragging it, as depicted in FIG. 10D), the processor may transmit at least one file, image, or document corresponding to or otherwise represented by the at least one object 1034, to an external electronic device through a communication interface (e.g., the communication interface 470) that is functionally connected to the electronic device 1001.

Figure 10E:
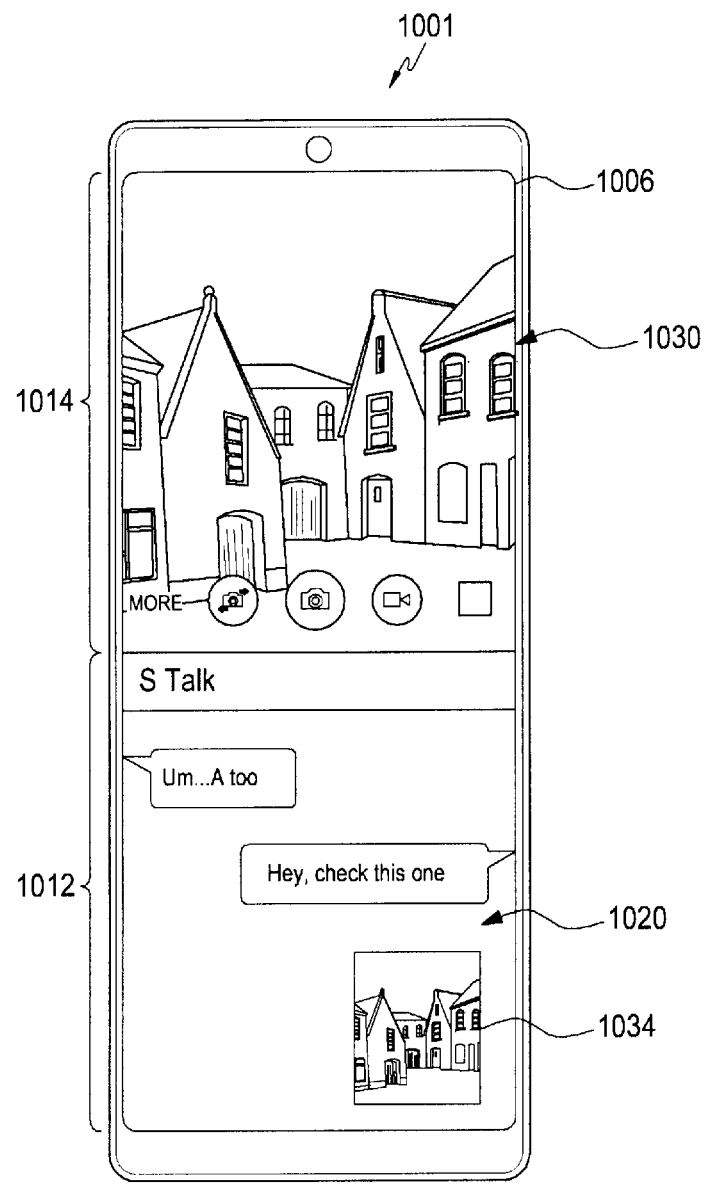

Referring to FIG. 10E, the processor may display the at least one object 1034 on the first graphic element 1020 as seen therein. For example, the processor may display an icon (e.g., a thumbnail or a reduced image), which corresponds to the transmitted image, in a chat window of a message/SNS application.

FIGS. 11A to 11E are views illustrating a method for controlling a display by an electronic device according to various embodiments of the present disclosure, particularly for recommending various information related to a currently detected location.

Figure 11A:
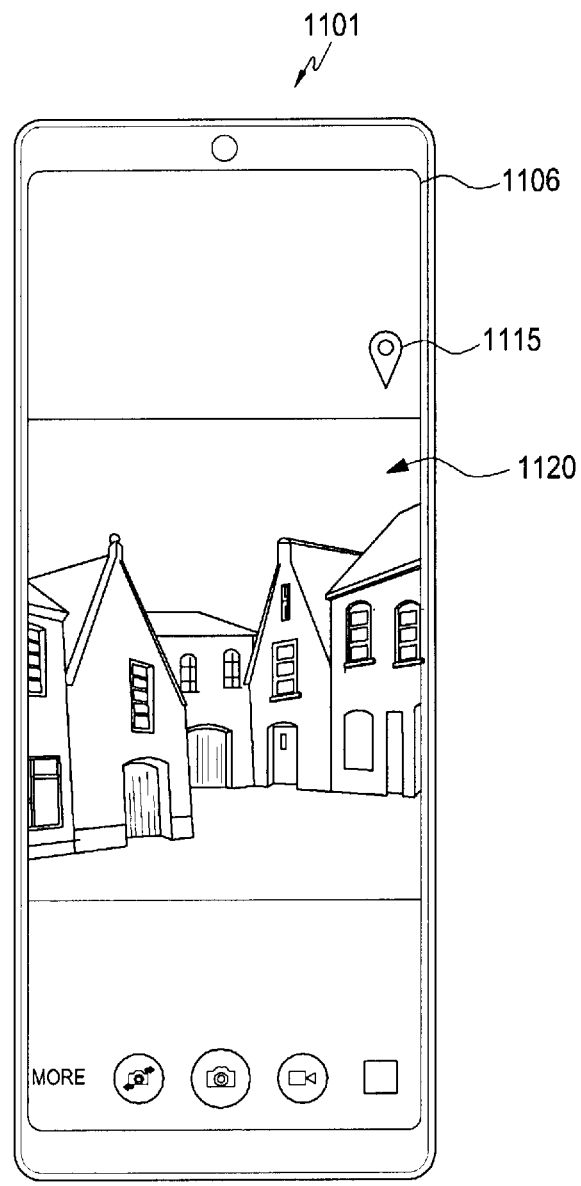
FIG. 11A, FIG. 11B, FIG. 11C, FIG. 11D and FIG. 11E are views illustrating a method for controlling a display by an electronic device according to various embodiments of the present disclosure.

Referring to FIG. 11A, a processor (e.g., the processor 210 or 420) of the electronic device 1101 (e.g., the electronic device 101, 201, or 401) may display a first graphic element 1120 (e.g., a screen/graphical interface of a camera application), which is related to a first application (e.g., the camera application), in at least a partial area (or a full screen) of a display 1106 of the electronic device 1101.

The processor may search a memory (e.g., the memory 430) or a server (e.g., the server 406) for recommendation information related to a current location, and may display an indicator 1115, indicating the existence of location-based recommendation, according to a result of the search.

Figure 11B:
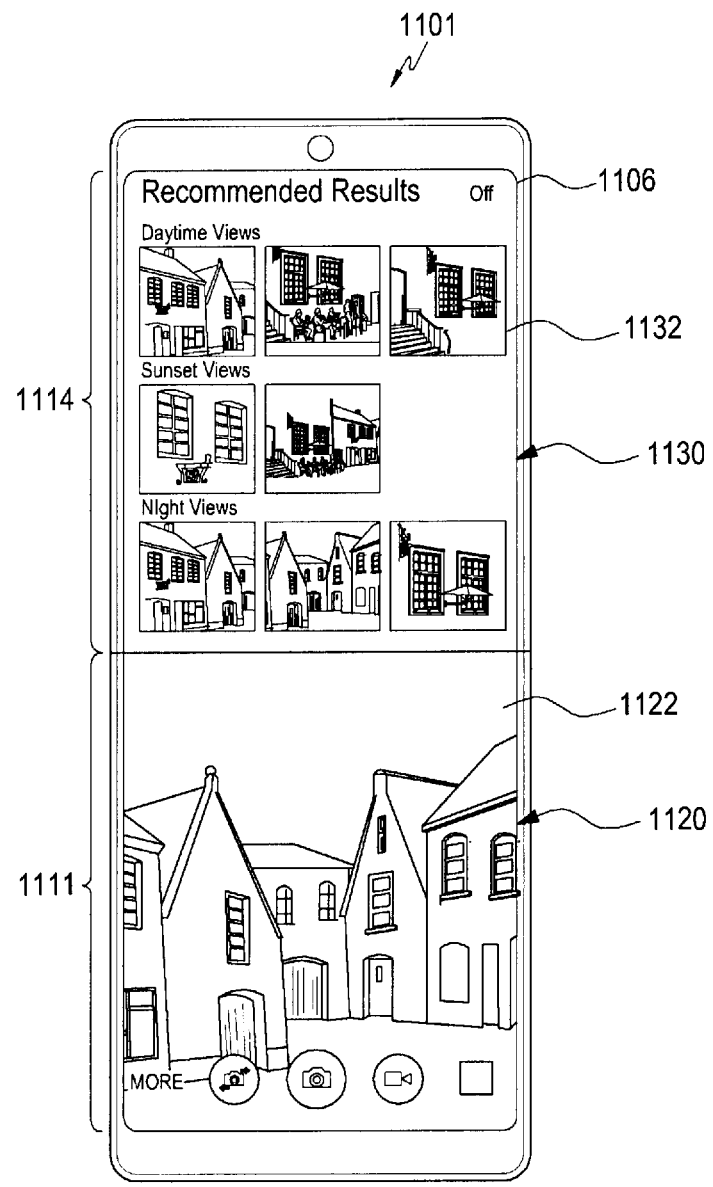

Referring to FIG. 11B, the processor may configure a first area 1111 and a second area 1114 in the at least partial area (or a full screen) in response to an input selecting the indicator 1115. The processor may reduce and display the first graphic element 1120 in the first area 1111. The processor may display a second graphic element 1130 (e.g., a list of images/icons), which includes multiple objects 1132 recommended in relation to the current location, in the second area 1114.

For example, the processor may display images (or icons of the images), which have been obtained by image-capturing a subject 1122 to be image-captured in a preview image included in the first graphic element 1120, in the second area 1114. The processor may make a search on the basis of at least one piece of information among current location information and preview image information. The processor may determine images, which are to be recommended, or priorities of the images on the basis of at least one of image-capturing near the current location, the number of references/recommendations, the accuracy of matching with the subject 1122 to be image-captured, and the existence of an image-capturing setting value.

Figure 11C:
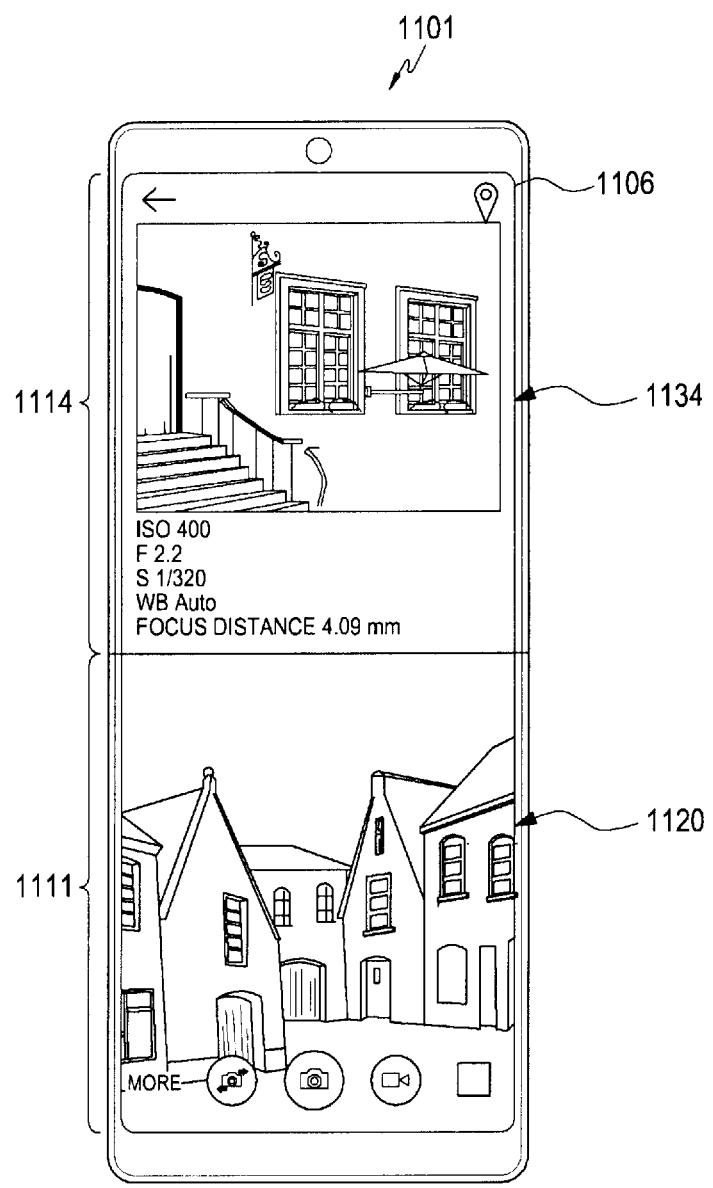

Referring to FIG. 11C, the processor may display a graphic element 1134 (e.g., at least one image-capturing setting value of a relevant image, and/or the like), corresponding to one object 1132 (e.g., an image or an icon) of the second graphic element 1130, in the second area 1114 in response to an input which selects the object 1132. For example, the graphic element 1134 may include at least one image-capturing setting value among International Standardization Organization (ISO), an F-number, a shutter speed, white balance information, and a focus distance.

Figure 11D:
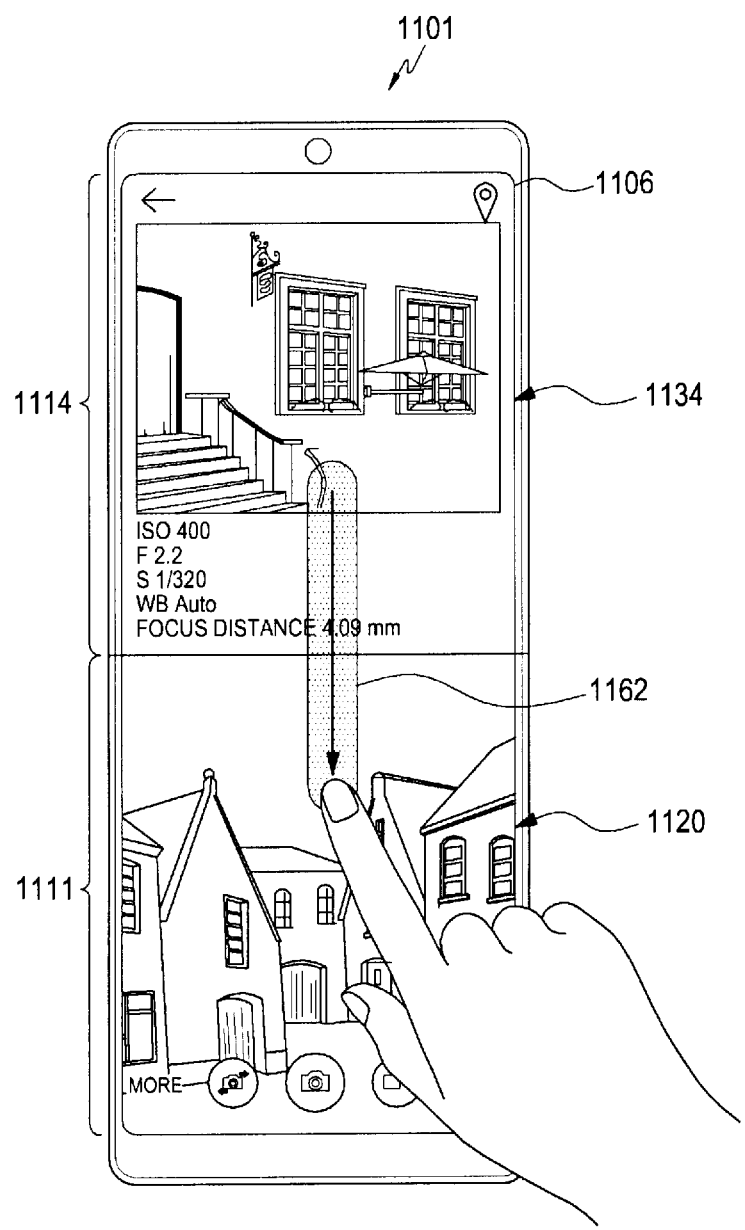

Referring to FIG. 11D, the processor may apply at least one setting value of the graphic element 1134 to the first application in response to an input 1162 (e.g., a swipe input directed to the first graphic element 1120 from the graphic element 1134) related to the graphic element 1134. For example, the processor may control a camera application to change at least one setting value of the camera application to at least one setting value of the selected graphic element 1134 or the selected image.

According to an embodiment of the present disclosure, the processor may output information for guiding to an image-capturing place of the relevant image (e.g., the selected graphic element 1134 or the selected image), or may output an alarm/notification when the current location coincides with or is close to the image-capturing place.

Figure 11E:
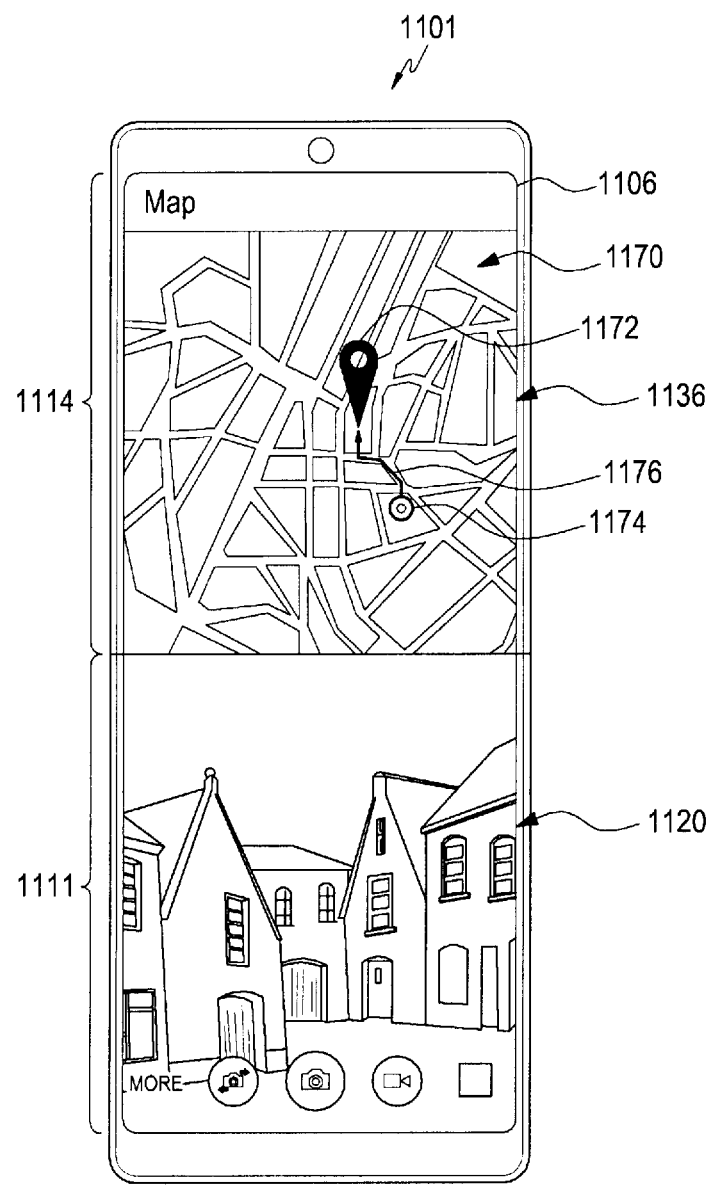

Referring to FIG. 11E, in response to an input selecting the one object 1132 (e.g., an image or an icon) of the second graphic element 1130, the processor may display a graphic element 1136, which includes an image-capturing place 1172 of the selected object 1132 or the relevant image, a current location 1174, and a path 1176 for moving to the image-capturing place, in the second area 1114. The graphic element 1136 may include a map 1170 or a screen/graphical interface of a map application.

For example, when the current location coincides with the image-capturing place or is close to the image-capturing place within a preset distance range, the processor may output an alarm/notification, or may control a first application so as to activate the first application.

FIGS. 12A, 12B, 13A and 13B are views illustrating image-capturing methods according to various states of an electronic device according to various embodiments of the present disclosure.

Figure 12A:
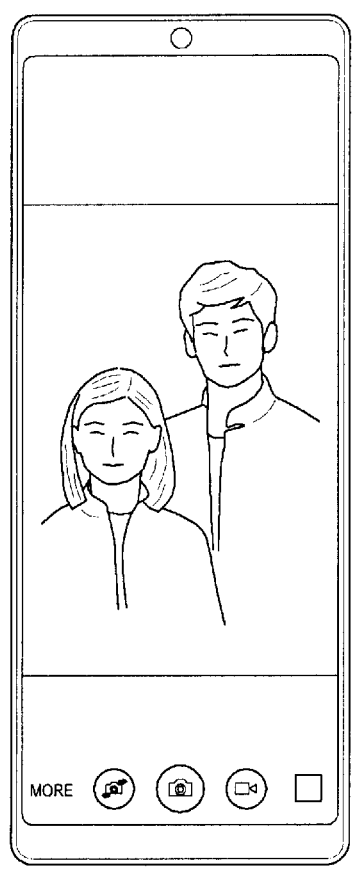
FIG. 12A, FIG. 12B, FIG. 13A and FIG. 13B are views illustrating image-capturing methods according to various states of an electronic device according to various embodiments of the present disclosure.
Figure 12B:
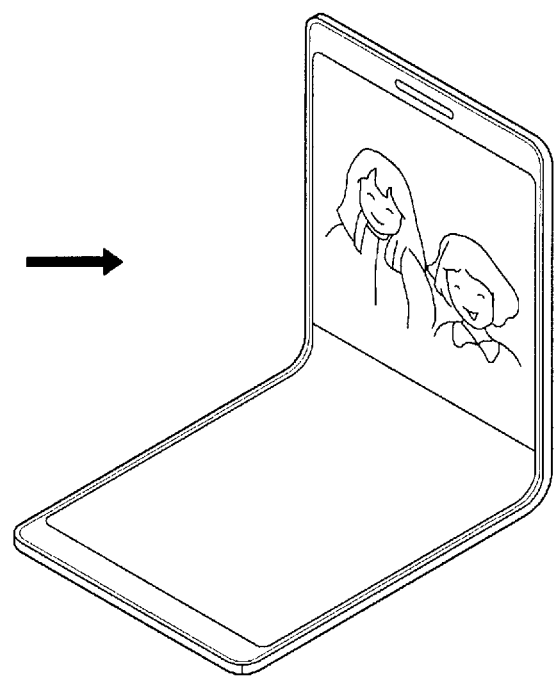

In the case of self-image-capturing (e.g., capturing a "selfie"), the electronic device (e.g., the electronic device 101, 201, or 401) may be switched from a state in which the electronic device is completely unfolded, as illustrated in FIG. 12A, to a compact standing state in which the electronic device is inwardly folded in half (e.g., folded so the screens approach one another), as illustrated in FIG. 12B, which may facilitate a user to capture a 'selfie' image in a hands-free state. That is, the device may be set on a surface away from the user, but facing the user and any other subjects of the image. For example, the user may execute image-capturing using a timer image-capturing function (by, for example, selection of a displayed menu or item), and/or a user input utilizable from a distance (e.g., a voice command sensed by a microphone, the display of a preset gesture sensed by a camera, and/or the like).

Figure 13A:
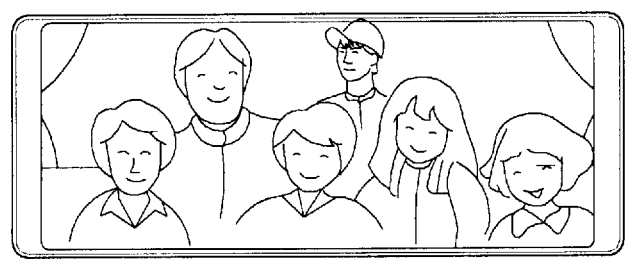
Figure 13B:
Figure 13B:
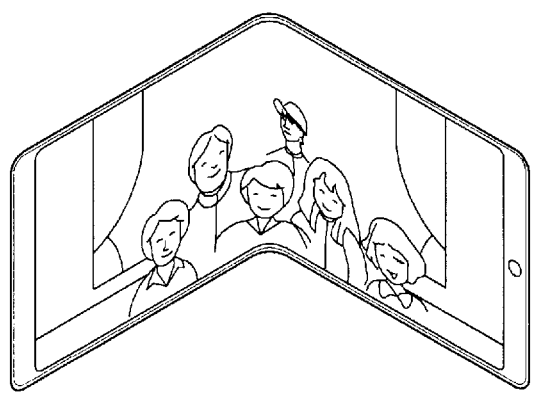

In the case of "we-fie" image-capturing (e.g., a selfie but including a plurality of persons), the electronic device (e.g., the electronic device 101, 201, or 401) is switched from a state in which the electronic device is completely unfolded as illustrated in FIG. 13A to an "arc" standing state, in which the electronic device is folded into a landscape mode as illustrated in FIG. 13B, and thereby may allow more persons to be image-captured.

Figure 14:
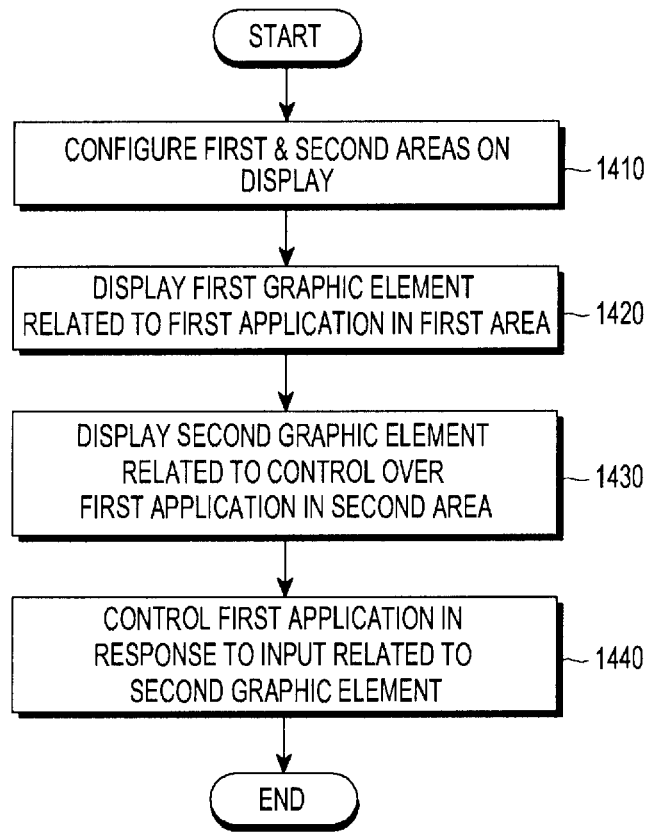
FIG. 14 is a flowchart illustrating a method for controlling a display by an electronic device according to various embodiments of the present disclosure.

FIG. 14 is a flowchart illustrating a method for controlling a display by an electronic device according to various embodiments of the present disclosure. The image providing method may include operations 1410 to 1440. Hereinafter, although the display control method is described as being performed by the electronic device (e.g., the electronic device 101, 201, or 401), the display control method may be performed by a processor (e.g., the processor 210 or 420) of the electronic device or by a controller of the electronic device.

In operation 1410, the electronic device may configure a first area and a second area on a display (e.g., the display 460) that is functionally connected to the electronic device. For example, the electronic device may divide at least part of an entire display area (or a full screen) of the display into multiple areas (e.g., a first area and a second area).

In an embodiment of the present disclosure, the electronic device may detect at least one of an input (or a touch/hovering/swipe input) which at least partially traverses the display, an input which moves from a first end along a widthwise direction of the display or a position close to the first end to a second end located on the opposite side of the first end or a position close to the second end, a folding/bending/motion input for folding or bending the electronic device, and a voice input. The electronic device may configure a first area and a second area on the display in response to the input. For example, at least part of an entire display area (or a full screen) of the display may be divided into multiple areas (e.g., a first area and a second area) in a lengthwise direction. For example, the electronic device may divide the entire display area (or the full screen) of the display into a first area and a second area in the lengthwise direction in response to the input.

In operation 1420, the electronic device may display a first graphic element, which is related to a first application, in the first area of the display. For example, the electronic device may display a screen generated by the first application or by the execution of the first application, a screen/graphical interface of the first application, or an image/document/text/moving image reproduced/displayed by the first application, as the first graphic element in the first area.

In operation 1430, the electronic device may display a second graphic element, which is related to control over the first application, in the second area of the display. For example, the electronic device may display a screen generated by the first application or a second application or by the execution thereof, a screen/graphical interface of the first or second application, or an image/document/text/moving image reproduced/displayed by the first or second application, as the second graphic element in the second area. For example, the first and second graphic elements may be identical or different.

In an embodiment of the present disclosure, the electronic device may display a graphical interface, that includes multiple objects corresponding to multiple images, as the second graphic element in the second area. For example, the graphical interface may correspond to a list of icons.

In an embodiment of the present disclosure, the electronic device may display a graphical interface, that includes at least one selectable object for setting at least one attribute of the first graphic element, as the second graphic element in the second area. For example, the attribute may include at least one of the color, size, and shape/form/font of text/image.

In operation 1440, the electronic device may control the first application in response to an input related to the second graphic element.

In an embodiment of the present disclosure, the electronic device may detect an input which selects one of multiple objects which correspond to multiple images and are included in a graphical interface corresponding to the second graphic element. The electronic device may control the first application to display an image or a web page, which corresponds to the selected object, in the first area in response to the input.

In an embodiment of the present disclosure, the electronic device may detect an input which selects one of multiple selectable objects for setting multiple attributes of the first graphic element or first application which are included in a graphical interface corresponding to the second graphic element. The electronic device may control the first application to change the attribute of the first graphic element or first application, which corresponds to the selected object, in response to the input.

In an embodiment of the present disclosure, the electronic device may detect an input for changing a part of a document corresponding to the second graphic element. The electronic device may control the first application to display the changed part of the document in each of the first and second areas in response to the input.

In an embodiment of the present disclosure, the electronic device may detect an input which selects one of multiple objects included in the second graphic element. The electronic device may control the first application to transmit a file or an image corresponding to the selected object to an external device through a communication interface (e.g., the communication interface 470), that is functionally connected to the electronic device, in response to the input.

In an embodiment of the present disclosure, the electronic device may detect an input related to a graphical interface of the second application corresponding to the second graphic element. The electronic device may control the first application to transmit at least part of the graphical interface of the second application or the input (e.g., a handwriting input) (or at least part of the graphical interface of the second application including the handwriting input) to an external device through the communication interface in response to the input.

In an embodiment of the present disclosure, the electronic device may receive an input (e.g., a handwriting input) related to the graphical interface of the second application from an external device through the first application. The electronic device may display the input on the graphical interface of the second application in response to the input.

In an embodiment of the present disclosure, the electronic device may detect an input which selects an image which is related to a current location and is included in the graphical interface corresponding to the second graphic element. The electronic device may control the first application to change at least one setting value of the first application to at least one setting value of the selected image in response to the input. Alternatively, the electronic device may control the first application to output information, which is related to an image-capturing place of the selected image, through an input/output interface (e.g., the input/output interface 450) or the display in response to the input.

Figure 15:
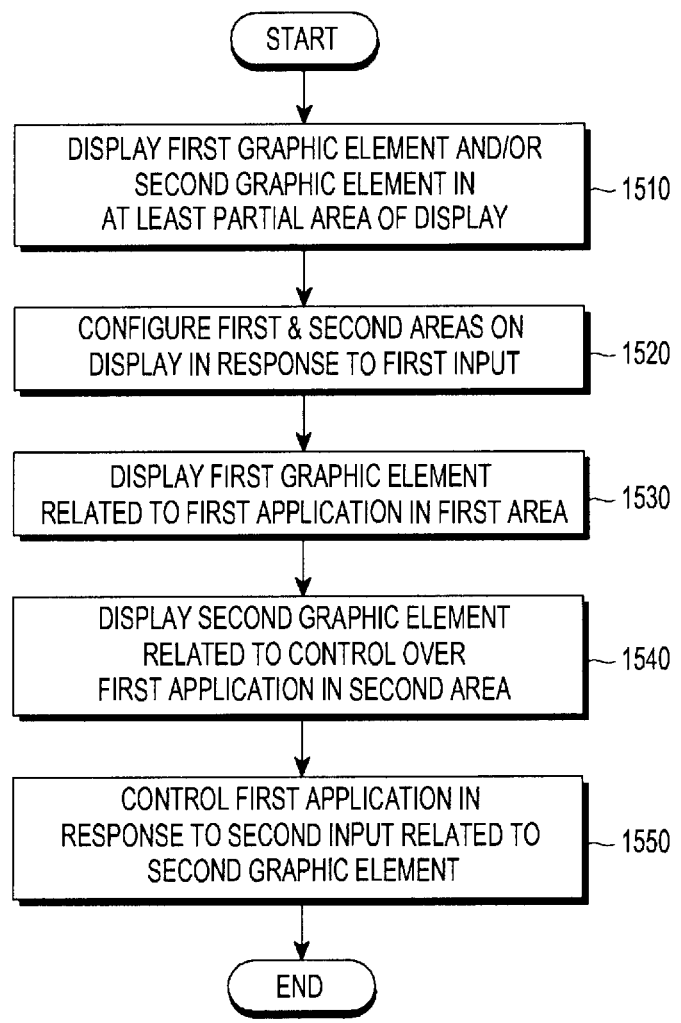
FIG. 15 is a flowchart illustrating a method for controlling a display by an electronic device according to various embodiments of the present disclosure.

FIG. 15 is a flowchart illustrating a method for controlling a display by an electronic device according to various embodiments of the present disclosure. The image providing method may include operations 1510 to 1550. Hereinafter, although the display control method is described as being performed by the electronic device (e.g., the electronic device 101, 201, or 401), the display control method may be performed by a processor (e.g., the processor 210 or 420) of the electronic device or by a controller of the electronic device. Operations 1520 to 1550 are similar to operations 1410 to 1440 illustrated in FIG. 14, respectively, and thus, a repeated description thereof will be omitted.

In operation 1510, the electronic device may display one of a first graphic element related to a first application and a second graphic element related to control over the first application, in at least a partial area (or a full screen) of a display (e.g., the display 160 or 460) that is functionally connected to the electronic device.

In operation 1520, the electronic device may configure a first area and a second area in at least a partial area of the display in response to a first input. For example, the electronic device may divide the at least partial area into a first area and a second area. For example, the first input may be at least one of a touch input, an input (or a touch/hovering/swipe input) which at least partially traverses the display, a folding/bending/motion input for folding or bending the electronic device, and a voice input.

In operation 1530, the electronic device may display the first graphic element in the first area.

In operation 1540, the electronic device may display the second graphic element in the second area.

In operation 1550, the electronic device may control the first application in response to a second input related to the second graphic element. For example, the second input may be a touch input which selects an object included in the second graphic element. For example, the electronic device may control the first application to display a graphic element/image/document/page, which corresponds to the second input, in the first area. For example, the electronic device may control the first application to change an attribute of the first graphic element according to the second input.

FIGS. 16A to 16D are views illustrating a method for controlling a display by an electronic device according to various embodiments of the present disclosure.

When a user shares a document, a photograph, a moving image, and/or the like with another person, the user may display a screen 1606 so as to distinguish an area shared with another person from an area (i.e., a non-shared area) for controlling the shared area, through an operation of folding the electronic device 1601 (e.g., the electronic device 101, 201, or 401).

Figure 16A:
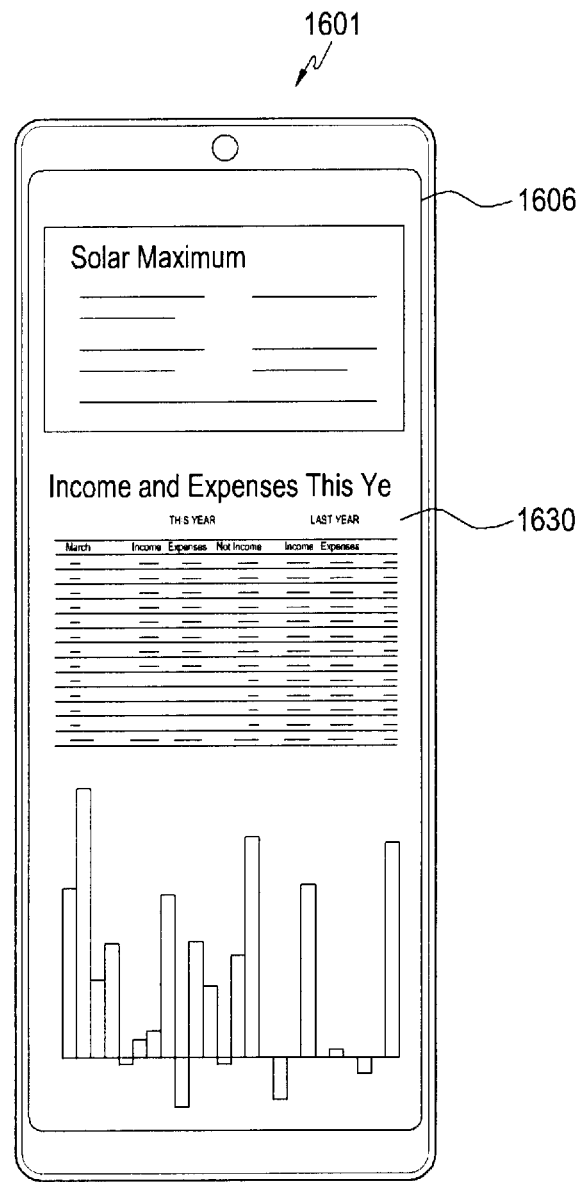
FIG. 16A, FIG. 16B, FIG. 16C and FIG. 16D are views illustrating a method for controlling a display by an electronic device according to various embodiments of the present disclosure.

Referring to FIG. 16A, a processor (e.g., the processor 210 or 420) of the electronic device 1601 may display a second graphic element 1630 (e.g., a file, a document or a page search window within the document, a list of images/icons, and/or the like) related to control of a first application (e.g., a word processing application or a presentation application), in at least a partial area (or a full screen) of the display 1606 of the electronic device 1601.

Figure 16B:
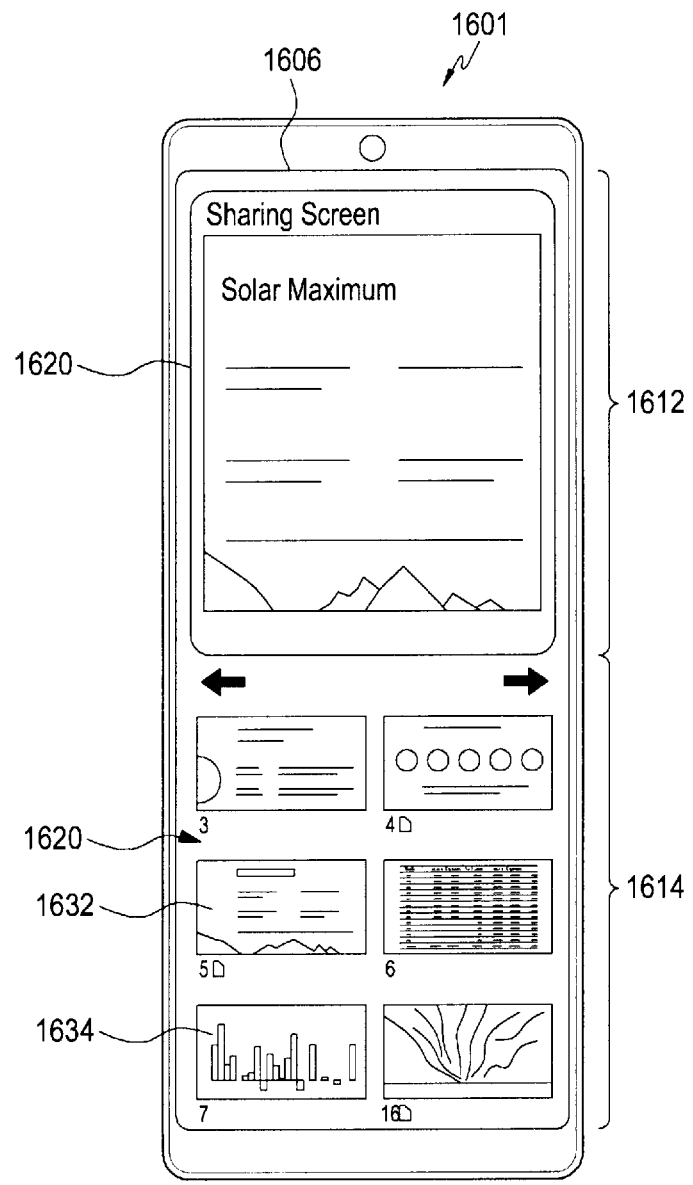

Referring to FIG. 16B, the processor may configure a first area 1612 and a second area 1614 in the at least partial area in response to an input corresponding to or including folding the electronic device 1601. The processor may display, in the first area 1612, a first graphic element 1620 (e.g., a first document or a first page within the first document), which corresponds to a first object 1632 (e.g., a first icon) included in the second graphic element 1630, according to a user selection or an automatic/default configuration which is related to the first application. The processor may reduce and display the second graphic element 1630 in the second area 1614.

Figure 16C:
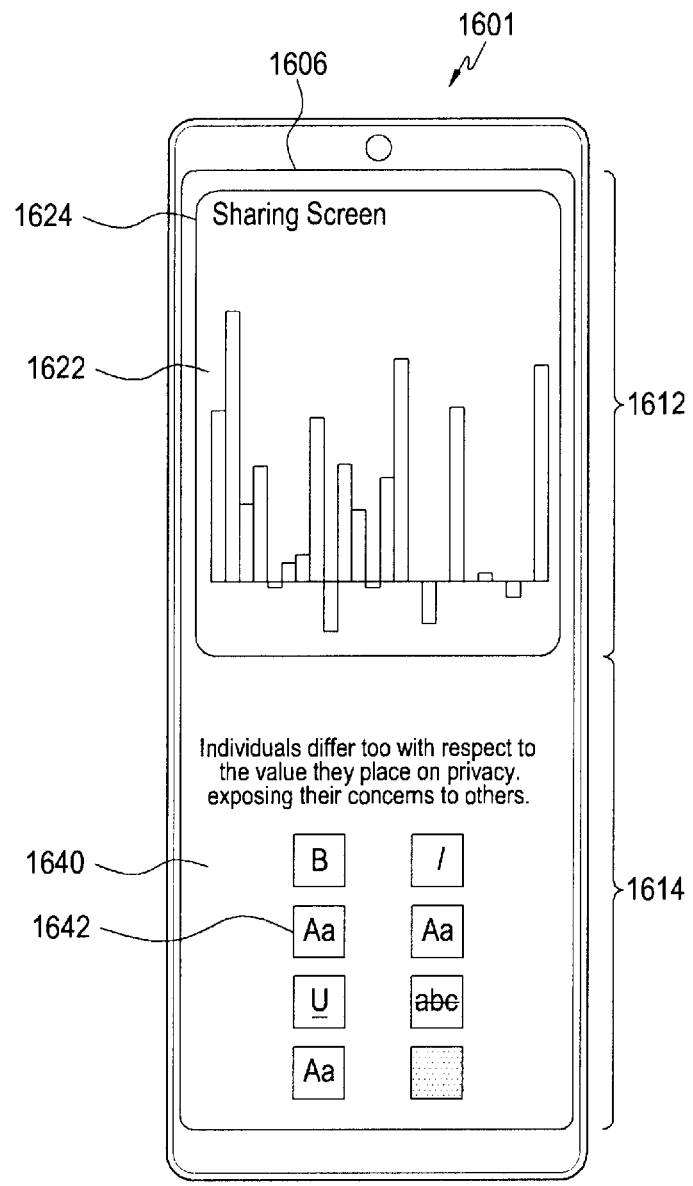

Referring to FIG. 16C, the processor may display a graphic element 1622 (e.g., a second document or a second page within the second document), which corresponds to a second object 1634 (e.g., a second icon) of the second graphic element 1630, in the first area 1612 in response to a second input selecting the second object 1634. For example, the processor may display, in the second area 1614, a graphical interface 1640 including at least one selectable object for setting at least one attribute of the graphic element 1622 or at least one object 1624 included in the graphic element 1622. For example, when an object 1642 for color change included in the graphical interface 1640 is selected, the processor may change the color of the object 1624 included in the graphic element 1622.

In an embodiment of the present disclosure, the processor may display the graphical interface 1640 together with the first graphic element 1620 in place of the second graphic element 1630 illustrated in FIG. 16B.

Figure 16D:
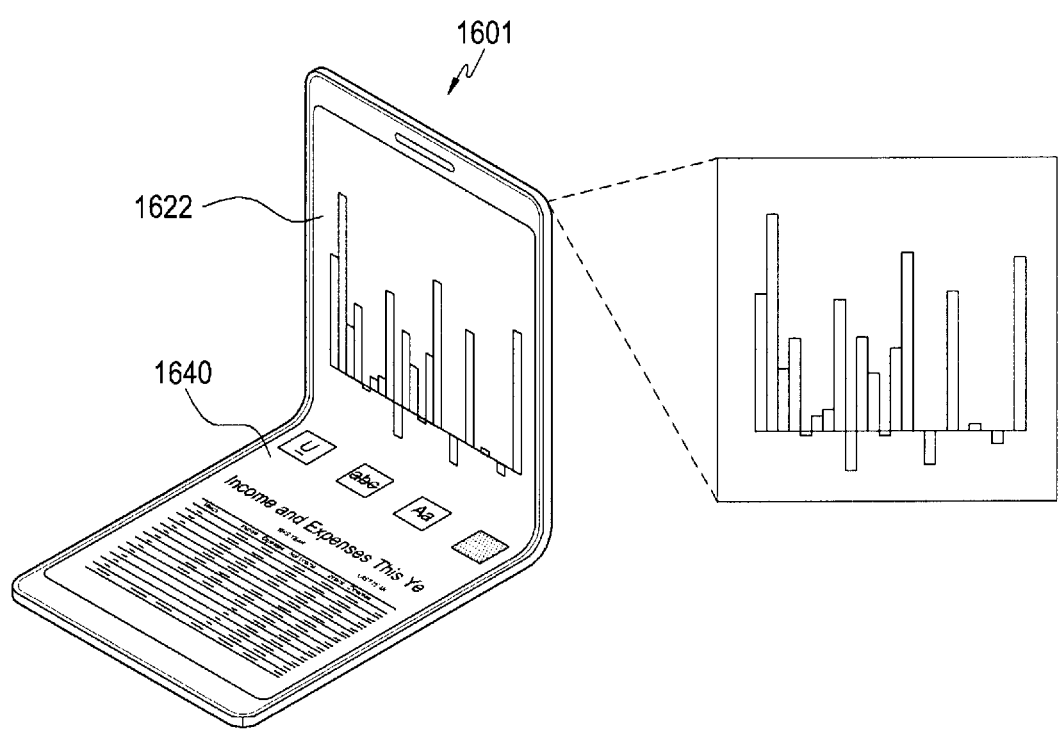

Referring to FIG. 16D, the processor may project the graphic element 1622 to the outside of the electronic device 1601 through a projector functionally coupled with or integrated into the electronic device 1601. The processor may detect an input for controlling the first application through the graphical interface 1640 while projecting the graphic element 1622. The processor may control the first application in response to the input.

Figure 17:
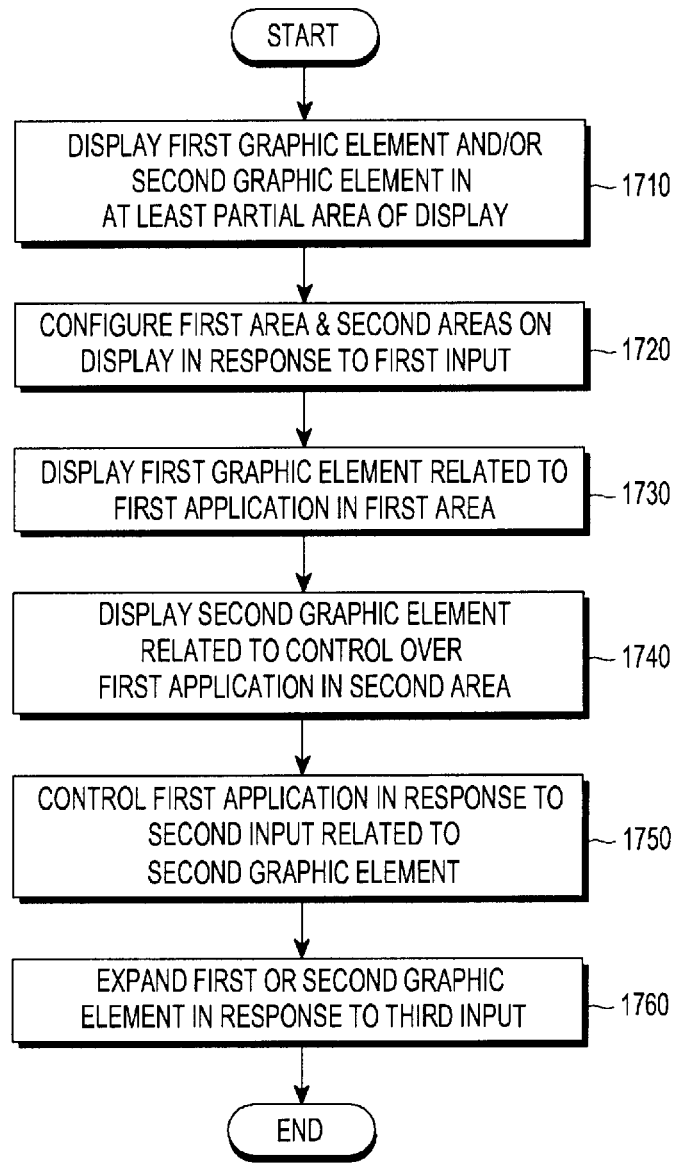
FIG. 17 is a flowchart illustrating a method for controlling a display by an electronic device according to various embodiments of the present disclosure.

FIG. 17 is a flowchart illustrating a method for controlling a display by an electronic device according to various embodiments of the present disclosure. The image providing method may include operations 1710 to 1760. Hereinafter, although the display control method is described as being performed by the electronic device (e.g., the electronic device 101, 201, or 401), the display control method may be performed by a processor (e.g., the processor 210 or 420) of the electronic device or by a controller of the electronic device. Operations 1710 to 1750 are similar to operations 1510 to 1550 illustrated in FIG. 15, respectively, and thus, a repeated description thereof will be omitted.

In operation 1710, the electronic device may display one of a first graphic element related to a first application and a second graphic element related to control over the first application in at least a partial area (or a full screen) of a display (e.g., the display 160 or 460) that is functionally connected to the electronic device.

In operation 1720, the electronic device may configure a first area and a second area in at least a partial area of the display in response to a first input. For example, the electronic device may divide the at least partial area into a first area and a second area. For example, the first input may be at least one of a touch input, an input (or a touch/hovering/swipe input) which at least partially traverses the display in a first direction, a folding/bending/motion input for folding or bending the electronic device, and a voice input.

In operation 1730, the electronic device may display the first graphic element in the first area.

In operation 1740, the electronic device may display the second graphic element in the second area.

In operation 1750, the electronic device may control the first application in response to a second input related to the second graphic element. For example, the second input may be a touch input which selects an object included in the second graphic element. For example, the electronic device may control the first application to display a graphic element/image/document/page, which corresponds to the object, in the first area while maintaining the second graphic element as it is. For example, the electronic device may control the first application to display a changed part of a document in each of the first graphic element and the second graphic element (or each of the first area and the second area) in response to an input for changing a part of the document.

In operation 1760, the electronic device may control the first application to expand and display one of the first and second graphic elements in an area obtained by adding the first and second areas together or in at least a partial area (or a full screen) of the display in response to a third input. For example, the third input may be at least one of a touch input having a direction/pattern/trajectory opposite to the first input, an input (or a touch/hovering/swipe input) which at least partially traverses the display in a second direction opposite to the first direction, an unfolding/motion input for unfolding the electronic device, and a voice input.

In an embodiment of the present disclosure, the electronic device may receive a third input related to the second graphic element from an external electronic device through the first application. The electronic device may display the third input on the second graphic element.

FIGS. 18A to 18F are views illustrating a method for controlling a display by an electronic device according to various embodiments of the present disclosure.

Figure 18A:
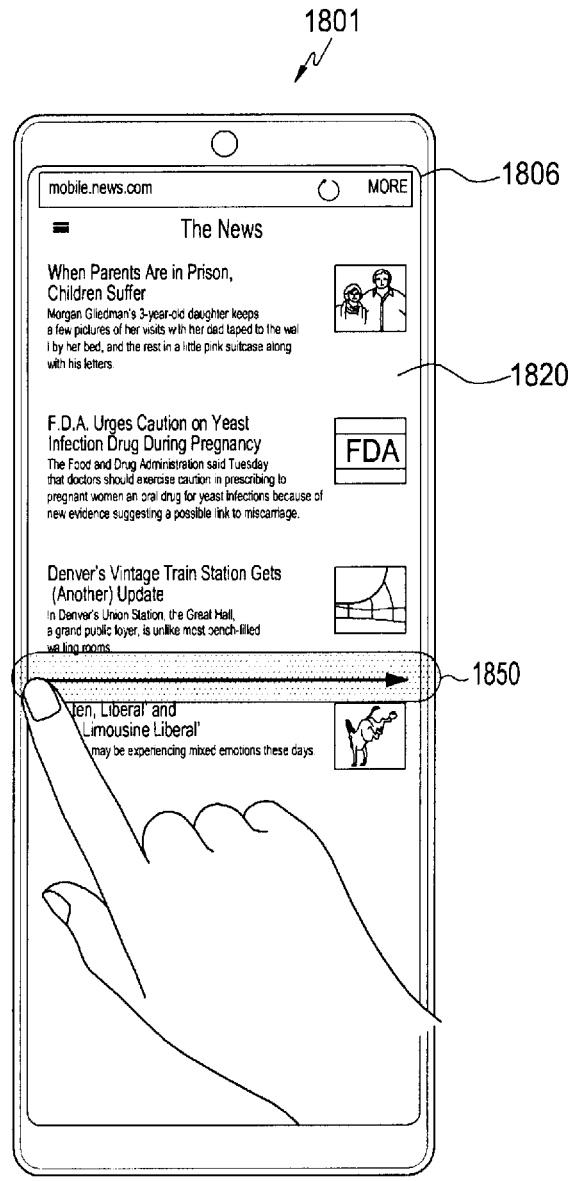
FIG. 18A, FIG. 18B, FIG. 18C, FIG. 18D, FIG. 18E and FIG. 18F are views illustrating a method for controlling a display by an electronic device according to various embodiments of the present disclosure.

Referring to FIG. 18A, a processor (e.g., the processor 210 or 420) of the electronic device 1801 (e.g., the electronic device 101, 201, or 401) may display a first graphic element 1820 (e.g., a web document/web page), which is related to the first application (e.g., a web browser), in at least a partial area (or a full screen) of a display 1806 of the electronic device 1801.

Figure 18B:
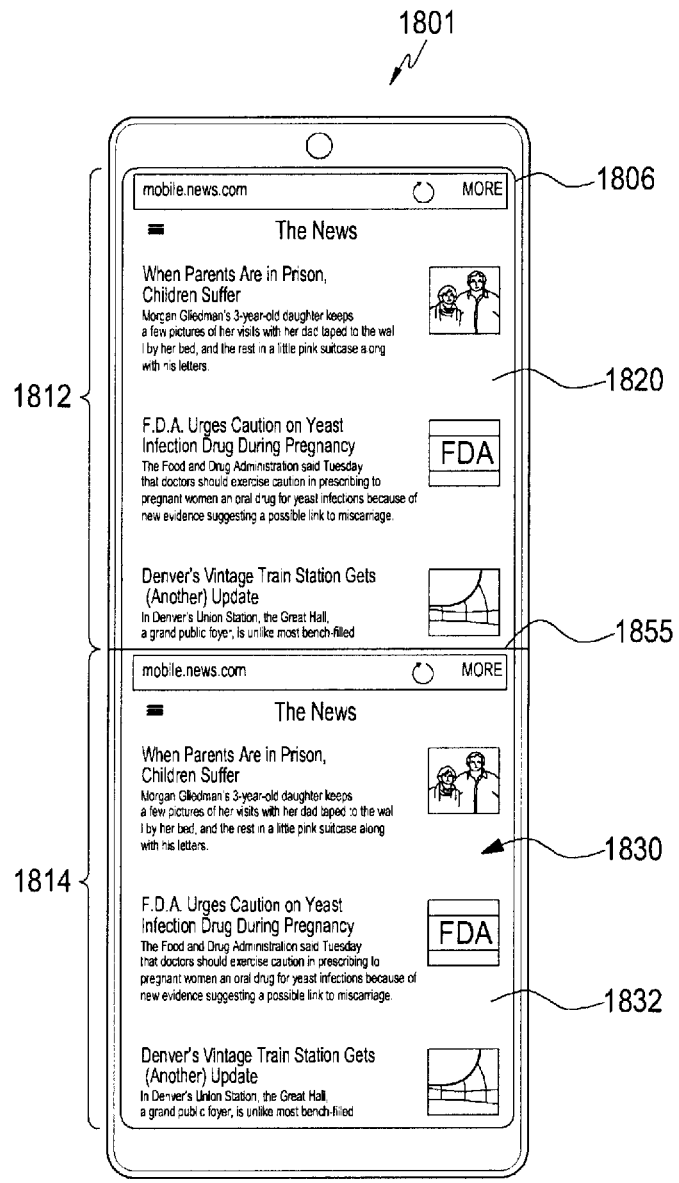

Referring to FIG. 18B, the processor may configure a first area 1812 and a second area 1814 in the at least partial area in response to a touch input 1850 (depicted in FIG. 18A) which at least partially traverses the display 1806 in a first direction. For example, the first and second areas 1812 and 1814 may be divided by a boundary line 1855, which is capable of being further adjusted upwards or downwards to modify the screen space allotted to each display screen. The processor may display a first graphic element 1820 and a second graphic element 1830, both corresponding to an identical first web document/web page, in each of the first and second areas 1812 and 1814, respectively.

Figure 18C:
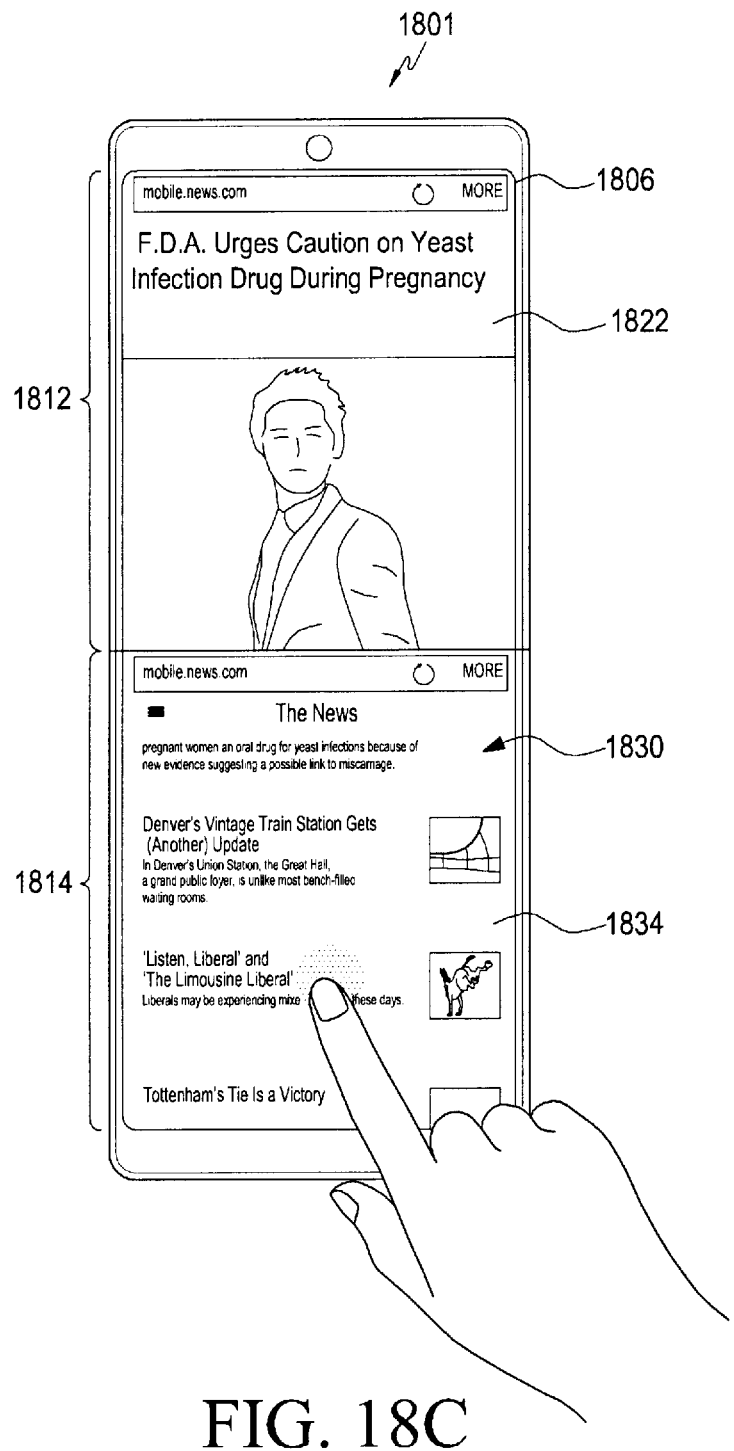

Referring to FIG. 18C, in response to an input selecting a first object 1832 (e.g., a first hyperlink) of the second graphic element 1830, the processor may display a graphic element 1822 (e.g., a second web document/web page), corresponding to the first object 1832 in the first area 1812, while simultaneously maintaining the second graphic element 1830 as it is.

Figure 18D:
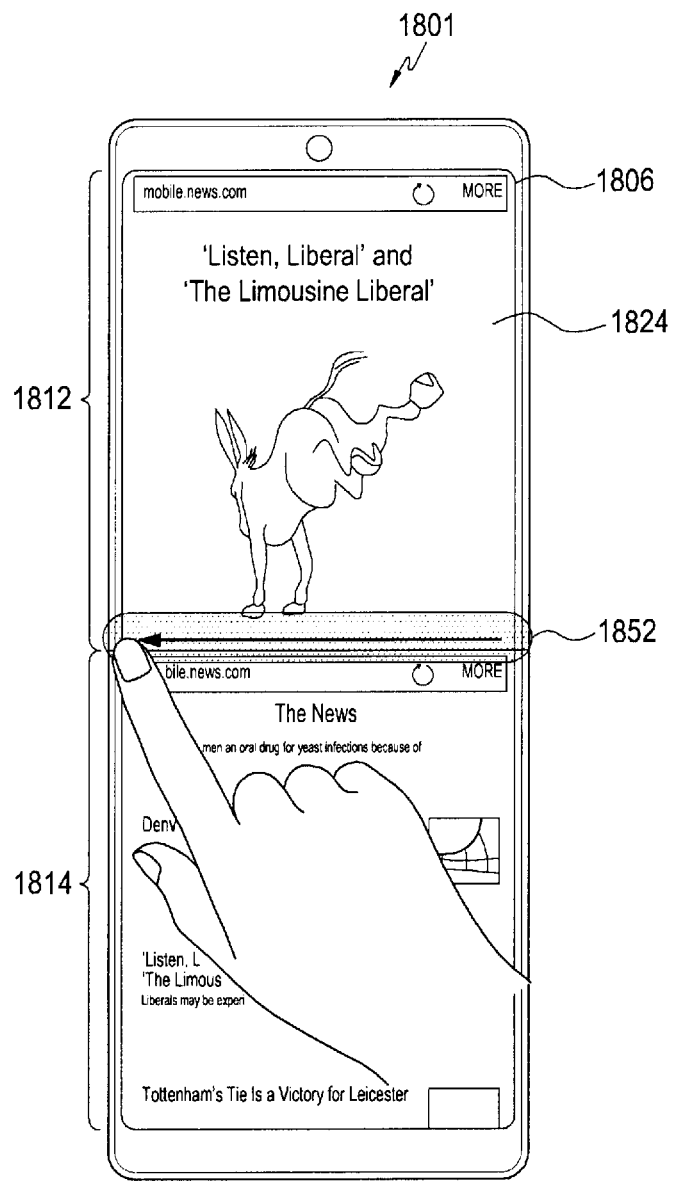

Referring to FIG. 18D, in response to an input which selects a second object 1834 (e.g., a second hyperlink) of the second graphic element 1830, the processor may display a graphic element 1824 (e.g., a third web document/web page), corresponding to the second object 1834, in the first area 1812 while maintaining the second graphic element 1830 as it is.

Figure 18E:
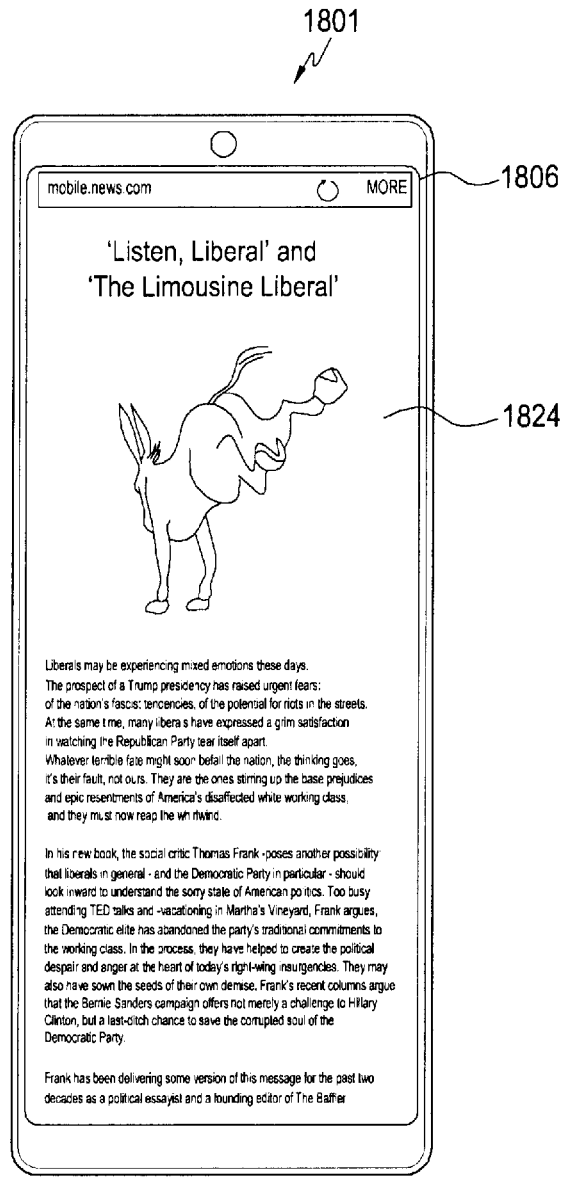

Referring to FIG. 18E, in response to a touch input 1852 which at least partially traverses the display 1806 in a second direction opposite to the first direction (as depicted in FIG. 18D), the processor may expand and display a currently activated graphic element 1824 in an area generated by recombining the first and second areas 1812 and 1814 into what may be at least a partial area or a full screen of the display 1806.

In an embodiment of the present disclosure, the first application may correspond to a document editing application, and the first and second graphic elements may both correspond to an identical editable document.

Figure 18F:
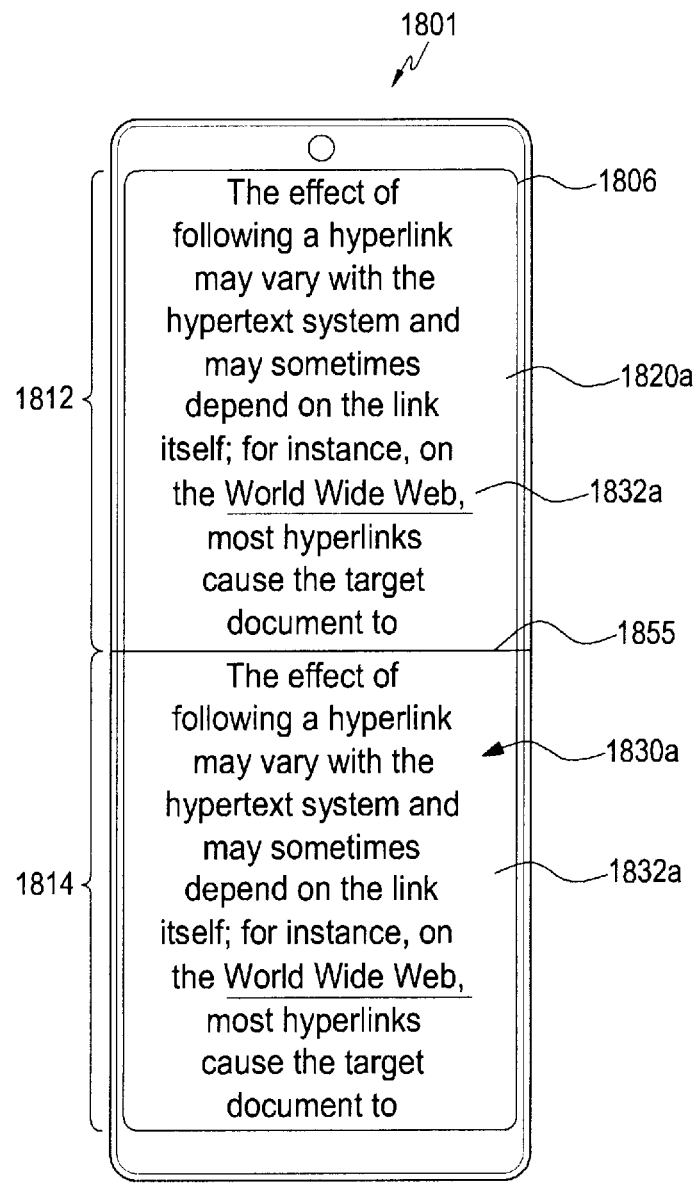

Referring to FIG. 18F, the processor may display a first graphic element 1820a and a second graphic element 1830a, which both correspond to an identical editable document, in the first area 1812 and the second area 1814, respectively. For example, the first and second areas 1812 and 1814 may be divided by a boundary line 1855 capable of moving upwards or downwards. The processor may control the first application to display the changed part 1832a of the document on each of the first and second graphic elements 1820a and 1830a (or each of the first and second areas 1812 and 1814), in response to an input (e.g., a change of text attributes, such as an underscore, a color change, and/or the like) for changing a part of the document. For example, in response to a user input for the first graphic element 1820a, the processor may underline a "World Wide Web," part 1832a of the first graphic element 1820a, and simultaneously, may underline an identical part (i.e., "World Wide Web,") of the second graphic element 1830a. The processor may selectively scroll one of the first and second graphic elements 1820a and 1830a in response to a user input. For example, in response to a user input for the first graphic element 1820a, the processor may scroll the first graphic element 1820a upwards or downwards, while simultaneously maintaining the current state of the second graphic element 1830a as it is (e.g., without scrolling).

FIGS. 19A to 19G are views illustrating a method for controlling a display by an electronic device according to various embodiments of the present disclosure.

When a user is engaged in a conversation with another person (i.e., in the case of a video call), the electronic device 1901 (e.g., the electronic device 101, 201, or 401) may display a screen of a display 1906 as to distinguish an area (i.e., transmitted to another person) shared with the other person from an area displaying an image received from the other person. For example, the electronic device 1901 may display a captured image or video stream of the user in the shared area, and simultaneously, may transmit the captured image or video stream to another person in real time.

Figure 19A:
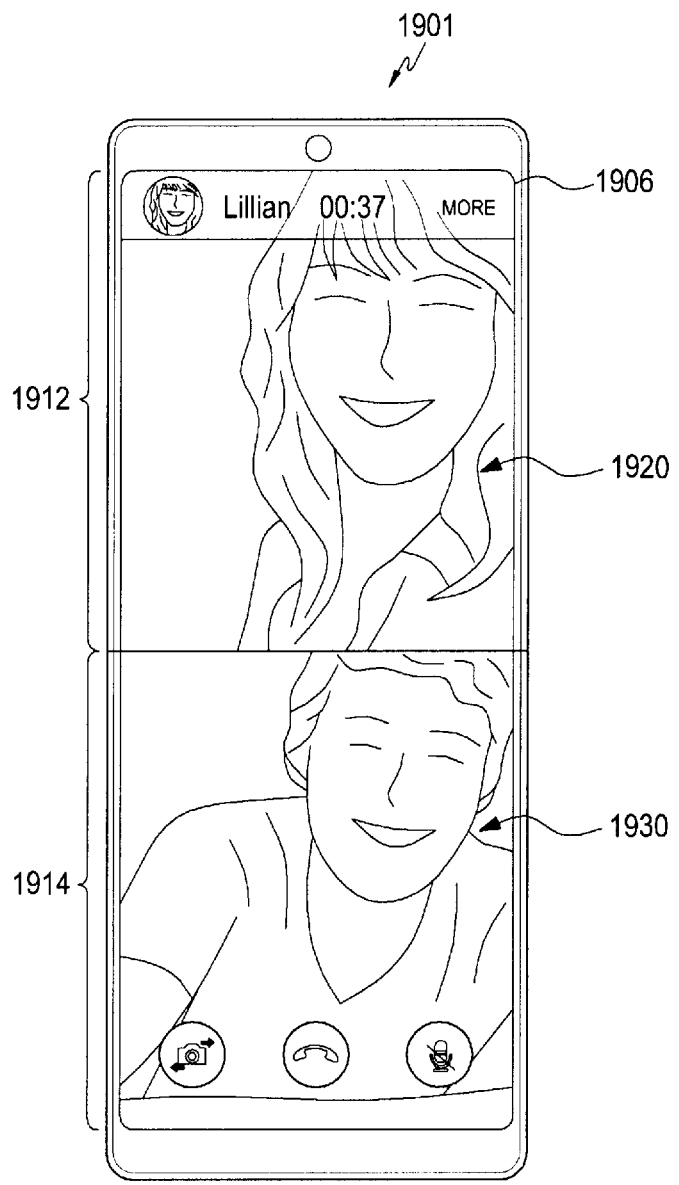
FIG. 19A, FIG. 19B, FIG. 19C, FIG. 19D, FIG. 19E, FIG. 19F and FIG. 19G are views illustrating a method for controlling a display by an electronic device according to various embodiments of the present disclosure.

Referring to FIG. 19A, a processor (e.g., the processor 210 or 420) of the electronic device 1901 may configure a first area 1912 and a second area 1914 for display, the combination of the two areas utilizing at least a partial area (or full screen, as depicted) of the display 1906 of the electronic device 1901. The processor may display, in the first area 1912, a first graphic element 1920 (e.g., an image or video stream received from an external electronic device) related to a first application (e.g., a telephone/call application, a voice/video call application, a voice/image/video conference application, and/or the like), and may display a second graphic element 1930 related to the first application in the second area 1914.

Figure 19B:
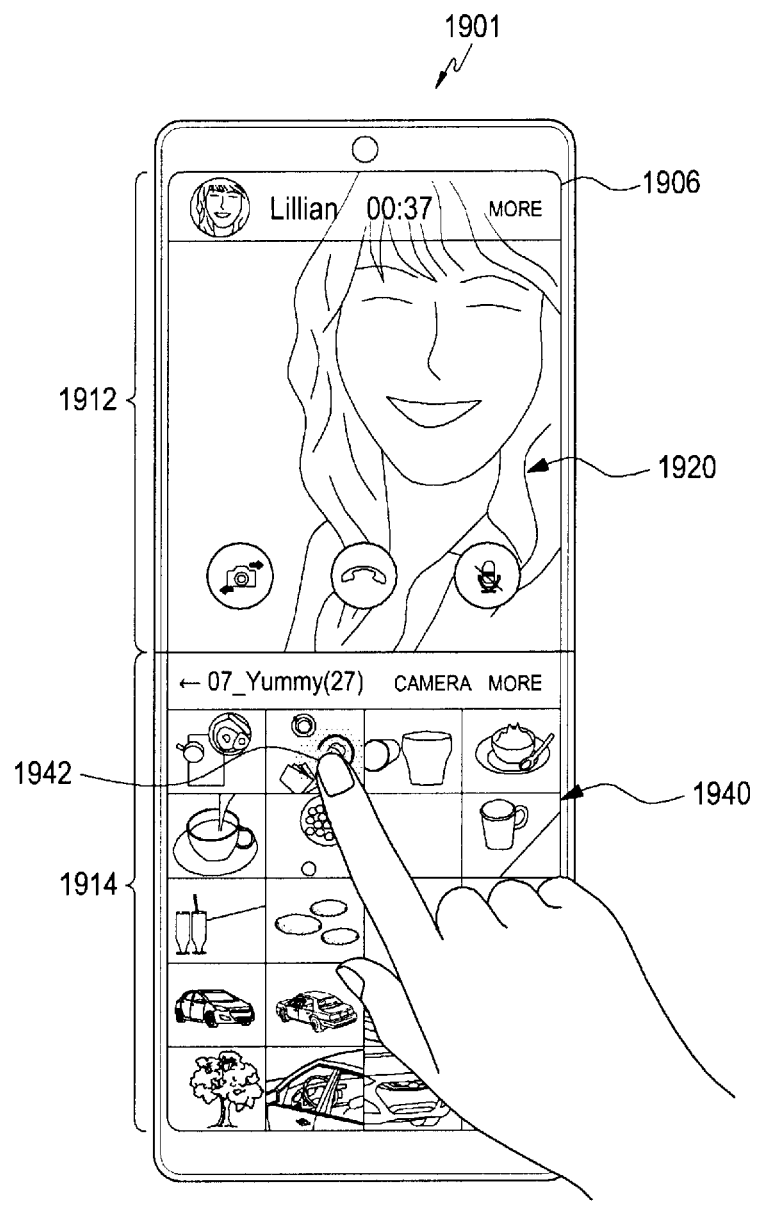

Referring to FIG. 19B, in response to detecting a first input, the processor may display a graphic element 1940 (e.g., a file, a document or a page search window within the document, a list of images/icons, and/or the like) including multiple selectable objects in the second area 1914.

Figure 19C:
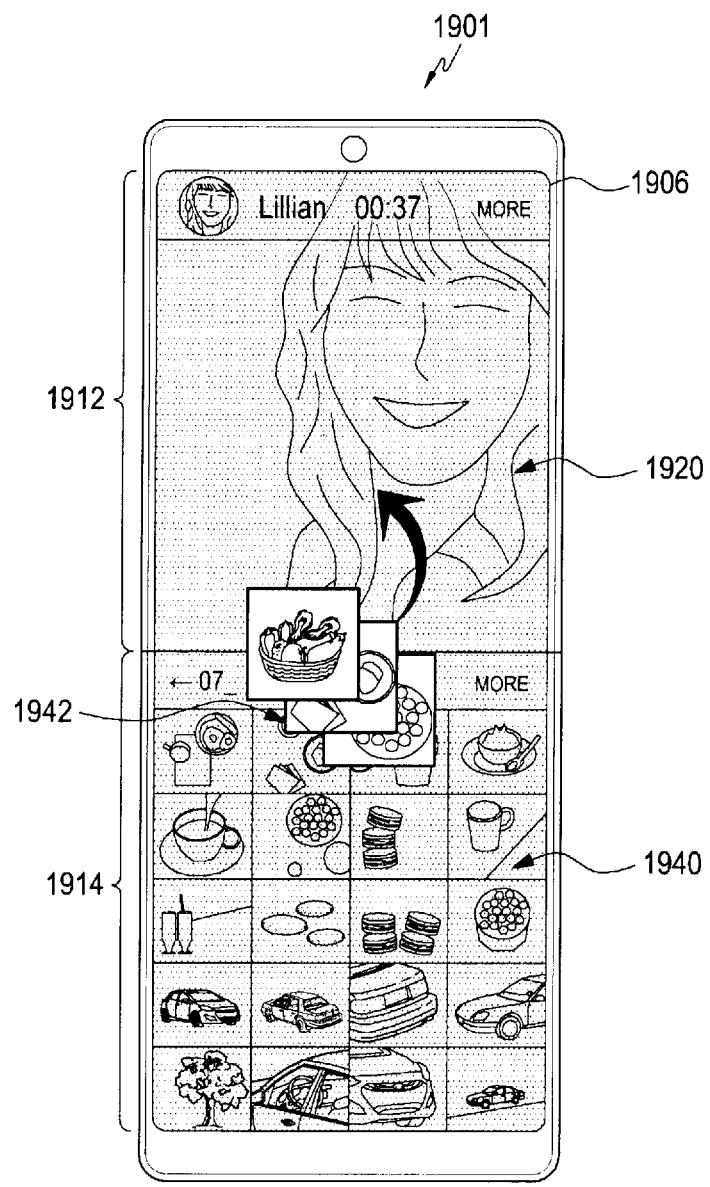

Referring to FIG. 19C, in response to a second input selecting at least one object 1942 (e.g., an icon, an image, and/or the like) of the graphic element 1940, the processor may transmit at least one file/image/document corresponding to the at least one object 1942 to an external electronic device (e.g., the external electronic device 404 or the server 406) through a communication interface (e.g., the communication interface 470) that is functionally connected to the electronic device 1901. For example, in FIG. 19C, the selected object 1942 is dragged to the first area 1912 to trigger transmission of information corresponding to the selected object 1942.

Figure 19D:
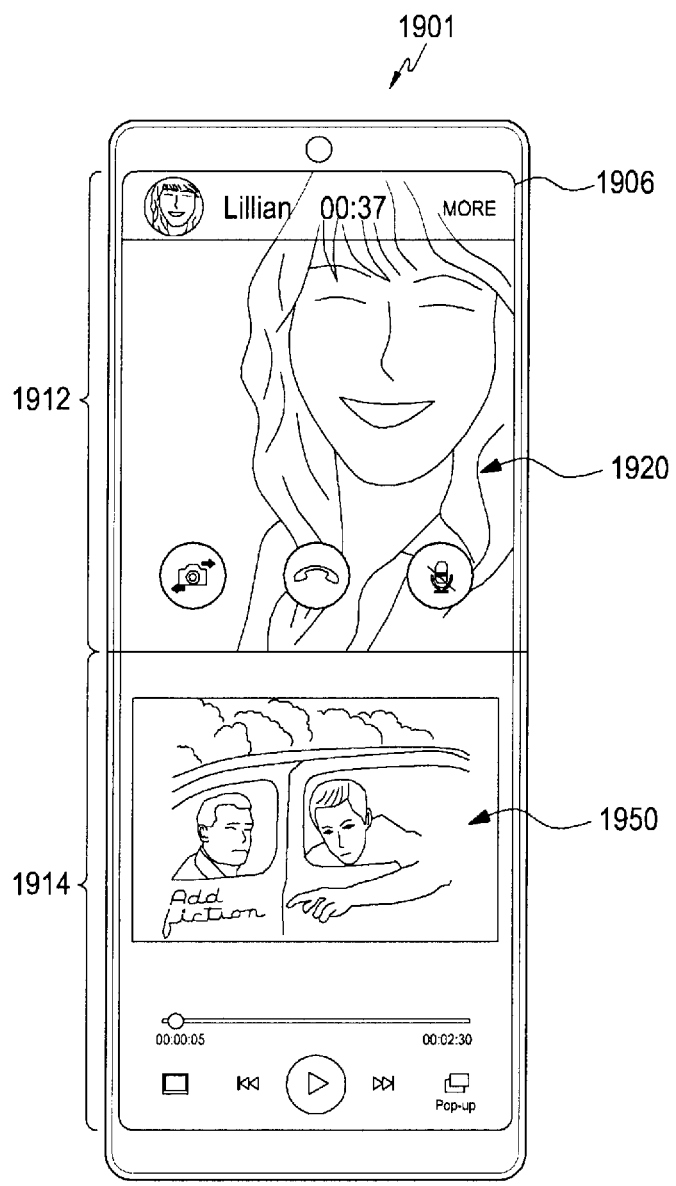

Referring to FIG. 19D, the processor may display, in the first area 1912, the first graphic element 1920 (e.g., an image received from an external electronic device) related to the first application (e.g., a telephone/call application, a voice/video call application, a voice/image/video conference application, and/or the like), and may display a graphic element 1950 (e.g., a video and a screen/graphical interface of a video player application) related to a second application in the second area 1914. The processor may control the first application to transmit at least one of at least part of the graphic element 1950, a video thereof, and video-related information (e.g., moving image download/streaming information/address, moving image reproduction information/position/time, and/or the like) thereof to an external electronic device through the communication interface in response to an input (e.g., a reproduction command, a moving image transmission command, and/or the like) related to the graphic element 1950.

Figure 19E:
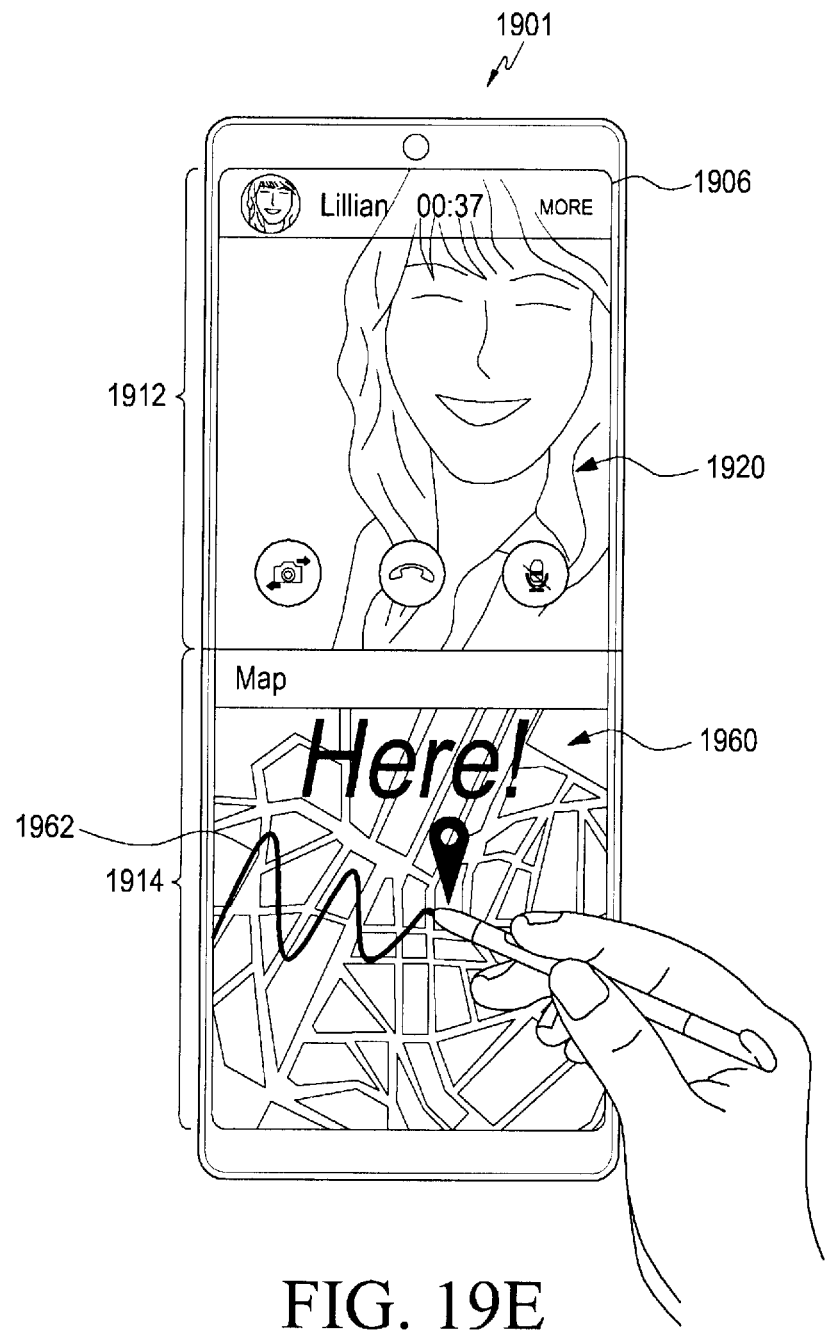

Referring to FIG. 19E, the processor may display, in the first area 1912, the first graphic element 1920 (e.g., an image received from an external electronic device) related to the first application (e.g., a telephone/call application, a voice/video call application, a voice/image/video conference application, and/or the like), and may display a graphic element 1960 (e.g., a map, and a screen/graphical interface of a map application) related to a second application (e.g., a map application) in the second area 1914. The processor may control the first application to transmit an input 1962 (e.g., a handwriting input) (or at least part of a graphical interface of the second application including the handwriting input, and map download information/address) to an external device through the communication interface in response to the input 1962 (e.g., a handwriting input) related to the second graphic element 1960.

Figure 19F:
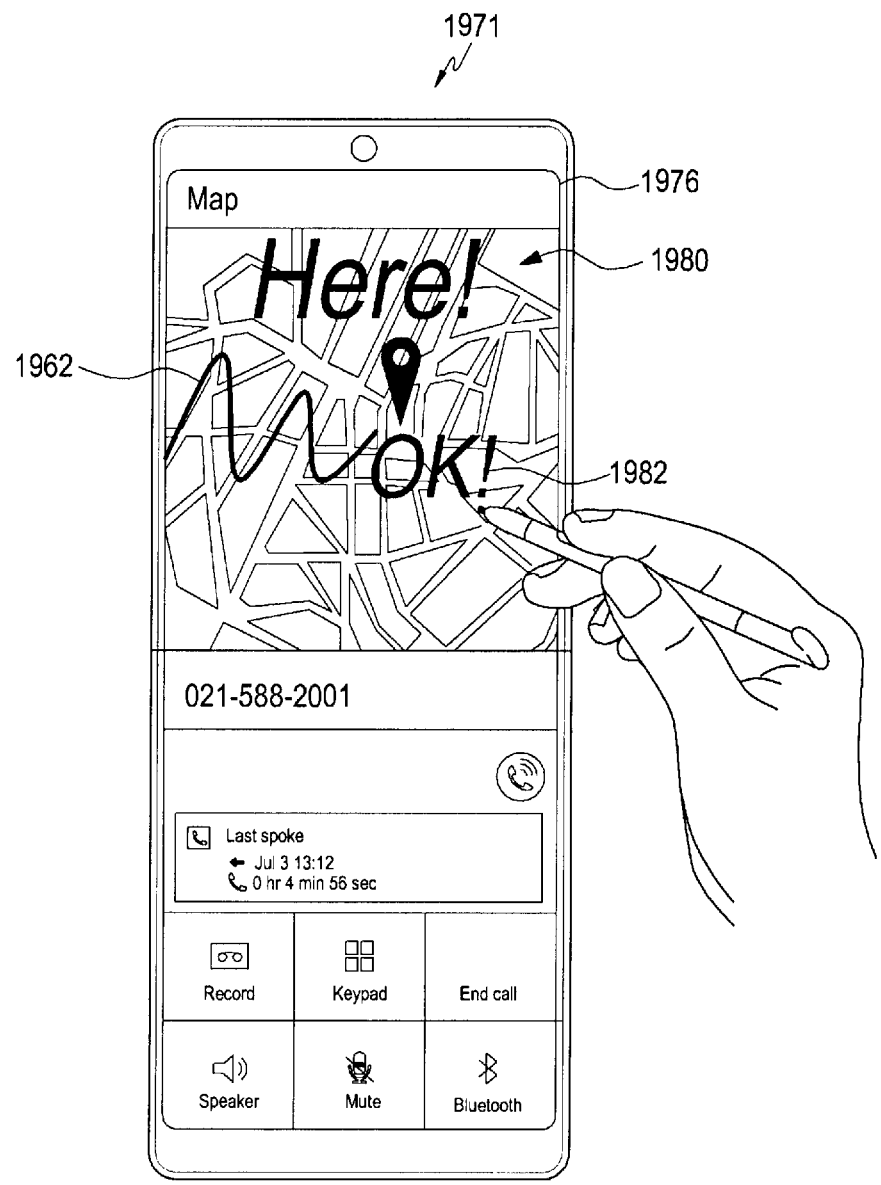

Referring to FIG. 19F, an external electronic device 1971 may display, on a display 1976, a second graphic element 1980 (e.g., a map, a screen/graphical interface of a map application, and/or the like), which is acquired based on information received from the electronic device 1901, and the input 1962 (e.g., a handwriting input). The external electronic device 1971 may transmit an input 1982 (e.g., a handwriting input) (or at least part of a graphical interface of a second application including the handwriting input) to the electronic device 1901 in response to the input 1982 (e.g., a handwriting input) related to the second graphic element 1960.

Figure 19G:
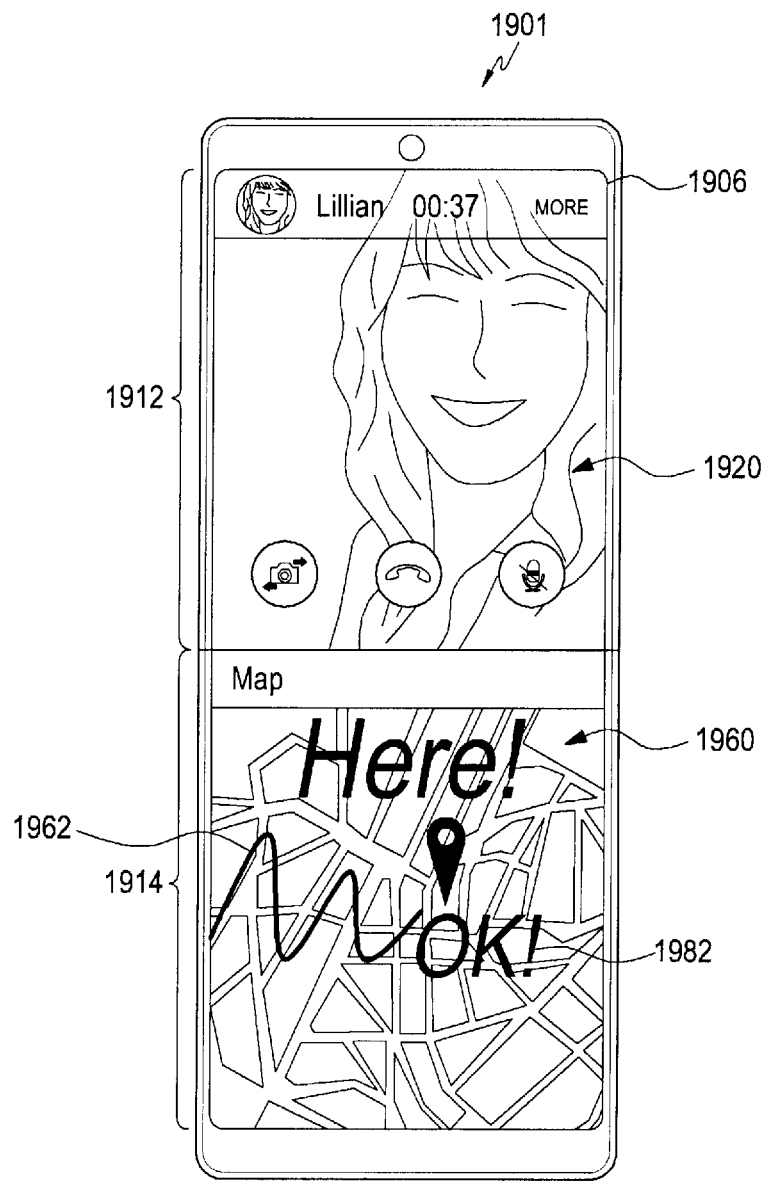

Referring to FIG. 19G, the processor may receive an input 1982 (or input data) related to the second graphic element 1960 from the external electronic device 1971 through the first application. The processor may control the second application to display the input 1982 on the second graphic element 1960 or to display the input 1982, in response to the input 1982.

FIGS. 20A to 20D are views illustrating a folding gesture according to various embodiments of the present disclosure.

Figures 20A, 20B:
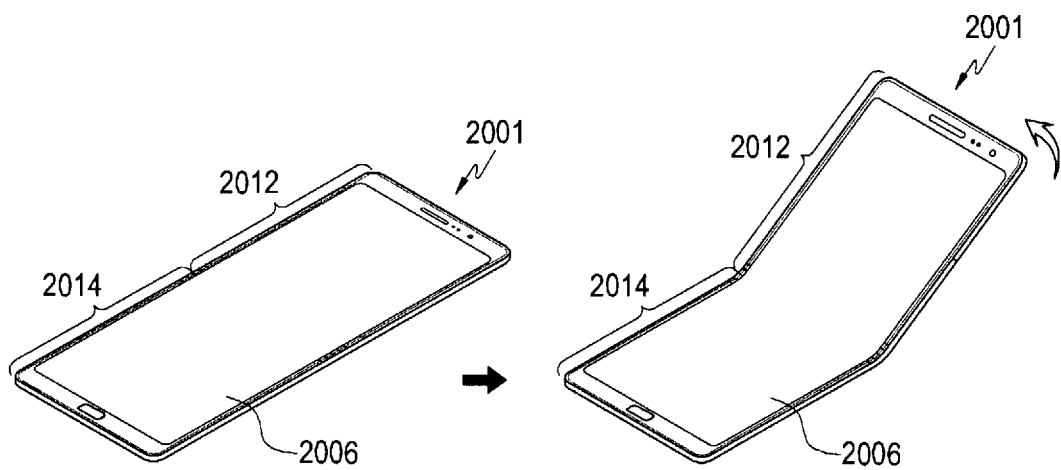
FIG. 20A, FIG. 20B, FIG. 20C and FIG. 20D are views illustrating a folding gesture according to various embodiments of the present disclosure.
Figures 20C, 20D:
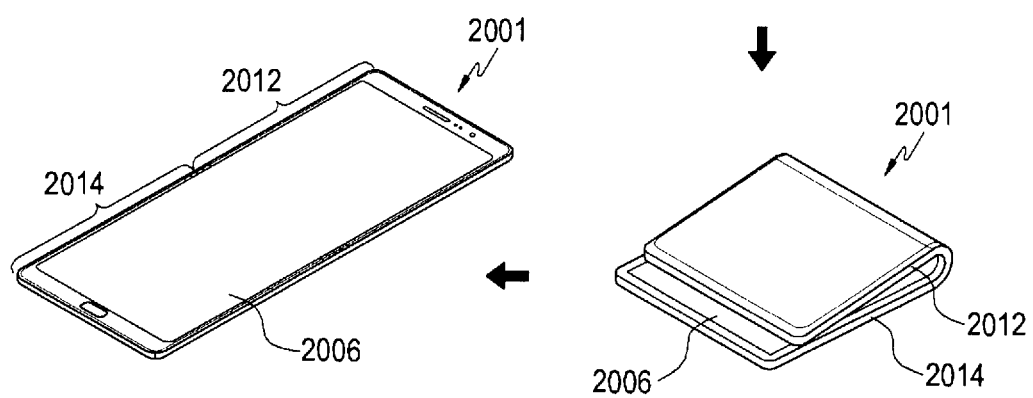

Referring to FIGS. 20A to 20C, an electronic device 2001 may be folded by manual operation of a user such that a first part 2012 and a second part 2014 (e.g., an upper part, a lower part, and/or the like) contact each other and are situated as close as possible one another in a lengthwise direction of the electronic device 2001. When the electronic device 2001 is folded (e.g., a folded state), an end part in the lengthwise direction of the electronic device 2001, may or may not be exposed to the outside depending on the axis of folding. When the device 2001 is folded unevenly, a part of the display 2006 may be exposed to the outside as a sub-display for implementing additional functionality.

Referring to FIG. 20D, the electronic device 2001 may be returned to the unfolded state by a manual operation of the user.

Examples of a folding gesture (which may also be referred to as a "bending gesture") may include a gesture which bends the electronic device 2001 at a preset angle or more as illustrated in FIG. 20B, a gesture which completely folds the electronic device 2001 such that the first and second parts 2012 and 2014 contact each other or come as close as possible to each other as illustrated in FIG. 20C, and a gesture which again unfolds the electronic device 2001 in the opposite direction/to the original state (or at a predetermined angle or less) after bending the electronic device 2001 at a preset angle or more. For example, the electronic device 2001 may detect an angle formed between an axis (e.g., x-axis) in the lengthwise direction of the electronic device 2001 and the first part 2012 (or the second part 2014). For example, a bending angle of the electronic device 2001 illustrated in FIG. 20A may be detected to be 0 degrees, and that of the electronic device 2001 illustrated in FIG. 20C may be detected to be 180 degrees.

Similarly, examples of an unfolding gesture may include a gesture which unfolds the bent electronic device 2001 at a preset angle or less as illustrated in FIG. 20B or FIG. 20D.

In the above-described embodiments of the present disclosure, an example has been described in which multiple areas which may be distinguished from each other or may allow independent control are configured on the display in response to an input which at least partially traverses the display. However, multiple areas may be configured or the configuration of an area may be cancelled by a folding/unfolding gesture.

For example, referring to FIGS. 18A and 18B, the first and second areas 1812 and 1814 have been described as being configured in response to the touch input 1850 which at least partially traverses the display 1806 in the first direction, but the first and second areas 1812 and 1814 may be configured by a folding/unfolding gesture. Referring to FIG. 18E, the configuration of areas may be cancelled by a folding/unfolding gesture instead of the touch input 1852.

For example, referring to FIG. 10B, the first and second areas 1012 and 1014 have been described as being configured in response to the touch input 1050 which at least partially traverses the display 1006 in the first direction, but the first and second areas 1012 and 1014 may be configured by a folding/unfolding gesture.

Figure 21A:
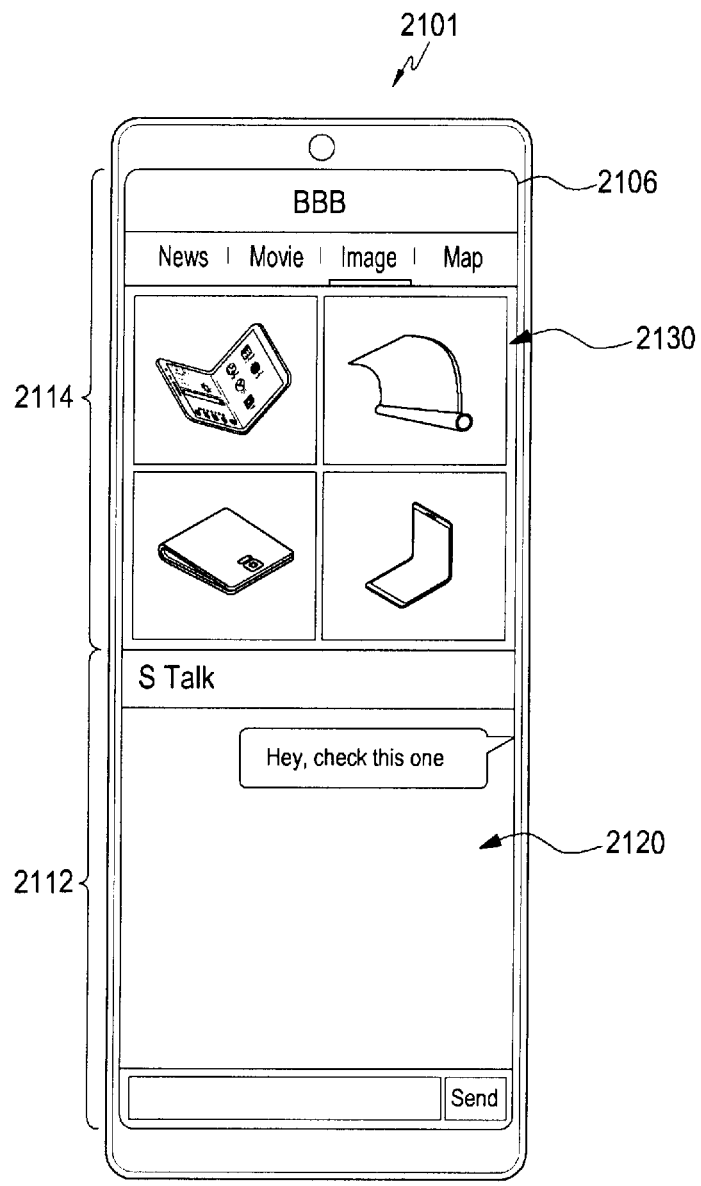
FIG. 21A and FIG. 21B are views illustrating a method for controlling a display by an electronic device according to various embodiments of the present disclosure.
Figure 21B:
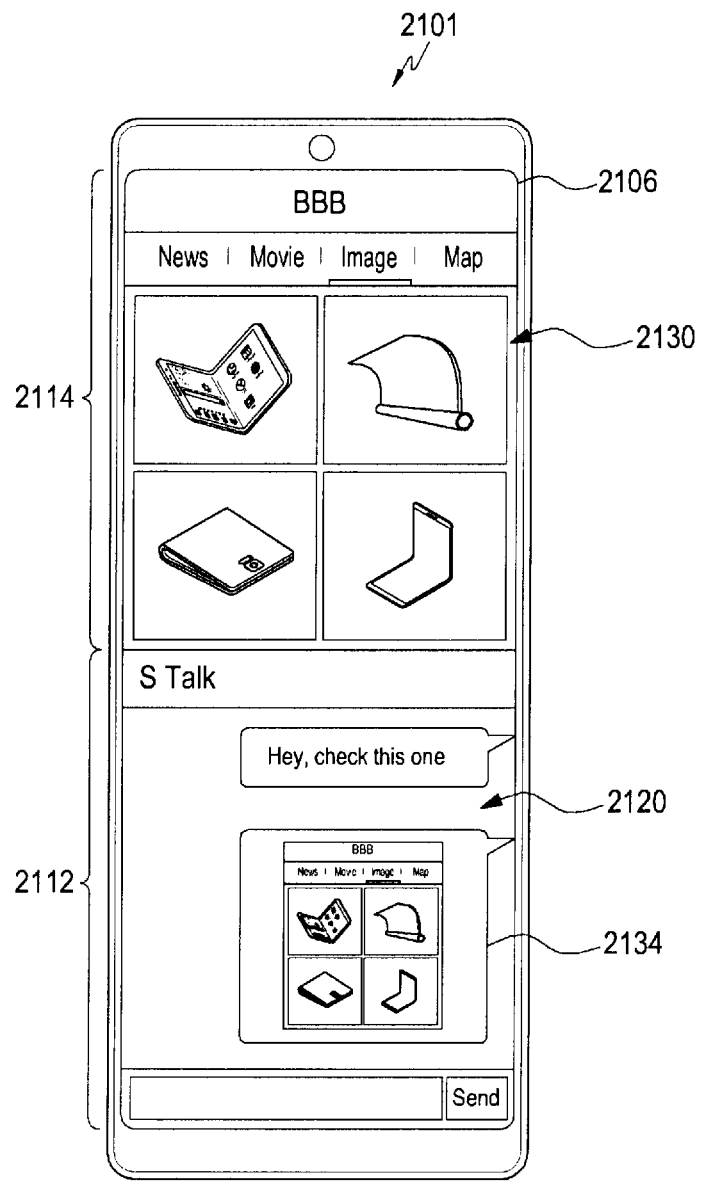

FIGS. 21A and 21B are views illustrating a method for controlling a display by an electronic device according to various embodiments of the present disclosure.

Referring to FIG. 21A, a processor (e.g., the processor 210 or 420) of the electronic device 2101 (e.g., the electronic device 101, 201, or 401) may configure a first area 2112 and a second area 2114 for display in at least a partial area (or a full screen) of a display 2106 of the electronic device 2101. The processor may display a first graphic element 2120 (e.g., a screen/graphical interface of a message/SNS application) related to a first application (e.g., a message/SNS application) in a first area 2112. The processor may display a second graphic element 2130 (e.g., a web document/web page) related to a second application (e.g., a web browser) in a second area 2114.

Referring to FIG. 21B, in response to an input (e.g., a folding/unfolding gesture) which selects or otherwise indicates executing screen capture (or screen transmission), the processor may transmit an image/file/document generated by capturing an image (e.g., a screenshot of) the second area 2114 or a second graphic element 2130 to an external electronic device through a communication interface (e.g., the communication interface 470) that is functionally connected to the electronic device 2101. The processor may display an object 2134 (or a reduced image), which corresponds to the transmitted image/file/document, on the first graphic element 2120. For example, the processor may display an icon (or a reduced image), which corresponds to the transmitted image, in a chat window of a message/SNS application.

FIGS. 22A to 22H are views illustrating a method for controlling a display by an electronic device according to various embodiments of the present disclosure.

Figure 22A:
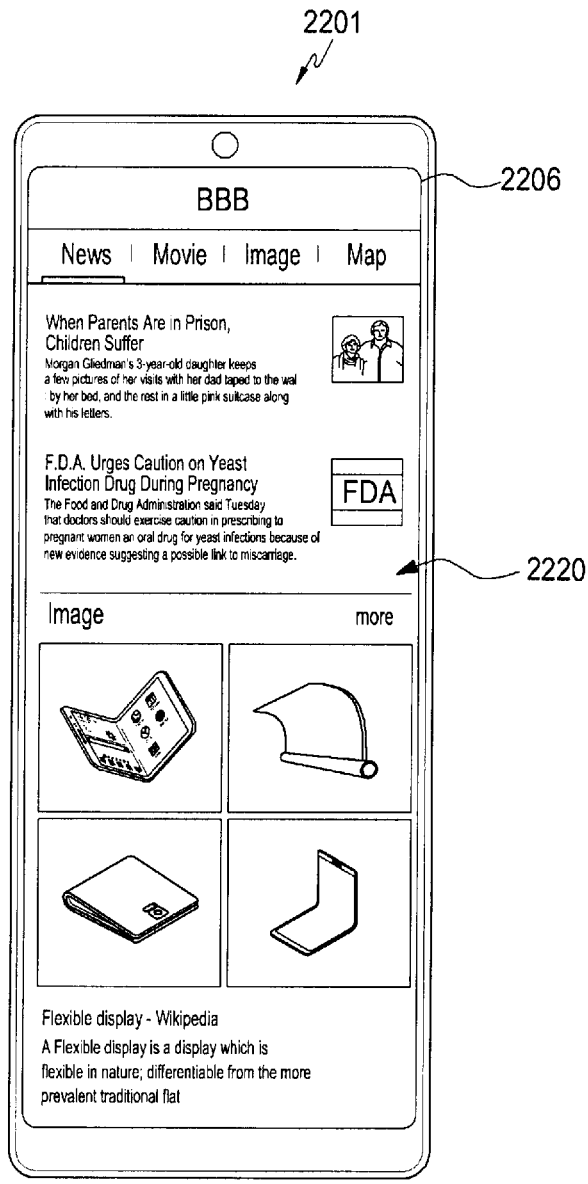
FIG. 22A, FIG. 22B, FIG. 22C, FIG. 22D, FIG. 22E, FIG. 22F, FIG. 22G, and FIG. 22H are views illustrating a method for controlling a display by an electronic device according to various embodiments of the present disclosure.

Referring to FIG. 22A, a processor (e.g., the processor 210 or 420) of the electronic device 2201 (e.g., the electronic device 101, 201, or 401) may display a first graphic element 2220 (e.g., a web document/web page) related to a first application (e.g., a web browser) in at least a partial area (or a full screen) of a display 2206 of the electronic device 2201.

Figure 22B:
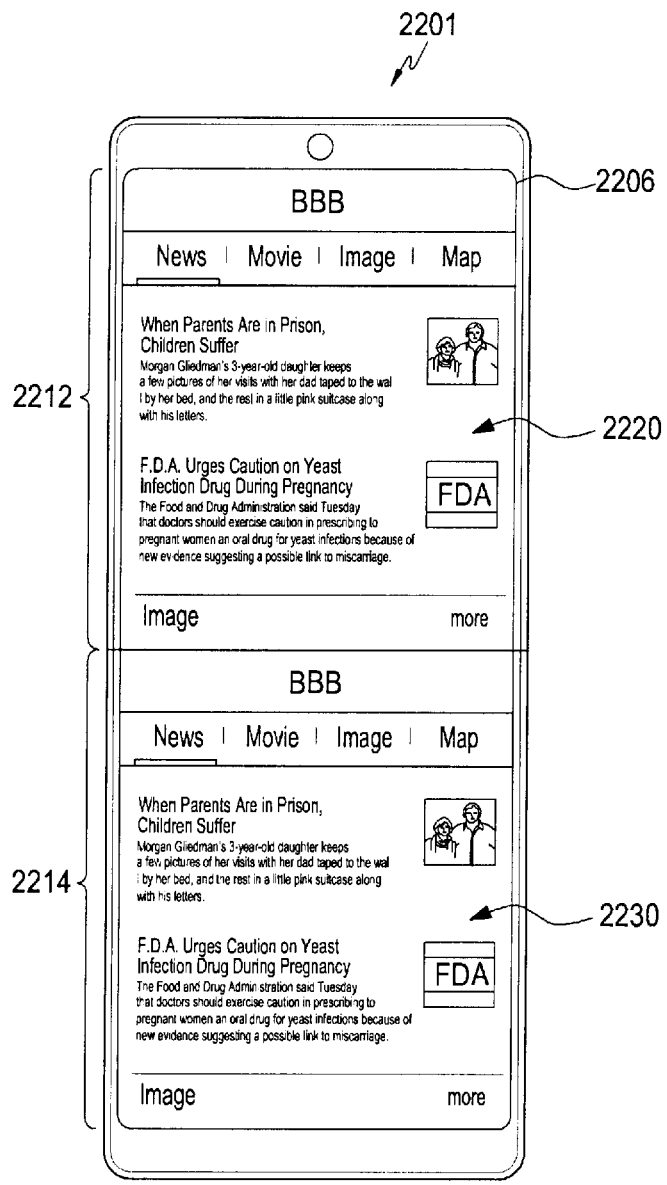

Referring to FIG. 22B, the processor may configure a first area 2212 and a second area 2214 for display in the at least partial area in response to an input (e.g., a folding/unfolding gesture) indicating or requesting screen division. The processor may display the first graphic element 2220 and a second graphic element 2230, which both correspond to an identical first web document/web page, in the first and second areas 2212 and 2214, respectively.

Figure 22C:
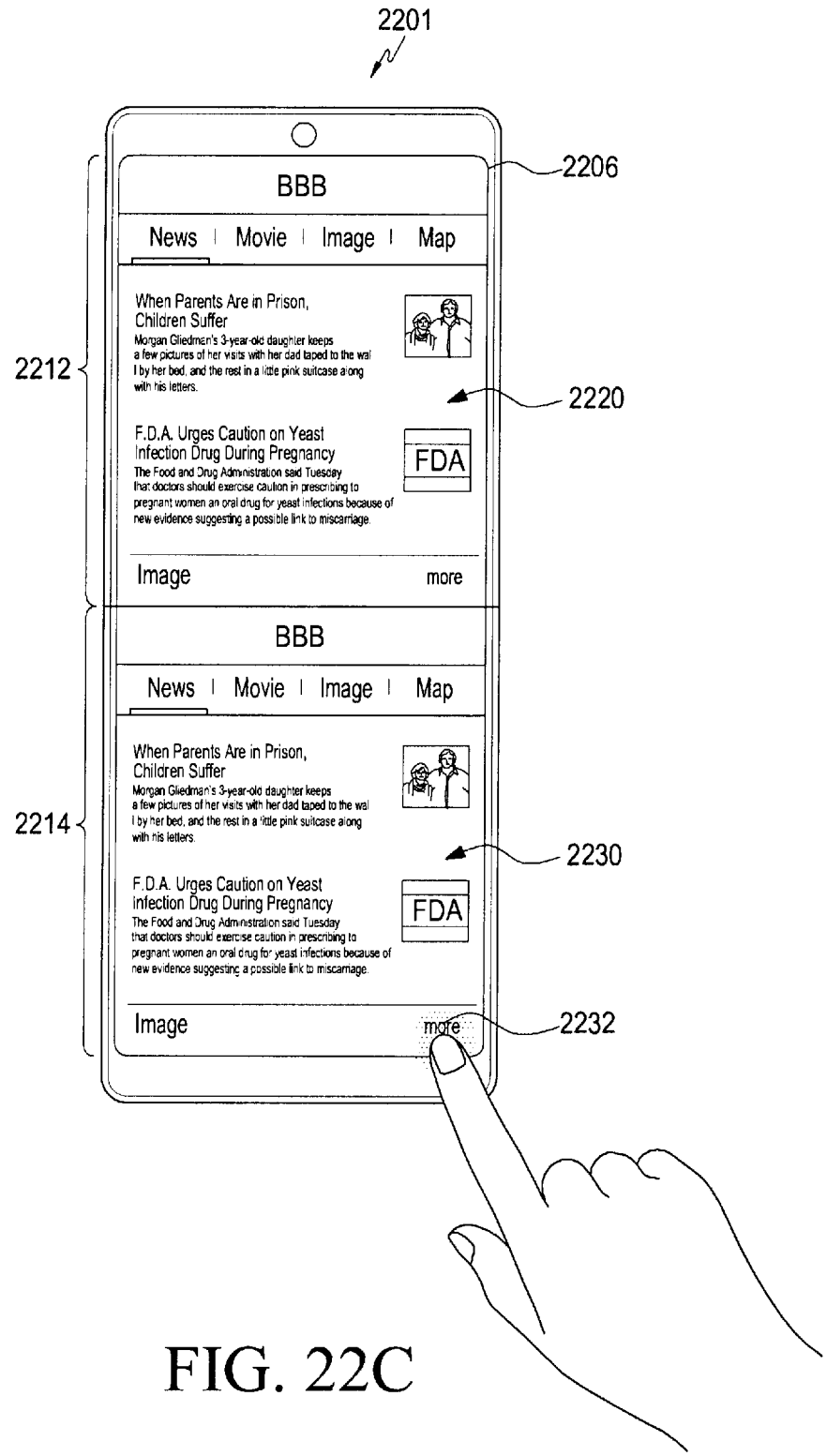

Referring to FIG. 22C, the processor may detect an input selecting a first object 2232 (e.g., a first hyperlink) of the second graphic element 2230.

Figure 22D:
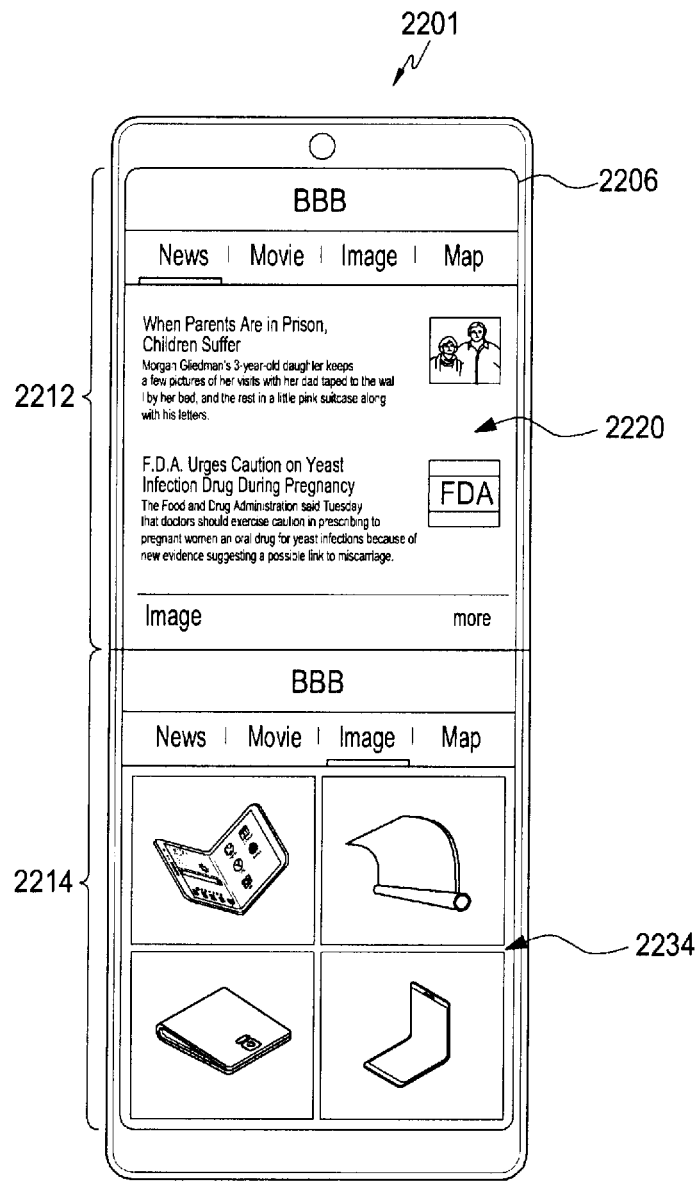

Referring to FIG. 22D, in response to the input, the processor may display a third graphic element 2234 (e.g., a second web document/web page) corresponding to the first object 2232, in the second area 2214 while maintaining the first graphic element 2220 as it is.

Figure 22E:
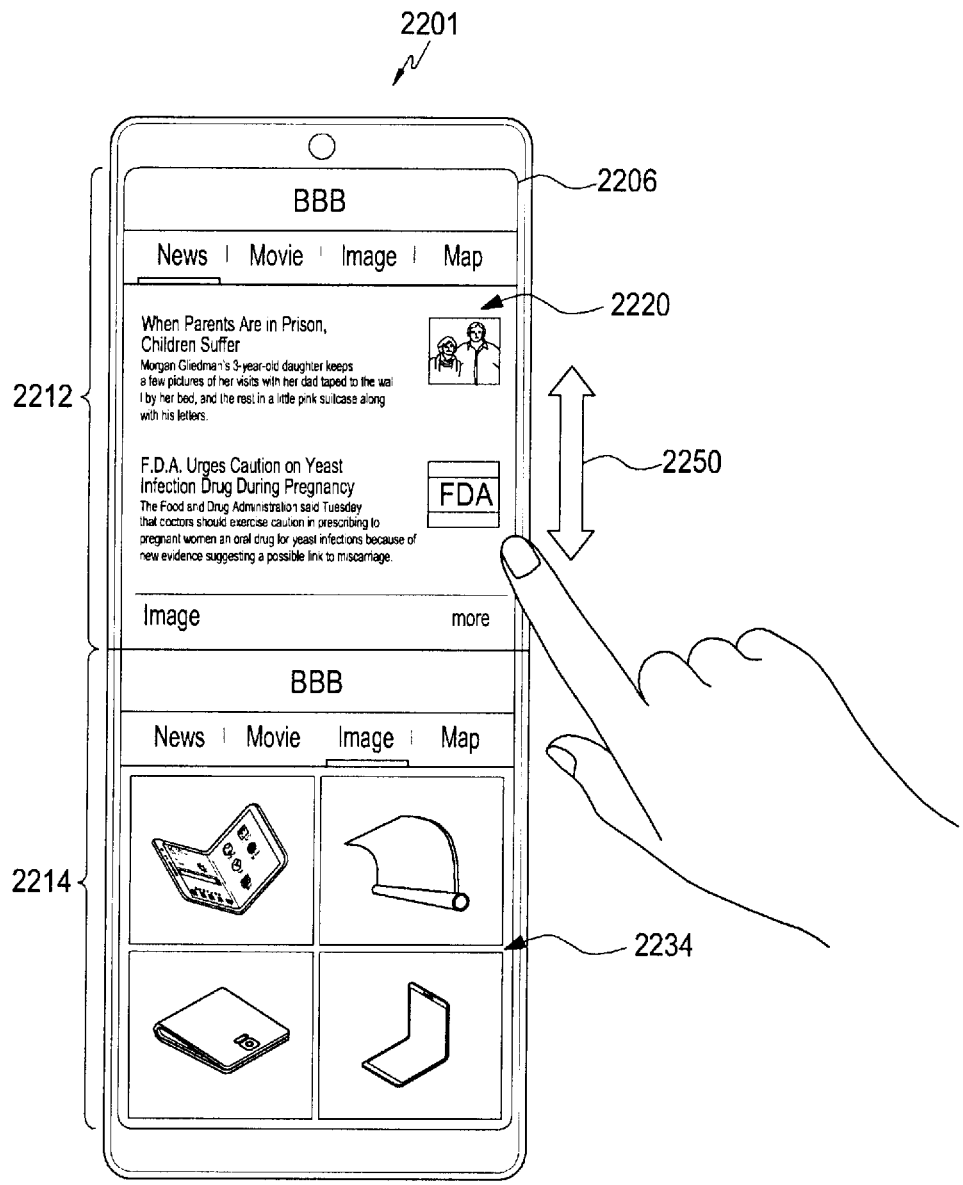
Figure 22F:
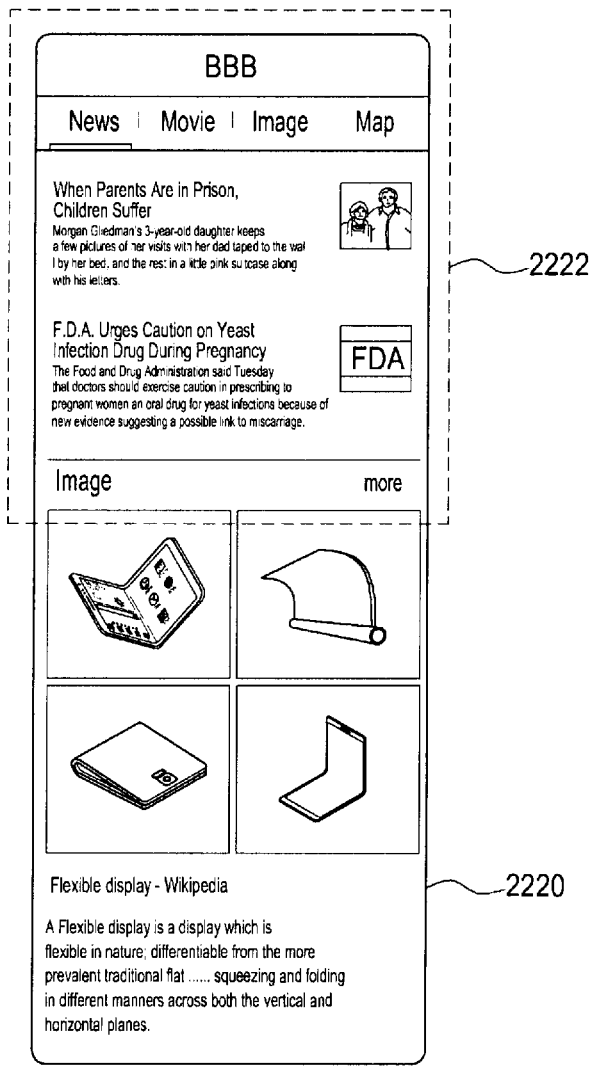

Referring to FIGS. 22E and 22F, the processor may detect an input 2250 (e.g., a swipe input on the first area 2212, or a scroll input) for displaying another part of the first graphic element 2220 instead of a part 2222 of the first graphic element 2220 which is displayed in the first area 2212.

Figure 22G:
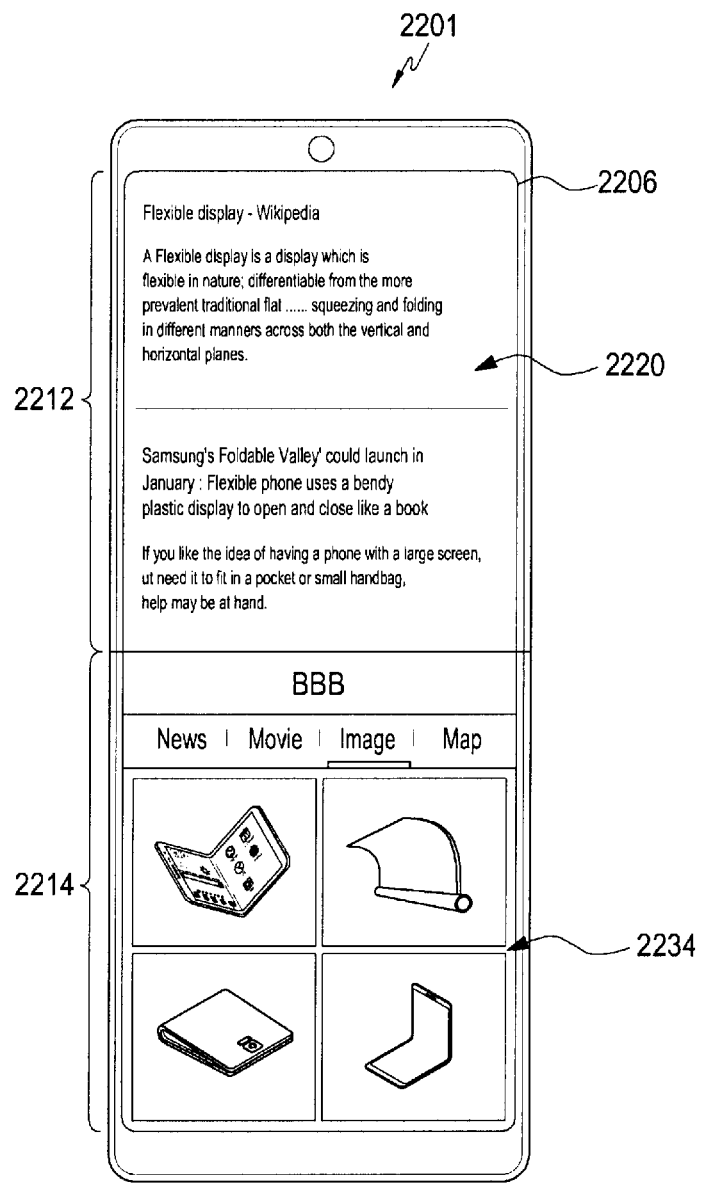
Figure 22H:
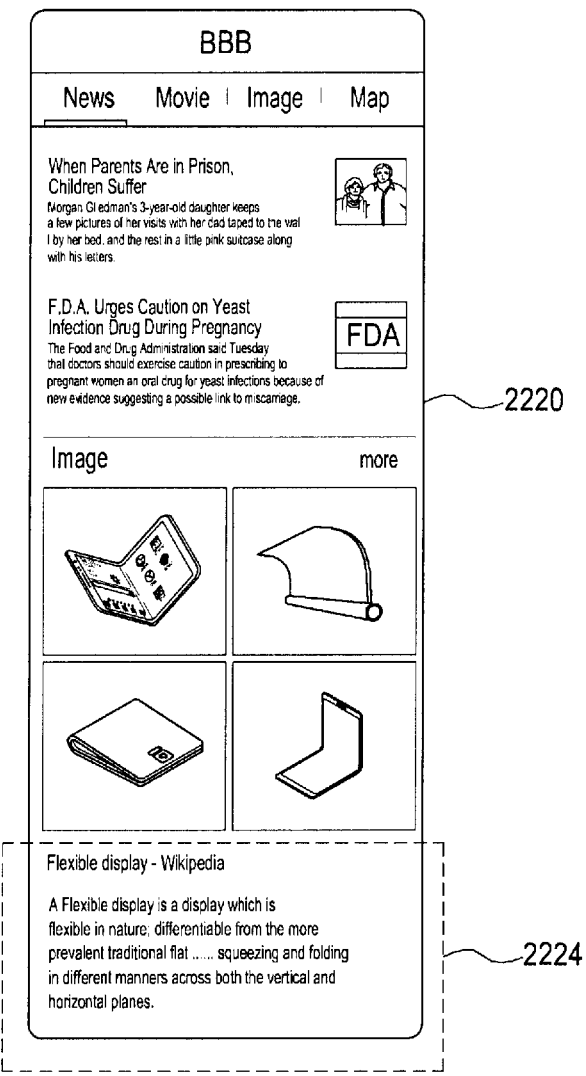

Referring to FIGS. 22G and 22H, in response to the input 2250, the processor may display another part 2224 of the first graphic element 2220 in the first area 2212 while maintaining the third graphic element 2234 as it is.

The term "module" as used herein may refer to a unit including hardware, software, or firmware, and for example, may be used interchangeably with a term, such as a logic, a logical block, a component, or a circuit. The "module" may be an integrated component, or a minimum unit for performing one or more functions or a part thereof. The "module" may be mechanically or electronically implemented, and may include, for example, an Application-Specific Integrated Circuit (ASIC) chip, a Field-Programmable Gate Array (FPGA), or a programmable-logic device which performs certain operations and has been known or is to be developed in the future.

At least part of the device (e.g., modules or functions thereof) or the method (e.g., operations) according to various embodiments of the present disclosure may be implemented by an instruction, which is stored in a computer-readable storage medium (e.g., the memory 430), in the form of a program module. When the instruction is executed by a processor (e.g., the processor 420), the processor may perform a function corresponding to the instruction. The computer-readable recoding medium may include magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; an internal memory; and/or the like. The instructions may include codes made by a compiler or codes which can be executed by an interpreter.

The module or program module according to various embodiments of the present disclosure may include at least one of the aforementioned elements, may further include other elements, or some of the aforementioned elements may be omitted. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

According to various embodiments of the present disclosure, in a storage medium for storing instructions, the instructions are configured to cause at least one processor to perform at least one operation when executed by the at least one processor, and the at least one operation includes configuring a first area and a second area on the display; displaying a first graphic element related to a first application in the first area of the display; displaying a second graphic element related to control over the first application in the second area of the display; and controlling the first application in response to an input related to the second graphic element.

Example embodiments of the present disclosure are provided to describe technical contents of the present disclosure and to help the understanding of the present disclosure, and are not intended to limit the present disclosure. Therefore, it should be construed that all modifications and changes or various other embodiments which are based on the technical idea of the present disclosure fall within the present disclosure.

The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, and/or the like. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The functions and process steps herein may be performed automatically or wholly or partially in response to user command. An activity (including a step) performed automatically is performed in response to executable instruction or device operation without user direct initiation of the activity.

What is claimed is:

1. An electronic device, comprising:
a flexible display; and
a processor configured to:
control, in response to detection of a first user input, the flexible display to divide a display area into a first area and a second area;
control the flexible display to display a first graphic element related to a first application in the first area, wherein the first graphic element includes an image corresponding to a video call conducted with an external device;
control the flexible display to display a second graphic element in the second area, wherein the second graphic element corresponds to a graphical interface corresponding to a second application different from the first application;
in response to receiving a second user input related to the second graphic element, control the first application to transmit the second user input and information corresponding to the second graphic element to the external device;
receive, from the external device, input data including an external input related to the second graphic element while executing the video call; and
control the flexible display to mark the external input on the graphical interface corresponding to the second application in response to receiving the input data.

2. The electronic device as claimed in claim 1, wherein:
the graphical interface corresponding to the second application displays multiple objects, and in response to a detected second user input comprising selection of one of the multiple objects,
the processor is further configured to cause the first application to display an image in the first area corresponding to the selected one of the multiple objects.

3. The electronic device as claimed in claim 1, wherein the second graphic element includes multiple selectable objects,
and in response to a detected second user input comprising selection of one of the multiple selectable objects, the processor is further configured to transmit a file corresponding to the selected one of the multiple selectable objects to the external device.

4. The electronic device as claimed in claim 1, wherein:
the graphical interface corresponding to the second application has an image related to a current location, and a detected input includes selecting the image related to the current location, and
wherein the processor is further configured to output information via the first application corresponding to a location in which the selected image was captured responsive to the detected input.

5. The electronic device as claimed in claim 1, wherein the second graphic element includes multiple selectable images, and in response to a detected second user input including selection of one of the multiple images,
the processor is further configured to control to transmit the selected image to the external device and control the flexible display to display the selected image in the first or second graphical element.

6. A method in an electronic device, comprising:
detecting a first user input;
in response to detecting the first user input, controlling, by a processor, a flexible display to divide a display area into a first area and a second area;
controlling the flexible display to display a first graphic element related to a first application in the first area, wherein the first graphic element includes an image corresponding to a video call conducted with an external device;
controlling the flexible display to display a second graphic element in the second area, wherein the second graphic element corresponds to a graphical interface corresponding to a second application different from the first application;
in response to receiving a second user input related to the second graphic element, control the first application to transmit the second user input and information corresponding to the second graphic element to the external device;
receiving, from the external device, input data including an external input related to the second graphic element while executing the video call; and
controlling the flexible display to mark the external input on the graphical interface corresponding to the second application in response to receiving the input data.

7. The method as claimed in claim 6, wherein the graphical interface corresponding to the second application displays multiple objects, and in response to a detected second user input comprising selection of one of the multiple objects,
the method further comprises controlling the flexible display to display via the first application an image in the first area corresponding to the selected one of the multiple objects.

8. A non-transitory storage medium storing instructions executable by at least one processor to cause the at least one processor to:
in response to detecting a first user input, control a flexible display to divide a display area into a first area and a second area
control the flexible display to display a first graphic element related to a first application in the first area, wherein the first graphic element includes an image corresponding to a video call conducted with an external device different from the first application;
control the flexible display to display a second graphic element in the second area of the flexible display, wherein the second graphic element corresponds to a graphical interface corresponding to a second application;
in response to receiving a second user input related to the second graphic element, control the first application to transmit the second user input and information corresponding to the second graphic element to the external device;
obtain, from the external device, input data including an external input related to the second graphic element while executing the video call; and
control the flexible display to mark the external input on the graphical interface corresponding to the second application in response to obtaining the input data.

9. The non-transitory storage medium as claimed in claim 8, wherein the graphical interface corresponding to the second application displays multiple objects, and in response to a detected second input comprises selection of one of the multiple objects, and
wherein the instructions are further executable by the at least one processor to cause the first application to display an image in the first area corresponding to the selected one of the multiple objects.

\* \* \* \* \*